(12) United States Patent
Hawthorne

(10) Patent No.: US 9,028,314 B2
(45) Date of Patent: May 12, 2015

(54) STRATEGY GAME, METHOD AND/OR SYSTEM

(71) Applicant: Donald J. Hawthorne, Great Falls, VA (US)

(72) Inventor: Donald J. Hawthorne, Great Falls, VA (US)

(*) Notice: Subject to any disclaimer, the term of this patent is extended or adjusted under 35 U.S.C. 154(b) by 13 days.

(21) Appl. No.: 13/827,272

(22) Filed: Mar. 14, 2013

(65) Prior Publication Data

US 2014/0171167 A1 Jun. 19, 2014

Related U.S. Application Data

(60) Provisional application No. 61/737,528, filed on Dec. 14, 2012.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 3/02 | (2006.01) |
| A63F 3/00 | (2006.01) |

(52) U.S. Cl.
CPC .......... *A63F 3/02* (2013.01); *A63F 2003/00195* (2013.01); *A63F 3/00075* (2013.01)

(58) Field of Classification Search
USPC ....................................... 463/9, 10
See application file for complete search history.

(56) References Cited

U.S. PATENT DOCUMENTS

| | | | |
|---|---|---|---|
| 3,826,498 A | 7/1974 | Monek | |
| 3,860,241 A | 1/1975 | Leftin | |
| 4,157,184 A | 6/1979 | Recard, Jr. | |
| 4,277,065 A | 7/1981 | White | |
| 4,759,548 A | 7/1988 | Chaban | |
| 4,813,678 A | 3/1989 | Collazo et al. | |
| 4,850,597 A | 7/1989 | Milliken | |
| 5,004,245 A | 4/1991 | Schumacher et al. | |
| 5,135,231 A | 8/1992 | Piper | |
| 5,251,905 A | 10/1993 | Bombino | |
| 5,570,887 A | 11/1996 | Christie, Jr. | |
| 5,649,704 A | 7/1997 | Dobbin | |
| 5,879,005 A | 3/1999 | Baca | |
| D466,164 S | 11/2002 | Bensimon | |
| 6,575,463 B1 | 6/2003 | Wintersteen | |
| 6,729,619 B2 | 5/2004 | Yu et al. | |
| 6,808,172 B2 | 10/2004 | Bedford et al. | |
| 7,296,796 B2 | 11/2007 | Mackenzie | |
| 7,334,792 B1 | 2/2008 | Bermann | |
| 2003/0062672 A1 | 4/2003 | Sloper | |

(Continued)

OTHER PUBLICATIONS

Jose Capablanca, "Chess Fundamentals," 2006, pp. 23-25, http://books.google.com/books?id=rDz8do_EDjkC&dq=isbn:0812936817&source=gbs_navlinks_s.*

(Continued)

*Primary Examiner* — Kevin Y Kim
(74) *Attorney, Agent, or Firm* — Dinesh Agarwal, P.C.

(57) ABSTRACT

A strategy game includes a first group of primary elements representing movement, and a second group of primary elements representing combat or interaction. The first group of primary elements includes first and second game pieces representing speed and maneuver, respectively, and each having a value. The second group of primary elements includes third and fourth game pieces representing attack and defense, respectively, and each having a value. The game pieces include dice represented in different colors.

33 Claims, 8 Drawing Sheets
(8 of 8 Drawing Sheet(s) Filed in Color)

(56) References Cited

U.S. PATENT DOCUMENTS

2010/0072702 A1 3/2010 Fowler
2011/0042891 A1 2/2011 Howard et al.

OTHER PUBLICATIONS

Valve Software, "Team Fortress 2," relevant patches up until Jun. 23, 2011, http://wiki.teamfortress.com/wiki/Main_Page.*

Disciplinary Action, Jun. 25, 2011, https://web.archive.org/web/20110625154413/http://wiki.teamfortress.com/wiki/Disciplinary_Action.*

ÜberCharge, Jul. 6, 2010, https://web.archive.org/web/20100706010717/http://wiki.teamfortress.com/wiki/%C3%9CberCharge.*

Kritzkrieg, Jul. 4, 2010, https://web.archive.org/web/20100704185759/http://wiki.teamfortress.com/wiki/Kritzkrieg.*

Mad Milk, Oct. 4, 2010, https://web.archive.org/web/20101004002055/http://wiki.teamfortress.com/wiki/Mad_Milk.*

Medic, Jul. 4, 2010, https://web.archive.org/web/20100704141319/http://wiki.teamfortress.com/wiki/Medic.*

* cited by examiner

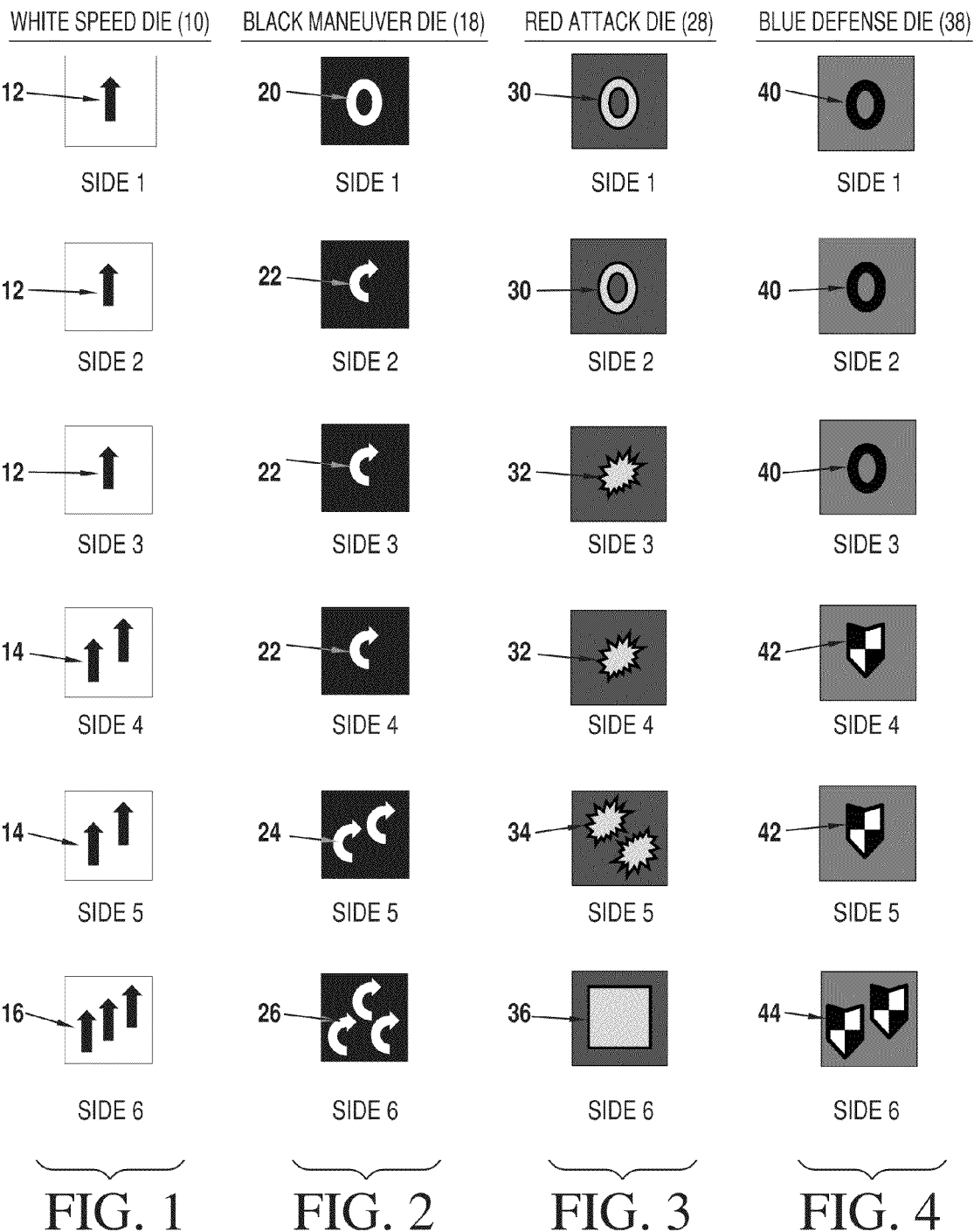

STRATEGY GAME, METHOD AND/OR SYSTEM

CROSS-REFERENCE TO RELATED APPLICATIONS

The present application claims the benefit of prior U.S. Provisional Application Ser. No. 61/737,528, filed Dec. 14, 2012, which is hereby incorporated herein in its entirety by reference.

FIELD AND BACKGROUND OF THE INVENTION

The present invention is generally directed to games and strategy simulations, and more particularly to a strategy game, method and/or system that can be applied to various challenges, competitions, interactions, situations, or other activities.

Playing games or engaging in various challenges and competitions is as old as the civilization. For thousands of years, people have been involved in outdoor games, sporting events, etc., either as spectators or as participants. The Roman Gladiator games, although existed about two-thousand years ago, a Hollywood epic "Gladiator" dramatizing the bloody fights, was released barely a dozen years ago. The ancient Olympic Games, held in Olympia, Greece, from the $8^{th}$ century BC to the $4^{th}$ century AD, are still held today, albeit in somewhat different form and organization.

In this regard, while the thrill of participating in real competitive games, is generally available to only the selected members of the society, playing games that mimic the real games, or other games which allow interactions, challenges, competitions, strategies, etc., between people, is available to all.

Various games and play methods are available in prior art as shown in U.S. Design Pat. No. 466,164; U.S. Pat. Nos. 3,826,498; 3,860,241; 4,157,184; 4,277,065; 4,759,548; 4,813,678; 4,850,597; 5,004,245; 5,135,231; 5,251,905; 5,570,887; 5,649,704; 5,879,005; 6,575,463B1; 6,729,619; 6,808,172; 7,296,796B2; 7,334,792; Publications Nos. 2003/0062672A1; 201010072702A1; and 2011/0042891A1.

ASPECTS OF THE INVENTION

The present disclosure is directed to various aspects of the present invention.

One aspect of the present invention is to provide a strategy game, method, and/or system that can simulate any personal, professional, corporate, governmental, or intergovernmental challenge, competition, interaction, or situation, including, but not limited to, social, economic, athletic, military, diplomatic, religious, political, academic, and biological.

Another aspect of the present invention is to provide a strategy game, method, and/or system that can be played by two or more players of a very young age to the elderly.

Another aspect of the present invention is to provide a strategy game, method, and/or system that can be used for leisure or non-leisure activities, or for training activities.

Another aspect of the present invention is to provide a strategy game, method, and/or system that can be used for modeling or devising various competitive activities or challenges in, for example, private, commercial, and/or military applications.

Another aspect of the present invention is to provide a strategy game, method, and/or system that can be used in modeling or devising various competitive activities or challenges relating to outer space and/or oceanic explorations.

Another aspect of the present invention is to provide a strategy game, method, and/or system that is devised around the concept of movement and combat. The movement preferably includes speed and maneuver, and the combat preferably includes attack and defense.

Another aspect of the present invention is to provide a strategy game, method, and/or system that is preferably engaged by using game pieces represented by different colors and each having one or more predetermined values. The values can be numerical, non-numerical, symbolic, and/or represented by other indicia. In an engagement, the color of a game piece determines the timing of its use during the engagement, and the value thereof determines its strength or functionality relative to another game piece of an opponent.

Another aspect of the present invention is to provide a strategy game, method, and/or system that is preferably engaged by using real or virtual game pieces, with or without a game board.

Another aspect of the present invention is to provide a strategy game, including first group of primary elements representing movement, and a second group of primary elements representing combat or interaction. The first group of primary elements includes first and second game pieces representing speed and maneuver, respectively, and each having a value. The second group of primary elements includes third and fourth game pieces representing attack and defense, respectively, and each having a value.

Another aspect of the present invention is to provide a strategy game, including a first group of primary elements representing movement, a second group of primary elements representing combat or interaction, and a third group of secondary elements representing one or more of recovery, randomization, unpredictability, and advantages. The first group of primary elements includes a speed game piece and a maneuver game piece. The second group of primary elements includes an attack game piece and a defense game piece. The third group of secondary elements includes one or more of a recovery game piece, a randomization game piece, an unpredictability game piece, and an advantages game piece.

Another aspect of the present invention is to provide a strategy game play method for two or more players, which includes a) providing for each player a set of at least four game pieces representing speed, maneuver, attack, and defense categories, each game piece including a plurality of preselected values for the corresponding category, b) having each player roll all four game pieces together, c) comparing the results of the speed game piece to determine a winner, d) allowing the winner in step c) to use the rolled value of his attack game piece against one of the other players, e) allowing the opponent in step d) to use the rolled value of his defense game piece, f) comparing the results of steps d) and e) and determining a wounded player, g) having the wounded player remove one of his four game pieces from the game, and h) repeating steps b)-g) and determining the loser of the game who has lost at least two of his speed, maneuver, attack, and defense game pieces.

Another aspect of the present invention is to provide a strategy game play method for two or more players, which includes a) providing for each player a set of at least four game pieces representing primary elements of speed, maneuver, attack, and defense categories, each game piece including a plurality of preselected values for the corresponding category, b) providing for each player one or more of secondary element pieces representing recovery, randomization, unpredictability, and advantages, each game piece including a plurality of preselected values for the corresponding category, c) having each player roll the four primary element game pieces together; d) comparing the results of the speed game piece to determine a winner; e) allowing the winner in step d) to use the value of his attack game piece against one of the other players; f) allowing the opponent in step e) to use the value of his defense game piece; g) comparing the results of steps e) and f) and determining a wounded player; h) having the wounded player remove one of his four primary element game pieces from the game; and i) repeating steps c)-h) and determining the loser of the game who has lost at least two of his speed, maneuver, attack, and defense game pieces.

Another aspect of the present invention is to provide a strategy game play method for two or more players, which includes a) providing for each player a set of at least four game pieces representing speed, maneuver, attack, and defense categories, each game piece including a plurality of preselected values for the corresponding category, b) having each player roll speed and maneuver game pieces together, c) comparing the results of the speed game piece to determine a winner, d) allowing the player with the highest rolled value of his maneuver game piece to roll his attack game piece, e) allowing the winner in step d) to use the rolled value of his attack game piece against one of the other players, f) allowing the opponent in step e) to roll and use the value of his defense game piece, g) comparing the results of steps e) and f) and determining a wounded player, h) having the wounded player remove one of his four game pieces from the game, and i) repeating steps b)-h) and determining the loser of the game who has lost at least two of his speed, maneuver, attack, and defense game pieces.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

One of the above and other aspects, novel features and advantages of the present invention will become apparent from the following detailed description of the non-limiting preferred embodiment(s) of invention, illustrated in the accompanying drawings, wherein:

FIG. 1 illustrates the six-sides of a White Speed die in accordance with a preferred embodiment of the present invention;

FIG. 2 illustrates the six-sides of a Black Maneuver die in accordance with a preferred embodiment of the present invention;

FIG. 3 illustrates the six-sides of a Red Attack die in accordance with a preferred embodiment of the present invention;

FIG. 4 illustrates the six-sides of a Blue Defense die in accordance with a preferred embodiment of the present invention;

DETAILED DESCRIPTION OF THE PREFERRED EMBODIMENT(S) OF THE INVENTION

Figures 5, 6, 7, 8:
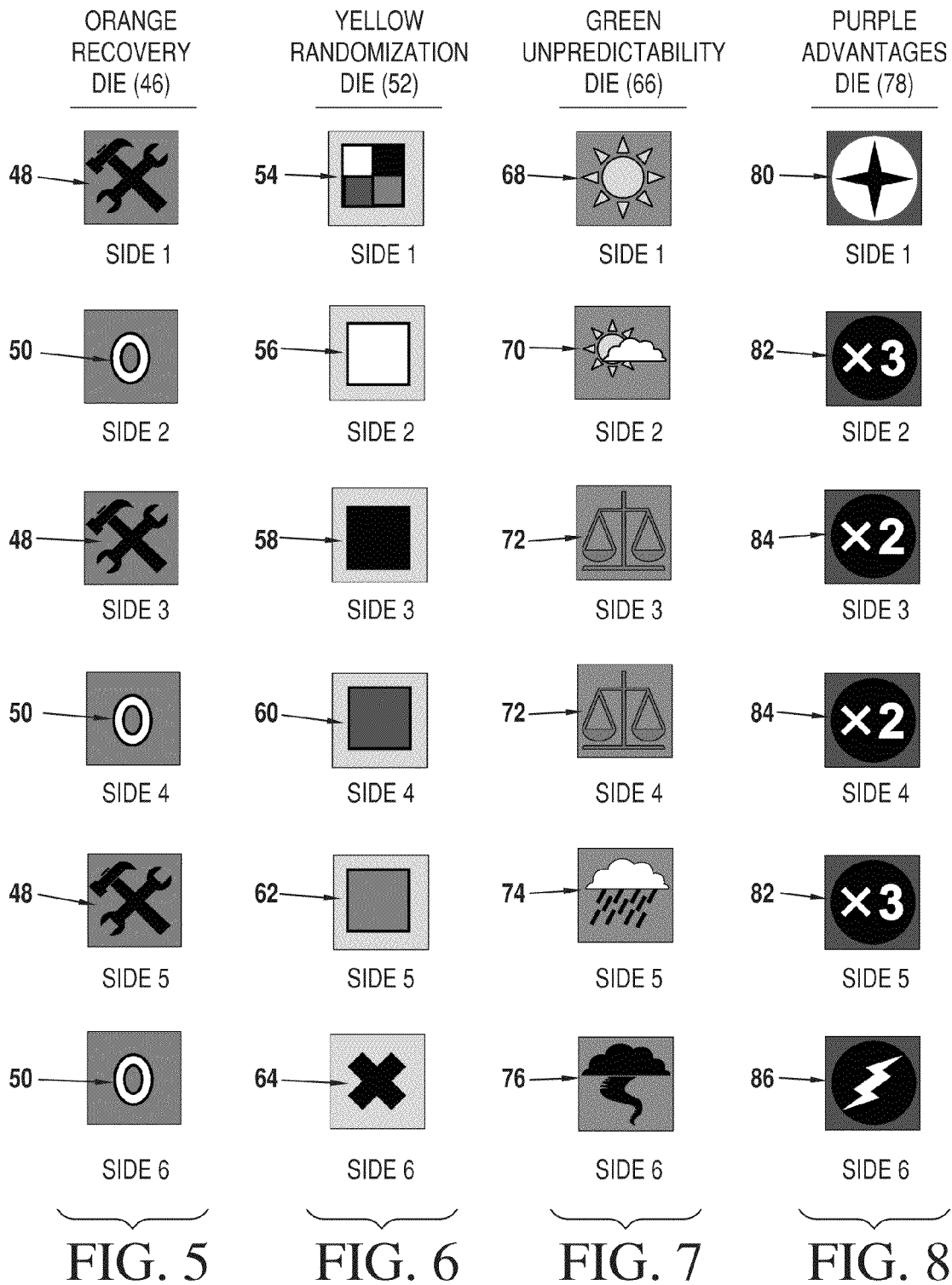
FIG. 5 illustrates the six-sides of a Orange Recovery die in accordance with a preferred embodiment of the present invention.
FIG. 6 illustrates the six-sides of a Yellow Randomization die in accordance with a preferred embodiment of the present invention.
FIG. 7 illustrates the six-sides of a Green Unpredictability die in accordance with a preferred embodiment of the present invention.
FIG. 8 illustrates the six-sides of a Purple Advantages die in accordance with a preferred embodiment of the present invention.

The present disclosure describes a preferred embodiment(s) of a game, method, and/or system (collectively "System") for using unique graphic tools for modeling the basic elements, which are common to all forms of competition (or game, challenge, interaction, situation, project, etc.) and their interactions with each other in the pursuit of the competition's goal, with variations of the interactions of the system's components being applied so as to allow modeling of any form of competition without changing the essential nature of the system itself, based, at least partly, on the concept that all competition of any form can be described as including four Primary Elements, with four or more Secondary or Qualifying Elements depending on various specifics of the competition, with the four Primary Elements being Speed, Maneuver, Attack and Defense, and the four Secondary or Qualifying Elements, being Recovery, Randomization, Unpredictability and Advantages.

Elements

The system uses distinctive symbols divided preferably into eight or more different colors, with each color set possessing an unique set of pictographs or indicia, and each pictograph or indicia denoting a specific function to determine their interaction with the other symbols, the symbology may then be transferred to dice, tiles, chips, coins, chits, counters, playing cards or other physical media, or it may be randomly generated in an electronic format such as, but not limited to, computer games or PDA "apps"; the flexibility of the method of generating or using the symbology is indicative of the utility of the system, with dice being used to randomize results throughout the modeling activity, or cards or tile draws from a finite pool allowing for a measure of predictability, or electronic random generation allowing for modifying the probability of certain results to occur more often than others, with whatever media the symbology is applied to, allowing for a result which provides the user or users with a set of pictographs or indicia which they may then apply to the competition, game, challenge, interaction, situation, project, etc., being modeled, so that the application by the user or users of the various results and. Where applicable, the interaction of those results, allows any sort of competition to be simulated subject to the context of the competition.

Dice Types

Where dice are used to utilize the System, any such dice used in the System may be of any practical dimensions to allow facilitation of their use in a manner common to any dice game, including but not limited to, ease of perceiving the information presented, whether by use of visual or other depiction, ease of shuffling, ease of stacking, ease of handling, any form of depiction designed or intended to compensate for sensory disabilities on the part of the users, or any other consideration common to the use of dice, and most preferably will be polyhedral dice, having multiple faces or sides as practicable for their use as random result generators, with all Dice Types divided into four or more types differentiated by color (which determines when they are used in the sequence of the competition) and symbology (which determines how their results are applied to the competition) represented by a numerical value, a non-numerical value, a symbol, an indicia, or a combination thereof.

Card Types

Where cards are used to utilize the System, any such cards used in the System may be of any practical dimensions to allow facilitation of their use in a manner common to any card game, including but not limited to, ease of perceiving the information presented, whether by use of visual or other depiction, ease of stacking, ease of shuffling, ease of handling, any form of depiction designed or intended to compensate for sensory disabilities on the part of the users, or any other consideration common to the use of playing cards, with all Cards Types divided into four or more types differentiated by color (which determines when they are used in the sequence of the competition) and symbology (which determines how their results are applied to the competition) represented by a numerical value, a non-numerical value, a symbol, an indicia, or a combination thereof, whether on the obverse (front) or reverse (back) sides of said cards.

Tile and Chit Types

Where "tiles" or "chits" are used to utilize the System, any such tiles or chits used in the System may be of any practical dimensions to allow facilitation of their use in a manner common to any game which utilizes such components, including but not limited to, ease of perceiving the information presented, whether by use of visual or other depiction, ease of stacking, ease of shuffling, ease of handling, ease of storage in and/or access to a container of practical size for random draws such as may be used in lotteries or raffle drums or other methods of random distribution, or any other consideration common to the use of such tiles or chits, with all Tile or Chit Types divided into four or more types differentiated by color (which determines when they are used in the sequence of the competition) and symbology (which determines how their results are applied to the competition) represented by a numerical value, a non-numerical value, a symbol, an indicia, or a combination thereof, whether on the obverse (front) or reverse (back) sides of said tiles or chits.

Electronic Media and Computer Generation of the Symbols

Where any form of electronic media is used to utilize the System, any such depictions of the elements of the system may take any form, in that such media may represent the symbols as dice rolls, cards played, tiles or chits drawn, or may represent a depiction of only the symbol itself, irrespective of any animation or other depiction solely of an entertainment or presentational nature, but maintaining the essential form of the symbols in their depiction of their functions, their relative proportions in ratio of appearance or availability for a given competition, and the inherent probability of their appearance or availability to the competitors in the course of the competition, with the fundamental interactive relationship between the various symbols depicted properly and accurately and maintained to preserve the function of the System itself, and such depictions and the means of their generation and presentation may be of any practical dimensions or method to allow facilitation of their use in a manner common to any such game, including but not limited to, ease of perceiving the information presented, whether by use of visual or other depiction, ease of randomization in distribution, ease of practical access, or any other consideration common to the use of the specific type of electronic media in which the System is being reproduced, with the System's fundamental elements divided into four or more types differentiated by color (which determines when they are used in the sequence of the competition) and symbology (which determines how their results are applied to the competition), and in the case of direct simulations of the examples given above of dice, cards, chips, coins, tiles, or chits, maintaining the general descriptions of such media as described above in the reproduction of such elements in the given electronic media used to simulate them. The System can be executed on any type of computer, gaming device, tablet, fablet, phablet, cellular phone, mobile phone, smartphone, personal digital assistant (PDA), etc.

Symbols and Meanings

The System preferably includes various unique graphic symbols, and is designed to accommodate any new symbols which may be necessary for expansions or variations specific to situations being modeled. The core of the System preferably includes eight fundamental Symbol Generators, comprising four Primary Elements and four Secondary Elements, distinguished by unique symbols and further distinguished by, but not necessarily limited to, specific preferable distinctive colors, as described below:

Primary Elements

Speed

In the basic form of the System, Speed may be represented by Black characters on a White field, and may be represented by the depiction of one, two or three or more straight arrows or similar unique symbol or indicia, and when depicted as arrows they may be displayed singly or in parallel and facing in the same direction, typically, but not exclusively, displayed as black characters on a white field, or other images, or similar unique symbol, or any other unique representational symbol, and in whatever form representing "Speed", "Acceleration", "Available Velocity" or general forward motion or any other change in position which promotes physical advancement of the competitor or participant being represented in the model toward the goal or goals of the competition.

Maneuver

In the basic form of the System, Maneuverability may be represented by White characters on a Black field, and may be represented by the depiction of one of the following effects: a "null" effect using one or more of the following: one or more of common notation numerals for "zero" ("0") or similar representational symbol representing a "No Control" or "No Change" or "No Maneuver Effect Achieved"; one, two or three or more curved arrows or similar unique symbol or indicia, and when depicted as arrows they may be displayed singly or in a grouped cluster and facing in the same or alternating directions, typically, but not exclusively, displayed as white characters on a black field, or other images, or similar unique symbol, or any other unique representational symbol, and in whatever form representing "Maneuverability", "Turning Capacity", "Agility" or any other adaptive or positional- or directional-modifying motion, such as actual changes in facing or position or direction of movement or angles of attack or approach.

Attack

In the basic form of the System, Attack may be represented by Yellow characters on a Red field, and may be represented by the depiction of one of the following effects: a "null" effect using one or more of the following: one or more of common notation numerals for "zero" ("0") or similar representational symbol representing a "Missed Shot" or "Failure" or "No Attack Effect Achieved"; a "success" effect using one or more of the following: use of one or more images of the common mathematical notation numerals for "one" ("1"), or the English character for an "asterisk" ("*"), or use of one or more images of the symbol depicting one or more "Burst" images, or similar unique symbol, or any other unique representational symbol, or other images, or similar unique symbol, or any other unique representational symbol, and in whatever form, representing a "Shot On Target" or "Accurate Placement" or "Partially Successful Attack"; a "strong success" effect using one or more of the following: use of two or more images of the of the common mathematical notation numerals for "two" ("2"), or use of two or more images of the character for an "asterisk" ("*"), or use of two or more images of a symbol depicting two "Burst" images, or similar unique symbol, or any other unique representational symbol, or other images, or similar unique symbol, or any other unique representational symbol, and in whatever form, representing a "Focused Shot On Target" or "Very Accurate Placement" or "Fully Successful Attack"; an "extreme success" or "decisive result" effect using one or more of the following: use of one or more images of the common mathematical notation numerals for "infinity" ("∞"), the English character for an "exclamation point" ("!"), or use of one or more yellow squares, or similar unique representational symbol, or other images, or similar unique symbol, or any other unique representational symbol, and in whatever form, all of which indicate a cascade effect requiring the further use of the Yellow Randomization Symbol generation method described below under Secondary Elements, and representing a "Direct Hit" or "Critical Hit" or "Decisively Effective Attack Result".

Defense

In the basic form of the System, defense may be represented by Black and White characters on a blue field, and may be represented by the depiction of one of the following effects: a "null" effect using one or more of the following: one or more of common notation numerals for "zero" ("0") or similar representational symbol representing a "Ineffective Defense" or "Failure" or "No Defensive Effect Achieved"; a "success" effect using one or more of the following: use of one or more images of the common flowchart notation symbol for "Off-chart Connector" ("⌂", inverted), or the English character for the letter "D" ("D"), or use of one or more images of any symbol depicting one or more "Shield" images, or similar unique symbol, or any other unique representational symbol, and in whatever form, representing a "Accurate Defense" or "Effective Deflection of Attack" or "Partially Successful Defense"; a "strong success" effect using two or more of the following: use of two or more images of the common flowchart notation symbol for "Off-chart Connector" ("⌂ ⌂", inverted), or the English characters for an "asterisk" ("*"), or use of one or more images of any symbol depicting one or more "Shield" images or similar unique symbol, or any other unique representational symbol, and in whatever form, representing a "Accurate Defense" or "Highly Effective Deflection of Attack" or "Fully Successful Defense".

Preferred Ratio of Primary Element Symbols

The ratio of the various Primary Element Symbols is an aspect of their use in modeling competitions, and is established to re-create the dynamics inherent in competition in that a static state, or "Defense", is initially vulnerable to the actions of a dynamic state, or "Offense", which initial vulnerability may later be mitigated by Secondary Elements as described later; the ratio of Primary Elements is expressed as the Primary Element, an indicative, though not exclusive, Symbol and the number of such symbols in their minimum quantities:

Speed (White):
1 Straight Arrow×3 (for example)
2 Straight Arrows×2 (for example)
3 Straight Arrows×1 (for example)

Maneuverability (Black):
Zeroes ("0")×1 (for example)
1 Curved Arrow×3 (for example)
2 Curved Arrows×1 (for example)
3 Curved Arrows×1 (for example)

Attack (Red):
Zeroes ("0")×2 (for example)
1 Single "Burst" or "Partially Successful Attack" Symbol×2 (for example)
1 Double "Burst" or "Fully Successful Attack" Symbol×1 (for example)
1 Yellow Square (meaning "Use Randomization Symbols") or "Decisively Successful Attack" Symbol×1 (for example)

Defense (Blue):
Zeroes ("0")×3 (for example)
1 Single "Shield" or "Successful Defense" Symbol×2 (for example)
1 Double "Shield" or "Fully Successful Defense" Symbol×1 (for example)

Illustrative Sample Elements: Dice

The following is a representative sampling of the basic symbols used in the System when it is preferably applied to standard six-sided dice, and is not intended to represent a definitive or limited depiction of the entire System, which can be applied to any form of media including, but not limited to, dice, cards, chips, coins, tiles, chits, electronic, or any other media so long as the fundamental symbols and the relationships to and interaction with one another is maintained. The use of dice in these examples is for illustrative purposes only, and for purposes of these examples will consist of eight different Dice Types as denoted by their color types, with all dice in the representative sample being six-sided hexahedron dice, bearing pictographs or indicia specific to their function as shown below.

Primary Element Utility with a Six-Sided Cubical Dice

White Speed Dice

The White dice element of the System represents Speed or general forward motion or any other change in direction or position which promotes physical advancement toward the goal of the competition and on the example of a six-sided die (or hexahedron) consists of one black straight arrow symbol, or two black straight arrow symbols, or three black straight arrow symbols or other form of indicia, on a white field per side, all facing in the same direction, and occupying specific sides of the hexahedron relative to one another.

As shown in FIG. 1, the White Speed die 10 preferably includes one black straight arrow symbol 12 on its first, second, and third sides, a two black straight arrow symbol 14 on fourth and fifth sides, and a three black straight arrow symbol 16 on the sixth side thereof.

Function of the White Speed Symbols

One or more White Dice are rolled to show how much speed, movement, forward momentum or other type of re-positioning is available to the competitor in a given Phase or Turn or Round, with the number of arrows shown on each die face result constituting the total velocity, or number of moves, or spaces, or other type of re-positioning the competitor has to use in that Phase or Turn or Round.

Black Maneuver Dice

The Black dice element of the system represents Maneuverability or adaptive motion, changes in direction or angles of attack or approach and on the example of a six-sided die (or hexahedron) consists of a white numeral "0" (zero) symbol or one curved white arrow symbol, or two curved white arrow symbols or three or more curved white arrow symbols or other form of indicia, on a black field per side, all facing in the same direction, and occupying specific sides of the hexahedron relative to one another.

As shown in FIG. 2, the Black Maneuver die 18 preferably includes a white zero numeral 20 on its first side, a single curved white symbol 22 on second, third and fourth sides, a two curved white arrow symbol 24 on the fifth side, and a three curved white arrow symbol 26 on the sixth side thereof.

Function of the Black Maneuver Symbols

One or more Black Dice are rolled to show how many adjustments in facing, angle of momentum, actual changes in course or other re-direction of path of travel or approach or angle of attack is or are available to the competitor in a given Phase or Turn or Round, with a result of "0" (zero) usually having no effect and the number of curved arrows shown on each die face result constituting the total number of such modifications to the path of travel or approach or angle of attack, or other type of adjustment to the path of movement or relative position to other competitors or elements in the field of competition which the competitor has to use in that Phase or Turn or Round.

Red Attack Dice

The Red dice element of the system represents Attack or aggressive or offensive activity inherent in any competition which results in the opposing or resisting elements being reduced in their ability to adequately participate in the competition through loss of their own Primary Element abilities and on the example of a six-sided die (or hexahedron) consists of one or more single yellow numeral "0" (zero) symbols, or one yellow "burst" symbol, or two or more yellow "burst" symbols, or other form of indicia, or one yellow square on a red field per side, all oriented identically, and occupying specific sides of the hexahedron relative to one another.

As shown in FIG. 3, the Red Attack die 28 preferably includes a yellow zero numeral 30 on its first and second sides, a single yellow "burst" symbol 32 on the third and fourth sides, a double yellow "burst" symbol 34 on the fifth side, and a yellow square 36 on the sixth side thereof.

Function of the Red Attack Symbols

One or more Red Dice are allotted to each competitor to represent the level of their power or their ability to impact the opponent or opponents in the competition in order to reduce their competitive effectiveness, with more Red Dice representing a stronger ability to impact the opponents or other elements in the field of competition in a given Phase or Turn or Round, with the Red Dice then rolled to show how effective the offensive competitor's attack is against an opponent or other element in the field of competition in a given Phase or Turn or Round, with a result of "0" (zero) usually having no effect and the number of burst symbols shown on each die face constituting the total number of damage effects the opponent or element has received from the attack, while a result of a Yellow Square requires a roll of the Yellow "Randomization" die referred to below and the effects of that die roll usually being applied immediately.

Blue Defense Dice

The Blue dice element of the system represents Defense, or defensive or resistant activity inherent in any competition which allows the defending elements to deflect or negate direct aggressive actions by the opponent in order to preserve the defender's own ability to adequately participate in the competition by preventing loss of their own Primary Element abilities, and on the example of a six-sided die (or hexahedron) consists of one or more single black numeral "0" (zero) symbols, or one "shield" symbol, or two or more "shield" symbols or other form of indicia, on a blue field per side, all oriented identically, and occupying specific sides of the hexahedron relative to one another.

As shown in FIG. 4, the Blue Defense die 38 preferably includes a black zero numeral 40 on its first, second and third sides, a single black "shield" symbol 42 on the fourth and fifth sides, and a double black "shield" symbol 44 on the sixth side thereof.

Function of the Blue Defense Symbols

One or more Blue Dice are allotted to each competitor to represent the level of their resistance to outside effects or their ability to generally resist or deflect outside effects or attacks which would reduce their ability to effectively participate in the competition, with more Blue Dice representing a stronger ability to resist the impact of the attacks of an opponent or other elements in the field of competition in a given Phase or Turn or Round, the Blue Dice generally being rolled after the opponent's Red Dice have been rolled, allowing the defending competitor to apply results of "Shields" against the attacking competitor's results of "Bursts", with "Shields" generally cancelling out "Bursts" at a ratio of one-to-one, in an attempt to reduce of wholly negate the effects of the attacker's Red Die rolls, however an attacker's roll of a Yellow Square usually requires a roll of the Yellow "Randomization" die referred to below which usually bypasses any "Shields" rolled by the defender, as shown in the section on the Yellow "Randomization" Die referred to below and the effects of that die roll usually being applied immediately.

Secondary Element: Dice

Secondary Elements represent factors which impact a competition as adjuncts to the innate capabilities of the competitors, and may represent, but are not necessarily limited to representing, expendable materials or temporary efforts, increased pre-competition preparation, external environmental factors or the vagaries of outside chance; Secondary Elements in the basic system may be generally defined, without specific limitation, in the following four examples:

Recovery

In the basic form of the System, Recovery may be represented by Black or White characters on an Orange field, and may be represented by the depiction of one or more of the following effects: a "null" effect using one or more of the following: one or more of common notation numerals for "zero" ("0") or similar representational symbol representing a "No Recovery" or "Unsuccessful Repair Attempt" or "No Recovery or Repair Effect Achieved"; one or more depictions of tools, such as a hammer and wrench, or similar unique symbol or indicia, typically, but not exclusively, displayed as black characters on an orange field, or other images, or similar unique symbol, or any other unique representational symbol, and in whatever form representing "Damage Repaired", "Capability Restored", "Wounds Healed" or any other recovery of some ability possessed by the competitor at the start of the competition but lost due to outside influence.

Randomization

In the basic form of the System, Randomization may be represented by Black or Full Color characters on a Yellow field, and may be represented by the depiction of one or more of the following effects: a symbol depicting specifically one of the Primary Elements, as well as one or more symbols depicting a non-specific effect which may or may not be applicable to the Primary Elements depending on the nature of the competition being modeled, with the symbols referring to effects on the competitor to which they are applied based on, but not limited to, the loss of Primary Element capabilities determined by the Randomization symbols generated.

Unpredictability

In the basic form of the System, Unpredictability may be represented by White or Black or Full Color characters on a Green field, and may be represented by the depiction of one of the following effects: a "Neutral" effect using one or more of the following: one or more of the common notation numerals for "equal to" ("="), or a graphic symbol depicting balanced weight scales or the common "face" (":|") symbol or similar representational symbol or indicia representing a "Balanced" or "No Advantage" or "No Influential Effect"; a "Very Positive" effect using two or more of the common mathematical notation symbols for "plus" ("++"), or a graphic symbol depicting a shining sun or the common "grinning face" (":D") symbol or similar unique symbol or indicia representing an "Extremely Favorable" or "Great Advantage" or "Extremely Positive Influential Effect"; a "Positive" effect using one of the common mathematical notation symbols for "plus" ("+"), or a graphic symbol depicting a shining sun behind a white cloud or the common "smiley face" (":)") symbol or similar unique symbol or indicia representing a "Favorable" or "Advantage" or "Positive Influential Effect"; a "Negative" effect using one of the common mathematical notation symbols for "minus" ("–"), or a graphic symbol depicting a grey cloud with rain falling from it or the common "frown face" (":(") symbol or similar unique symbol or indicia representing an "Unfavorable" or "Disadvantage" or "Negative Influential Effect"; a "Very Negative" effect using two or more of the common mathematical notation symbols for "minus" ("– –"), or a graphic symbol depicting a black cloud with a tornado or cyclone descending from it or the common "angry face" (">:(") symbol or similar unique symbol or indicia representing an "Extremely Unfavorable" or "Great Disadvantage" or "Extremely Negative Influential Effect"; and, or other images, or similar unique symbol or symbols, or any other unique representational symbol or symbols, and in whatever form representing any influences on the competition which can impact the competition but over which the competitors themselves have no direct control during the course of the competition itself once the competition has begun, and which may include, but are not limited to, weather, positional advantage, various conditions of the competitors during the period of the competition or undefinable or unpredictable variables such as overall morale, good fortune or outside intervention.

Advantages

In the basic form of the System, Advantages are preferably expended once used, as opposed to being retained until lost as is usually the case with Primary Elements, in effect representing extreme or additional efforts or capabilities on the part of the competitor using them, but which use requires substantial expenditure of resources such that the Advantage is generally not available for use again within the course of the competition, and mat represent reserves of physical strength or endurance or willpower, expendables such as food or water or cash or ammunition or other supplies or abilities which have an enhancing effect on Primary Elements, and which in the basic form of the System may be represented by White and Black characters in White or Black circles on a Purple field, and may be represented by the depiction of one of the following effects: a "Failure" effect using one or more of the following or similar symbols: one or more of the common notation numerals for "zero" ("0"), or the common International "Strikeout" ("⊘") symbol, or a White lightning bolt in a Black circle or similar representational symbol representing a "Failed Boost" or "Dud" or "Advantage Expended With No Effect Achieved" with such symbols depicted as White characters in a Black circle on a Purple field and representing an Advantage expended with no appreciable effect on the Primary Element to which it is applied and the Advantage generation in that case being lost for the remainder of the competition; a "Doubled Effect" result represented by the mathematical notation "×2" using White characters in a Black circle on a Purple field and representing an Advantage expended with a doubling effect on the Primary Element to which it is applied and the Advantage generation in that case being lost for the remainder of the competition; a "Tripled Effect" result represented by the mathematical notation "×3" using White characters in a Black circle on a Purple field and representing an Advantage expended with a tripling effect on the Primary Element to which it is applied and the Advantage generation in that case being lost for the remainder of the competition; a "Maximum Effect" result using Black characters in a White circle on a Purple field, and represented by the symbol of a concentric circle "◉" or a four-pointed star ("✦") or similar unique symbol or indicia, and representing an Advantage expended with a multiplicative effect, generally of at least "×2" but as high as determined for any special rules applicable to the competition being modeled, on the Primary Element to which it is applied, and the Advantage generation in that case being retained and or have some other positive effect depending on the competition being modeled, which effect is usually, but not always, represented by returning the Advantage generating element which may be, but is not limited to, a card, a die, a tile, a chit, the generation capability in an electronic media or any other means utilizing the System, to the competitor's pool for use in a later effort during the competition.

Ratio of Secondary Element Symbols

The ratio of the various Secondary Element Symbols is an aspect of their use in modeling competitions, and is established to re-create the dynamics inherent in competition on a case-by-case basis, with generally one generating element each of the Recovery, Randomization and Unpredictability Secondary Elements, which are usually, but not necessarily, retained by the competitors throughout the duration of the competition, and variable numbers of generating elements of Advantages, which are usually, but not necessarily, expended by the competitors after use during the competition; the ratio of Secondary Elements on a case-by-case basis is expressed as the Secondary Element, an indicative, though not exclusive, Symbol and the number of such symbols in their minimum quantities:

Recovery (Orange):
Zeroes ("0")×3 (for example)
3 Crossed Hammer and Wrench Symbols (for example)
    Randomization (Yellow):
1 Square comprised of four smaller squares each of Red, White, Yellow and Blue×1 (for example)
1 White Square×1 (for example)
1 Black Square×1 (for example)
1 Red Square×1 (for example)
1 Blue Square×1 (for example)
1 Black "✖" Symbol×1 (for example)
    Unpredictability (Green):
1 Sun Symbol×1 (for example)
1 Sun with Cloud Symbol×1 (for example)
1 Balanced Scales Symbol×2 (for example)
1 Cloud with Rain Symbol×1 (for example)
1 Tornado Symbol×1 (for example)

Advantages/Bonus (Purple):
1 White Lightning Bolt in a Black Circle Symbol×1 (for example)
1 White ×2 in a Black Circle Symbol×2 (for example)
1 White ×3 in a Black Circle Symbol×2 (for example)
1 Black Four-Pointed Star in a White Circle Symbol×1 (for example)

Secondary Element Utility with a Six-Sided Dice

Orange Recovery Die

The Orange dice element of the System represents Recovery, or repair or re-energizing activity inherent in any competition which allows the competing elements to regain or recover expended attributes in to continue competing effectively, and on the example of a six-sided die (or hexahedron) consists of one or more single white numeral "0" (zero) symbols, or one black "Tools" symbol or other form of indicia, on an orange field per side, all oriented identically, and occupying specific sides of the hexahedron relative to one another.

As shown in FIG. 5, the Orange Recovery die 46 preferably includes a black crossed hammer and wrench symbol 48 on its first, second and fifth sides, and a black zero numeral 50 on the second, fourth, and sixth sides thereof.

Function of the Orange Recovery Symbols

One or more Orange Dice can be allotted to each competitor to represent the level of their ability to recover from the results of outside effects or attacks which have reduced their ability to effectively participate in the competition, with more Orange Dice representing a stronger ability to recover from the impact of the attacks of an opponent or other elements in the field of competition in a given Phase or Turn or Round, the Orange Dice generally being rolled at the beginning of a new Turn or Phase or Round or other demarcation, with a roll of "0" (zero) having no effect and a roll showing the "Tools" or other symbol or indicia resulting in the competitor recovering one or more of any previously lost Primary Dice of the competitor's choosing.

Yellow Randomization Die

The Yellow dice element of the System represents Randomization, or chance or dispersal or resolution of applied force in generally acceptable but essentially unpredictable ways, which can occur during any competition and which allows the offensive actions of one competitor to impact the opponent's capabilities in ways beyond the ability of the affected participant to avoid or channel, including offensive actions or attacks which may completely bypass the affected participant's defenses and may or may not have devastating results, and on the example of a six-sided die (or hexahedron) consists of one or more single white square symbols, or one or more single black square symbols, or one or more single red square symbols, or one or more single blue square symbols, or a square comprised of one each of white, black, red and blue symbols, or one or more single black "✖" symbols, wherein squares may or may not be replaced by some other form of indicia, on a yellow field per side, all oriented identically, and occupying specific sides of the hexahedron relative to one another.

As shown in FIG. 6, the Yellow Randomization die 52 preferably includes a multicolor square symbol 54 of white, black, red and blue colors on its first side, and a white square symbol 56, a black square symbol 58, a red square symbol 60, a blue square symbol 62, and a black 'X' symbol 64 on its second, third, fourth, fifth, and sixth sides, respectively.

Function of the Yellow Randomization Symbols

One or more Yellow Randomization Dice are allotted to each competitor for use when they have received one or more yellow square results on the rolls of their Red attack dice, with one Yellow Randomization die rolled separately for each yellow square result on the Red Attack dice, and the result which is then rolled on the Yellow Randomization die being applied immediately to the defending competitor or field element, with the color of the square rolled usually being the loss of a corresponding colored die from the Primary Element dice pool of the affected competitor or field element, or in the case of the four-color square the loss of one or more of the relative Primary Element generators depending on the competition being modeled, while a result of a black "✖" generally results in the immediate and complete elimination of the affected competitor or field element with no possibility of avoidance, subject to variant rules or conditions depending on the sort of competition being modeled, thus using the Yellow Randomization die to represent any particularly effective result which may occur in any competition but which cannot be reasonably planned for or counted on to occur but may nevertheless prove decisive to the outcome.

Green Unpredictability Die

The Green dice element of the system represents Unpredictability, including but not limited to fortune, environmental effects, morale, spirit, quality of forces or their supplies or any variables which can tip the balance against or in favor of a competitor for the entire course of a competition or only in a given Turn, Phase, Round or other period of time with in the competition, and on the example of a six-sided die (or hexahedron) consists of one or more single "Sun" symbols, or one or more "Sun and Cloud" symbols, or one or more "Equal Measuring Scale" symbols, or one or more "Rain Cloud" symbols, or one or more "Storm" symbols, wherein such symbols may or may not be replaced by some other form of indicia, on a green field per side, all oriented identically, and occupying specific sides of the hexahedron relative to one another.

As shown in FIG. 7, the Green Unpredictability die 66 preferably includes a "Sun" symbol 68 on its first side, a "Sun and Cloud" symbol 70 on the second side, an "Equal Measuring Scale" symbol 72 on the third and fourth sides, a "Rain Cloud" symbol 74 on the fifth side, and a "Storm" symbol 76 on the sixth side thereof.

Function of the Green Unpredictability Symbols

One or more Green Unpredictability Dice are allotted to each competitor in special circumstances or are used to establish overall conditions for both sides during the competition, with the Green Unpredictability serving different functions depending on the nature of the competition being modeled, essentially filling the role of a "wild card" to represent favorable, unfavorable or neutral conditions in effect at a specific moment or during the entire course of a competition, with its most common use being to represent the variable effectiveness of an individual element within a competitor's team or side or complement of competitive elements, with the progression from "Sun" to "Sun and Cloud" to Equal Measuring Scales" to "Rain Cloud" to "Storm" representing a shift in the advantage for a particular element based on the nature of that element, the task being modeled, the goal being sought, or any number of variables stipulated by the nature of the competition and the competing elements or field of competition.

Purple Advantages Dice

The Purple dice element of the System represents Advantages, including but not limited to quality of competing elements, expendable elements which boost performance or effectiveness, technological, natural, spiritual or material advantages or any variables which can significantly improve the effectiveness of an action, usually but not limited to, a Primary Element, at the moment of its application, and which may or may not be retainable, and on the example of a six-sided die (or hexahedron) consists of one or more single white "lightning bolt" on a black circle symbols, one or more white "×2" on a black circle symbols, one or more white "×3" on a black circle symbols, or one or more black "Star" on a white circle symbols, wherein such symbols may or may not be replaced by some other form of indicia, on a purple field per side, all oriented identically, and occupying specific sides of the hexahedron relative to one another.

As shown in FIG. 8, the Purple Advantages die 78 preferably includes a black "Star" symbol 80 on a white circle on the first side, a white "×3" (numerical and non-numerical symbol) on a black circle symbol 82 on the second and fifth sides, a white "×2" (numerical and non-numerical symbol) on a black circle symbol 84 on the third and fourth sides, and a white "Lightning Bolt" on a white circle symbol 86 on the sixth side thereof.

Function of the Purple Advantages Symbols

One or more Purple Advantages Dice are allotted to competitors to be used as "Booster" dice, which are normally used once then removed from play and which are usually, but not exclusively, rolled in conjunction with one or more of the Primary Element dice, with the result, if "×2" or "×3", applied as a multiplier to the results, if any, rolled on the respective Primary Element die, so a Red Attack die roll of two "bursts" in conjunction with a Purple Advantages die roll of "×2" would be the equivalent of four "bursts", with the Purple Advantages die then being removed from play as "expended", although a roll of a White Lightning Bolt symbol on a black circle usually, but not exclusively, causes the Purple Advantages die to be expended with no effect, while a roll of a Black Star on a white circle applies an Advantage of "×(variable number value depending on competition being modeled)" and the Purple Advantages die is returned to the competitor to be used again in later dice rolls, which can continue throughout the competition until such time as any roll other than a Black Star on a white circle is rolled.

Basic Game Components

Although a single set of dice may preferably include the following recommended quantities of the Primary and Secondary Element dice, it is not necessary that all dice be used to play a game:
Four (4) White Speed Dice
Four (4) Black Maneuver Dice
Four (4) Red Attack Dice
Four (4) Blue Defense Dice
One (1) Orange Recovery Die
One (1) Yellow Randomization Die
One (1) Green Unpredictability Die
Six (6) Purple Advantages Dice

EXAMPLES OF THE SYSTEM TO MODEL SIMPLE COMPETITIONS

The following Examples use the four Primary Element dice to show how the system represents a conflict as an integration of four dynamics, each affecting the total competitive effort as well as each other.

In its simplest form, the game can be played as a dice rolling game using nothing more than a basic set of Primary Element dice, consisting of one each Speed, Maneuver, Attack and Defense Dice, which will make for a very brief game, but will show the essential elements of dice interaction.

Example I

Fight: A Two-Player Game

Rules
1 Each Player has one each Speed, Maneuver, Attack and Defense die.
2. Each Player rolls all four of their dice simultaneously.
3. The Player who rolled the most Arrows on their Speed Die will apply the result of their Attack die first. If this eliminates the other player, the game is over.
4. If both Players rolled the same value on their Speed die, the results of their Attack dice will be applied simultaneously. This could eliminate both players simultaneously, and result in a draw.
5. The Player who rolled the most Curves on their Maneuver Die will be allowed to re-roll either their Defense Die or their Attack Die, if they wish. They must use the new result.
6. Each "Burst" symbol on a Player's Attack Die indicates a "hit" on his opponent.
7. Each "Shield" symbol on a Player's Defense Die cancels one "hit" which that Player would suffer as a result of his opponent's Attack Die result.
8. A "Yellow Square" result on an Attack Die represents a "Critical Hit" by that Player which cannot be cancelled by a single or double "Shield" result by the other Player.
9. If a Player's Defense Die result shows as many or more "Shield" symbols than their opponent's Attack Die result shows "Burst" symbols, that Player has successfully avoided his opponent's attack, and there is no effect.
10. If a Player's Attack Die result shows more "Burst" symbols than their opponent's Defense Die result shows "Shield" symbols, that Player has "Wounded" his opponent. The opponent must set aside either his Speed Die, or his Maneuver Die or his Defense Die. He will not be able to use them for the rest of the fight.
11. The Player who forces his opponent to lose all three of his Speed, Maneuver and Defense dice wins. Note that it is possible for both Players to achieve this result on the same Turn, resulting in a draw.

For a longer game, each Player is given twenty tokens—coins or beads—representing "Hit Points", or keep track of each Player's "Hit Points" on a piece of scratch paper. Instead of losing a Die to successful Attacks, Players lose a number of "Hit Points" equal to each "Burst" result that is not cancelled by a "Shield". When a Player loses their last "Hit Point", they are defeated.

Example II

For the sake of this Example, and as an aid to visualization of the competition being modeled, we will call this competition a game of "Tag".

Tag: A Two-Player Game

Rules
1. Both players roll a White Speed Die.
The goal is to eliminate at least two (or all) of the opponent's Primary Element Dice before the opponent does the same to you, or eliminate any two of the opponent's Primary Element Dice and escape. For this competition, Maneuver Dice "trump" Speed Dice, so that a roll of two White Curved Arrows is superior to a roll of two Black Straight Arrows, when those two types of dice are rolled against each other during the Movement Phase.

Turn One

1. Player 1 rolls one White Speed Die, with a result of three (3) Black Straight Arrows. Player 2 rolls one Speed Die, with results of two Black Straight Arrows. Player 1 has more Speed (3>2) and "catches" Player 2. If Player 1 wins or ties the "Maneuver" rolls, he will have "gained the initiative".

2. Player 1 now rolls 1 Black Maneuver Die, with a result of one (1) White Curved Arrow. Player 2 rolls one Black Maneuver Die, with a result of two (2) White Curved Arrows. In our game of "tag", Maneuver is considered to be superior to Speed, so even though Player 1 was "faster", Player 2 "outmaneuvered" him (2>1), and Player 2 has "gained the initiative", which means he will get to "attack" ("tag") Player 1 first, and apply the results, before Player 1 can respond.

3. Because he has "gained the initiative", Player 2 may conduct his "attacks" first, and rolls his Red Attack die against Player 1; he rolls two "Bursts". Player 1 rolls his Blue Defense die and rolls one "Shield", allowing him to cancel out one of Player 2's "bursts"; the other takes effect and Player 1 must lose one of his Dice. He chooses to lose his White Speed die. This means he cannot now "escape" from Player 2, but he could still "outmaneuver" him.

4. Now it is Player 1's turn to attack, and he rolls his Red Attack die and gets a Yellow Square. Normally, this would entitle him to roll the Yellow Randomization die and Player 2 would not be allowed to roll any Blue Defense dice in response, but for this simple learning exercise, the Yellow Square result will force Player 2 to lose a die of Player 1's choosing. Player 1 takes Player 2's Black Maneuver die.

5. With a round of Movement and Combat completed, this concludes the first Turn.

Turn Two

6. At the start of the second Turn, Player 1 rolls his Black Maneuver Die (he no longer has a White Speed die) and Player 2 rolls his White Speed Die (he no longer has a Black maneuver Die). Player 1 rolls White Curved Arrows and Player 2 rolls two Black Straight Arrows. Since Player 2's Speed Die exceeded Player 1's Maneuver Die, Player 2 may opt to "escape", but since he has only eliminated one of Player 1's Dice, this would result in a draw. He considers that if he does not declare he will "escape", Player 1's Maneuver Die roll of two White Curved Arrows "trumps" Player 2's Speed roll of two Black Straight Arrows, meaning Player 1 will get to try to "tag" (attack) him first, but he decides to tough it out and stays for another round.

Example III

Jet Fighter Combat Game

The following is an application of the System to play a game depicting an engagement between two jet aircrafts (FIGS. 9-34).

The engagement will preferably be played out on a board 88 divided into hexagons 90, between two fictional modern jet aircraft, each equipped with gun and missiles. One jet will be Red, the other Blue. Each jet will preferably have the following capabilities:

Four White Speed Dice (10)
Two Black Maneuver Dice (18)
Four Red Attack Dice (28)
Three Blue Defense Dice (38)
One Orange Repair Die (46)
Two Purple Bonus Dice (78)
One Yellow Critical Hit Die (52)
One Green Fortune Die (66)

Figure 9:
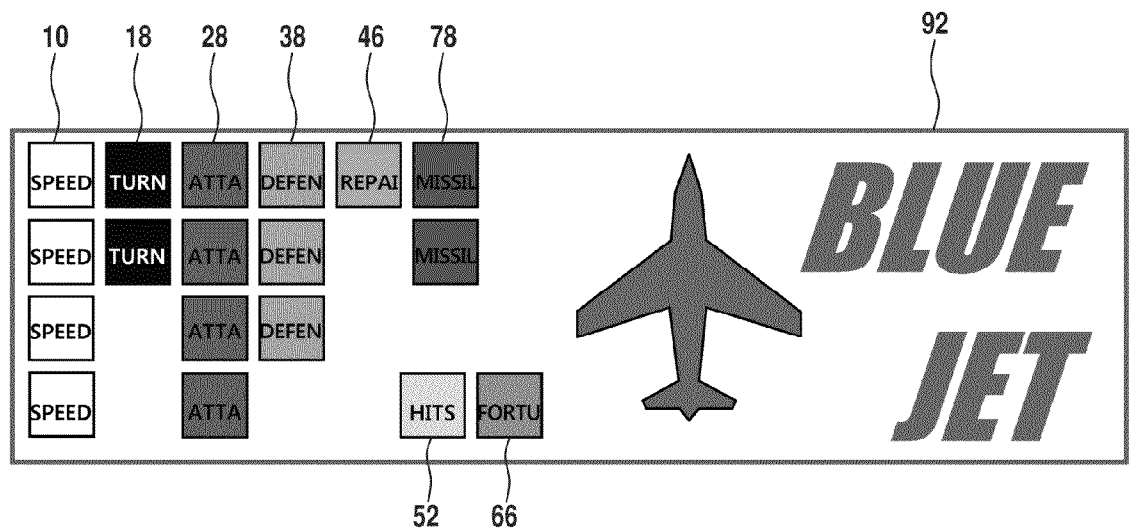
FIGS. 9-11 illustrate the starting set-up of an example Jet Fighter combat game between two players.
Figure 10:
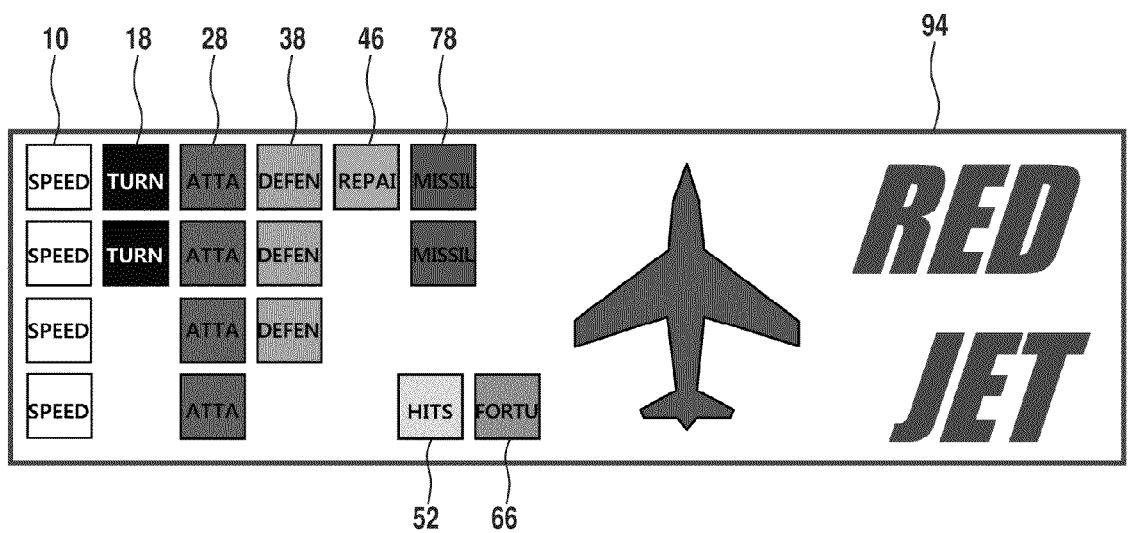

A display card (92, 94) for each jet will be used to keep track of damage and expended dice, as shown in FIGS. 9-10.

Rules

1. The game is played on the board preferably divided into hexagons called spaces. Jets must always be positioned to face one side of the space they occupy; if such facing is unclear at the start of the opposing player's portion of the Game Turn, the opposing player will correct the facing.

2. Each player controls one Jet, either the Red Jet or the Blue Jet.

3. Jets must roll at least one White Speed Die every Game Turn. Each Jet must use the full value of at least one Speed Die result each Game Turn.

4. Jets are armed with guns and missiles. Both weapons preferably have a maximum range of eight spaces. (This range is variable.) A Jet which is in position to attack a single target with both guns and missiles may declare its attack to be either or both, but must expend at least one Purple Bonus Die to represent its missile attack. Red Attack Dice which are modified by Purple Bonus Dice are always considered to be Missile attacks.

5. Guns fire in a straight line directly in front of the Jet. Missiles fire into any space in a 60 degree "cone" spreading out from the front of the Jet.

6. The Green Fortune Die will be rolled each Turn to determine which jet moves first that Turn. In this game, "Bad Weather" is inferior to "Good Weather" when comparing die roll results, for example a result of "Clouds with Rain" is superior to a result of "Storm", while "Balanced Scales" are superior to both "Bad Weather" results and inferior to both "Good Weather" results. In this game, any tied Green Fortune Die rolls are automatically won by the Blue Jet player.

6a. In this game, the Green Fortune Die represents each Jet Pilot's "Luck". Once per game, a player can declare his Pilot will "Push His Luck" by committing his Green Fortune Die to certain tasks. Whatever the outcome, the Green Fortune Die is permanently removed from play. The first Pilot to "Push His Luck" will automatically lose the Initiative for any remaining Turns, that is, his opponent will decide which of the players moves first. This will hold true even if the second player later "Pushes His Luck" and also loses his Green Fortune Die.

7. A Jet which loses all of its White Speed Dice is considered destroyed. A Jet which loses all of its Red Attack Dice, Blue Defense Dice and Black Turn Dice, or which leaves the map at any time, will be considered to have lost the game.

Victory Conditions

Destroy or drive off the enemy Jet.

Game Map and Starting Positions

Figure 11:
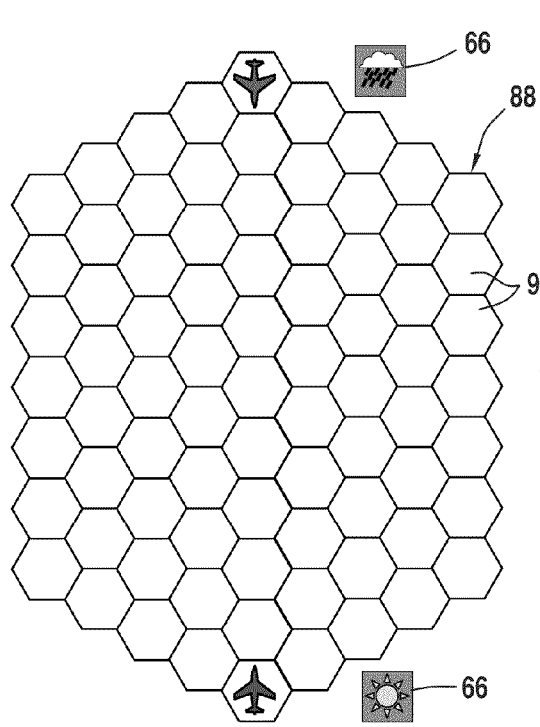

As noted above, the bard 88 used for this game will be divided into hexagons 90 to regulate movement, facing and arcs of fire. Blue Jet and Red Jet start at opposite ends of the board (FIG. 11).

Turn One

The Green Fortune Die will be used to determine Initiative, or which player moves first, at the start of each Turn. To reflect a technological advantage, tied results will be considered to be won by the Blue Jet player.

Each player rolls their Green Fortune Die; the Red Jet player rolls Sun; the Blue Jet player rolls Rain, so the Red Jet player has won and holds the initiative. He may move first or require the Blue Jet player to commit himself first to his movement.

No missiles may be fired on the first Turn, so Red Jet decides to make the Blue Jet player move first.

Figure 12:
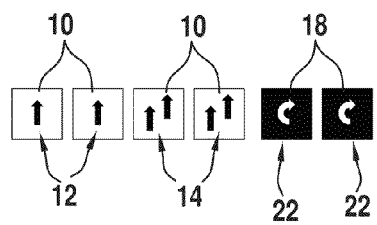

Blue Jet decides to use all of his Speed Dice and both of his Maneuver Dice; he must roll all of both types of Dice at once. He rolls four White Speed Dice and two Black Maneuver Dice and gets the result as shown in FIG. 12.

Not all Dice must be used, but if any Die result is used, then the full value of that result must be used. If the Blue Jet player wishes to move only two spaces, he may discard all but one of the double arrow dice, but if he uses both double arrow dice, he must move four spaces. For Jet Combat, a Player may not use any Black Maneuver Die unless he has used at least one White Movement Die first. The Blue Jet player wants to get around behind the Red Jet, so he uses his dice result as shown in FIG. 13.

Figure 13:
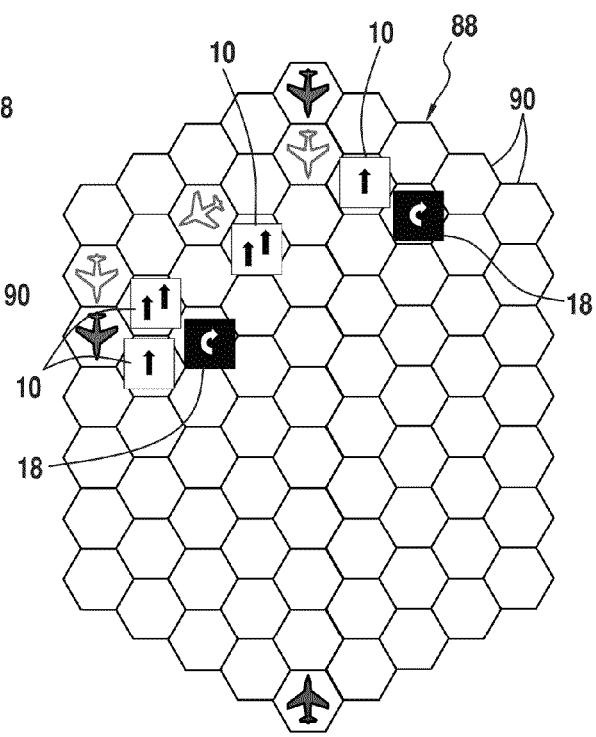
FIGS. 12-34 illustrate various sequential steps taken by the two players of the Jet Fighter combat game.

Specifically, as shown in FIG. 13, Blue Jet uses one Speed arrow to move forward one space, uses one Turn to change facing by one side of the hexagon to the right, uses two Speed double arrows to move four spaces, uses last Turn to change facing by one side of the hexagon to the left, uses last Speed arrow to move forward one space.)

In this jet Combat game, fighters may attack each other if their target is:

1. Within eight hexagons, or spaces, including the space of the target jet, but not the space of the attacking jet, and directly in front of the attacking Jet;

2. If attacking with Missiles, the target must be within eight hexagons, or spaces, including the space of the target jet, but not the space of the attacking jet, and within a 60 degree arc in front of the attacking jet.

Fighters attack with all their Red Attack Dice if the range to their target is four spaces or less, or half their Red Attack Dice if the range is five to eight (spaces). They may not attack a target that is more than eight spaces away.

Figure 14:
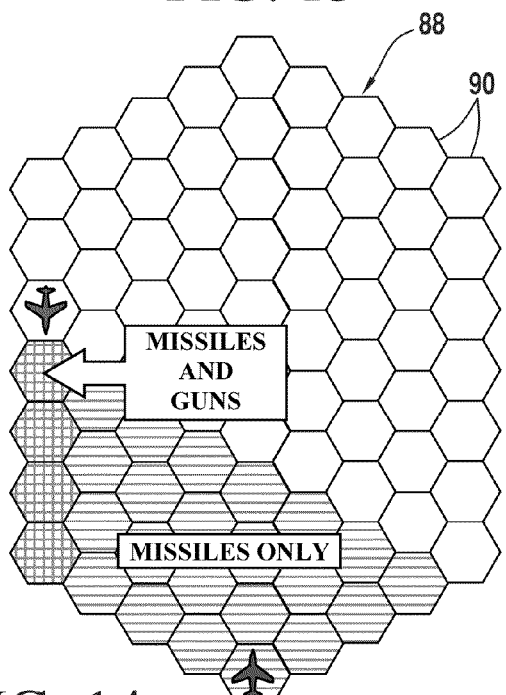

As shown in FIG. 14, Blue Jet is not lined up to use his Guns against Red Jet. However, Red Jet is in the arc of fire for Blue Jet's Missiles. Counting the spaces from Blue Jet to Red Jet, the range is eight spaces, just within range for Blue Jet to attack. Since it is more than four spaces, Blue jet may only use half his Attack Dice, or two Red Attack Dice.

Missiles are expended when fired, but can be very powerful; this is depicted in the Jet Combat Game by using Bonus Dice to represent Missiles. If the Blue Jet player wishes to attack the Red Jet, he can only do so with Missiles because of Red Jet being out of the line of fire of his guns, meaning Blue Jet will have to expend one or both of his Bonus Dice to make the attack. The Blue Jet player decides to fire one Missile. This means he will roll two, or half, of his Red Attack Dice, and one of his Purple Bonus Dice, representing the missile being fired.

Figure 15:
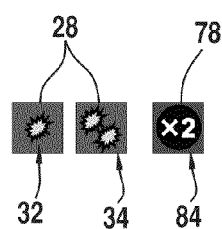

Blue Jet Rolls two Red Attack Dice (28) and one Purple Bonus Die (78), with the result shown in FIG. 15.

Since this is a Missile Attack, only Attack Dice that are modified by Bonus dice are counted. The Blue Jet player discards the single hit attack die result and applies the Bonus Die multiplier to the double-hit attack die; the Blue Jet's Missile Attack has therefore achieved a result of four possible hits—a double hit Attack multiplied by two—on the Red Jet.

The Blue Jet player retrieves his Red Attack Dice, but the Purple Bonus Die is permanently removed from play.

As shown in FIG. 14, Blue Jet is not lined up for a Guns attack on Red Jet, but Red Jet is in the extreme range—eight spaces—of Blue Jet's Missile Attack arc of fire. Blue Jet's player declares a Missile Attack on Red Jet, using half his Red Attack Dice because of the range, and expending one Purple Bonus Die, representing a Missile Attack.

Figure 16:
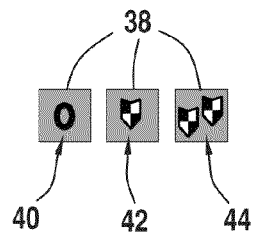

Red Jet's player now has a chance to avoid the damage from Blue Jet player's Missile Attack. He rolls all three of his Blue Defense Dice. In a Jet Combat game, these could be taken to represent evasive maneuvers, electronic countermeasures, a heavily-armored fuselage or any number of variables. Red Jet rolls his Blue Defense Dice (38) and gets the result as shown in FIG. 16.

Red Jet rolls three Shield. Each Shield negates one Hit. Since Blue Jet's Missile Attack achieved four Hits, Red Jet's Defense Dice roll has cancelled all but one. The Red Jet player manages to avoid most, but not all, of the damage from Blue Jet's Missile Attack.

To represent the damage his jet has suffered, the Red Jet player must choose one of his Primary Element Dice to discard. He decides to give up one of his White Speed Dice, and sets it aside. It will not be used for the rest of the game unless he can restore it with a Repair Die Roll at the beginning of a future Turn.

Blue Jet has completed all his Movement and Attacks; it is now Red Jet's move.

Figure 17:
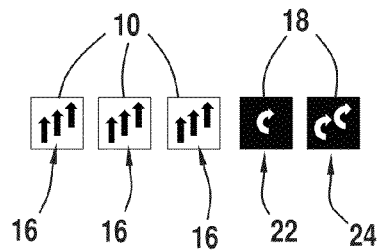

Like Blue Jet, Red Jet decides to use all of his Speed and Maneuver Dice. His Speed Dice pool has been reduced from four dice to three dice due to damage from Blue Jet's Missile Attack, so Red Jet rolls three White Speed Dice (10) and two Black Maneuver Dice (18), with the result as shown in FIG. 17.

Figure 18:
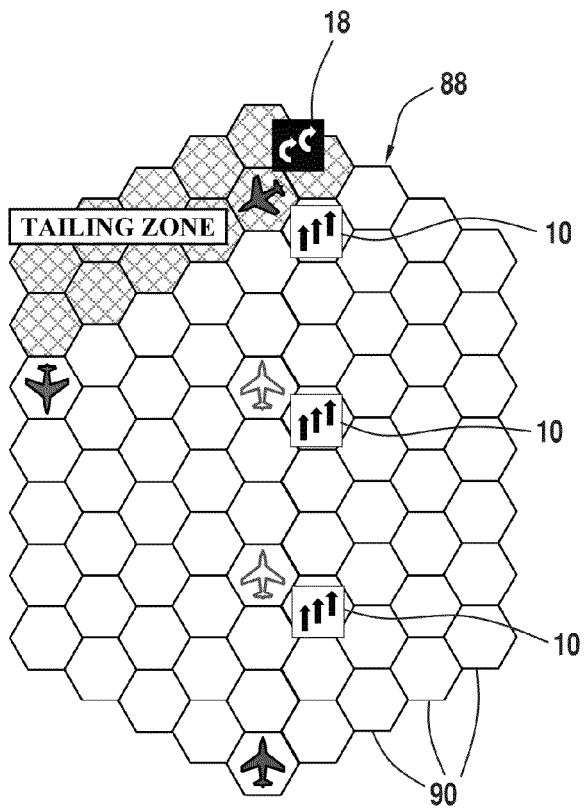

This is an optimal result for Red Jet, as can be seen by its move as shown in FIG. 18.

Red Jet uses all of its Speed Dice to get in behind Blue Jet, thus achieving a "Tailing" position for the next Turn. Red Jet is able to reach this position by playing all of its Speed Dice to move forward a total of nine (9) spaces before using its Double Turn to make a tight turn to the left. It discards its single Turn without using it.

Figure 19:
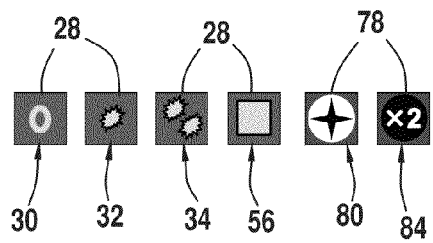

It is now Red Jet's turn to Attack. In this game jets can attack with either Guns or Missiles, but not both in the same turn. The Red Jet player decides to fire both of his Missiles in hopes of destroying Blue Jet outright. Since he is within four spaces of his target, he rolls all four of his Red Attack Dice (28), and since he is firing all of his missiles, he rolls both of his Purple Bonus Dice (78), as well, with the result as shown in FIG. 19.

This is a potentially devastating attack, as Red Jet player has rolled two very potent "special effects".

As shown in FIG. 18, Red Jet uses its high Speed and a tight Turn roll to line up a straight shot for Guns. Note that it uses its two White Turn arrows to bring it around two space sides in one space; it could not have made this turn with the single White Turn die roll, so it does not use it, and it could not have used only one of the White Turns arrows; if any symbols on a die face are used, all must be used.

Red Jet's Attack Dice roll has achieved one Miss, one Single Hit, one Double Hit, and one "Critical Hit", represented by the large Yellow Square. In addition, Red Jet's Missile attack has scored one "×2" Bonus Die result and one "Black Star" Bonus Die result. In this game, the "Black Star" result is equal to a "×3" result, but since it is a "Black Star", instead of being discarded, this Bonus Die is returned to the Red Jet player's pool. He can use this Bonus Die again for another Missile Attack on a subsequent Turn, and if he rolls another "Black Star", he will retain it then, too. In fact, he may continue to retain and re-use it for as long as he continues to roll a "Black Star" result.

Since a Bonus Die may only be applied to one Red Attack Die, the Red Jet player applies the "×2" Bonus Die to the Red Double Hit result, which, combined with the Single Hit Red Attack Die result, makes a total of five hits on the Blue Jet. The Red Jet player applies the "Black Star/×3" result to the Yellow Square Critical Hit Die result, which means the Blue Jet will take three Critical Hit results which will be rolled for by the Red Jet player. This is especially dangerous for the Blue Jet, since Defensive Dice results cannot be used to negate Critical Hits.

Figure 20:
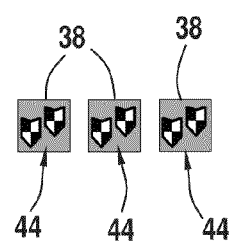

The Blue Jet player rolls his Blue Defense Dice (38) and gets an excellent result; three Double Shields, which negates up to six of Red Jet's Red Attack Dice hits (FIG. 20).

Even with the "×2" Bonus Die raising Red Jet's total hits to five (5), Blue Jet's Defensive Dice result has negated every normal hit result achieved by Red Jet. However, as stated above, Defensive Dice have no effect on Yellow Square "Critical Hit" results, and Red Jet's "Black Star/×3" result has inflicted three such hits on Blue Jet.

Figure 21:
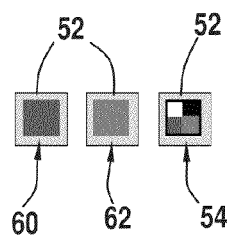

To determine the nature of the three Critical Hits which Red Jet inflicted on Blue Jet, Red Jet's player rolls his Yellow Randomization Die (52) once for each of the three Critical Hits he has inflicted on Blue Jet. The result, in order, is shown in FIG. 21.

The Red Square indicates that Blue Jet loses one of its Red Attack Dice; the Blue Square indicates that Blue Jet loses one of its Blue Defense Dice; the four-color square indicates that the Blue Jet must lose a White Speed Die, a Black Turn Die, a Red Attack Die or a Blue Defense Die, as determined by the Red Jet player.

Note that, unlike a normal Red Attack Die hit result, the Blue Jet player cannot choose which of his Primary Element Dice he loses to an attack; the Yellow Randomization Die used in Critical Hit resolution determines which Primary Element Die he loses for each Critical Hit suffered. In this case, after seeing that the Critical Hits he has rolled on Blue Jet have caused it to lose one Red Attack Die and one Blue Defense Die, the Red Jet player decides to use the four-color roll to force the Blue Jet player to lose an additional Blue Defense Die. This will leave Blue Jet extremely vulnerable to Red Jet's next attack.

As the last action in the Turn, both players each declare a damaged system and simultaneously roll their Orange Recovery Die. A roll of "0" is "No Effect", while a roll showing the "Tools" symbol indicates they have Repaired (or "Recovered") the destroyed system, and may return the declared Die to their Dice Pool.

Red Jet has only lost one White Speed Die; its player rolls and gets a "0", so this damage remains. Blue Jet has lost one Red Attack Die and two Blue Defense Dice; its player declares he will try to recover some of his defensive capability. He rolls a "Tools" symbol and returns one of his lost Blue Defense Dice to his Dice Pool.

Figure 22:
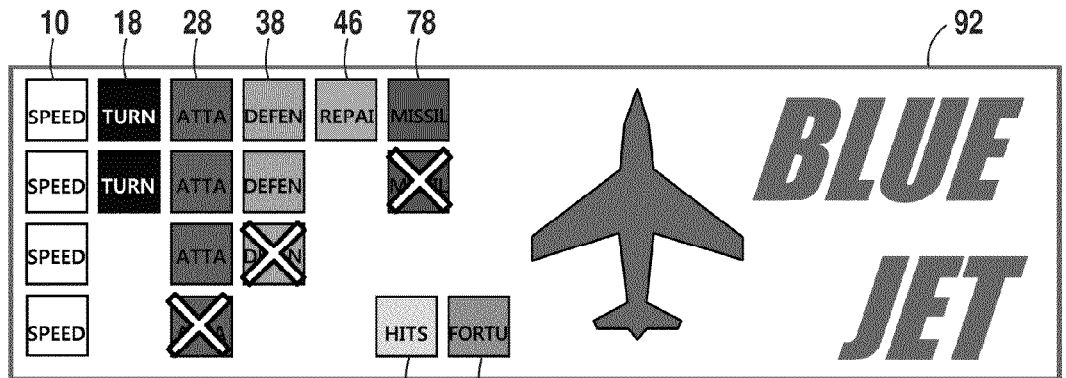
Figure 23:
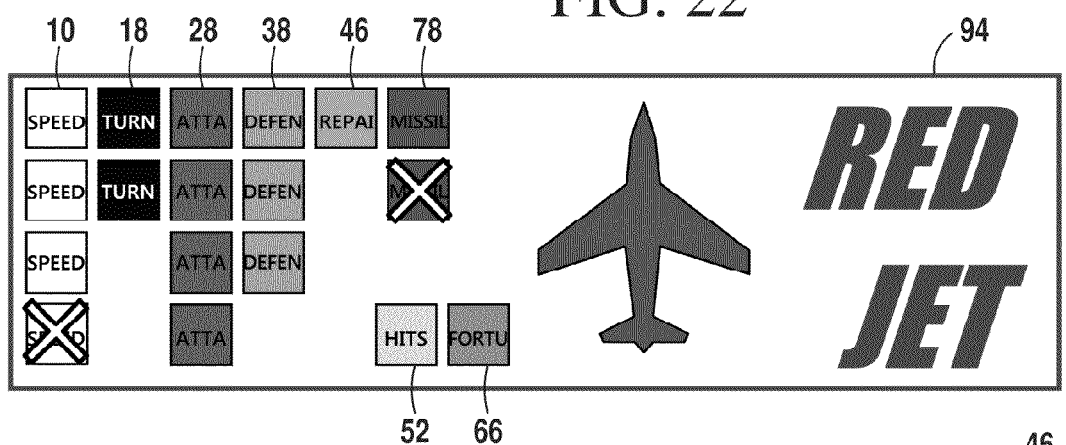

At the end of Turn One, the status sheets for the two jets look like as shown in FIGS. 22-23.

Turn Two

At the beginning of each Turn after the first, each player may try to Repair damage to his aircraft using the Orange Repair Die. Therefore, the Blue Jet player's first action this Turn is to use his Orange Repair die to try to recover one of his lost systems. He must declare which system he is trying to recover before he rolls. He cannot recover his expended Missile, as these are represented by Purple Bonus dice which, once used, are permanently expended.

Figure 24:
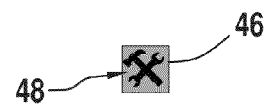
Figure 25:
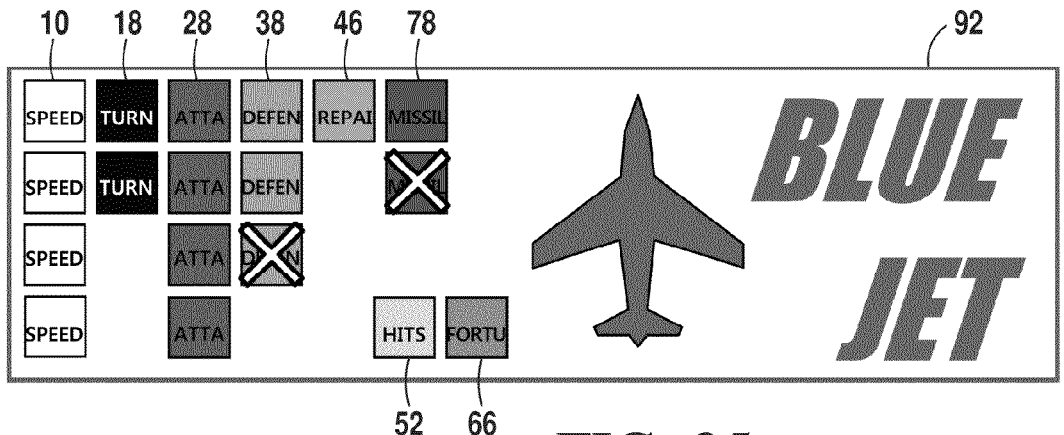

Blue Jet's player declares he will try to recover one of his lost Red Attack Dice and rolls as shown in FIG. 24. The Tools Symbol indicates Blue Jet has recovered the system rolled for, and Blue Jet gets back his lost Red Attack Die to use on this and future Turns (unless and until it is lost again and he fails to Repair it). Blue Jet's status sheet now looks like as shown in FIG. 25.

Turn Two: Initiative, Movement and Tailing

On Turn One, the Green Fortune Die was rolled to determine Initiative, or which player moves first, at the start of the Turn. However, Turn Two begins with Red Jet in a Tailing Position on Blue Jet. This means that Red Jet is behind Blue Jet and can see his maneuvers as he makes them, making it easy to stay behind Blue Jet.

This is the most powerful tactical position in aerial combat, and to reflect the advantage it gives, the following rules are in effect:

The Tailing Jet (in this case, the Red Jet) automatically wins Initiative for any Turn in which it is Tailing its opponent, and will usually force the Tailed Jet to move First.

After a Tailed jet has rolled all of its Speed and Maneuver Dice, the Tailing Jet rolls its own Speed and Maneuver Dice. If the Tailing Jet rolls More Speed Arrows or Turn Arrows on all of its dice combined as the Tailed Jet, the Tailed Jet is moved first, then the Tailing Jet is placed behind the Tailed Jet, anywhere within the Tailing Zone, at the same range as before the move. This constitutes the Tailing Jet's movement and Maneuver for the Turn.

Figure 26:
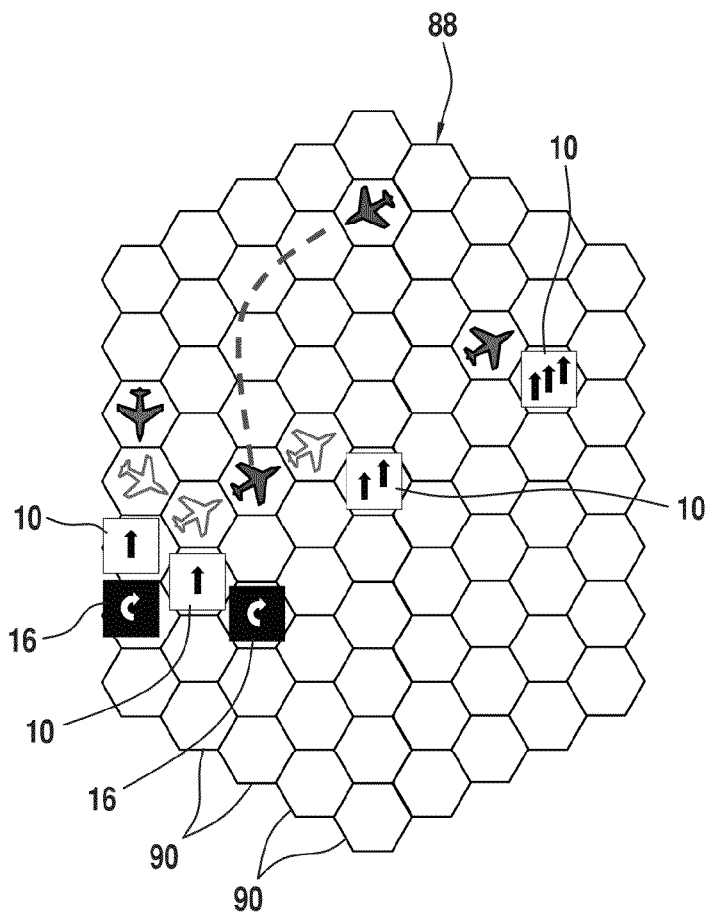

If the Tailing Jet rolled more Speed Arrows than the tailed Jet, the Tailing Jet may "close the range" to the Tailed Jet by ending its Tailing Move as many spaces closer to the Tailed Jet as it wishes, as shown in FIG. 26.

Figure 27:
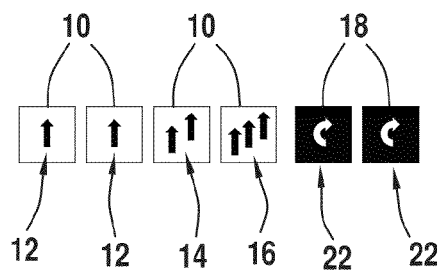

The Blue Tailed Jet rolls its Speed (10) and Maneuver Dice (18) and gets the result as shown in FIG. 27.

Figure 28:
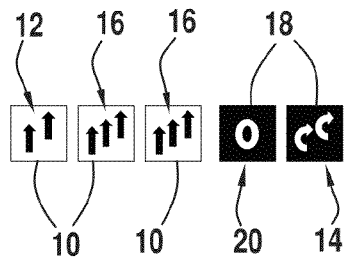

The Red Tailing Jet rolls its Speed (10) and Maneuver Dice (18) and gets the result as shown in FIG. 28.

The Blue (Tailed) Jet Rolled a total of seven Speed Arrows and two Turn Arrows, while the Red (Tailing) Jet rolled a total of eight Speed Arrows and two Turn Arrows.

The Red Jet failed to exceed the Blue Jet's TURNS, and almost lost the tailing position, but the Blue Jet was slightly slower than the Red Jet, so the Red Jet maintains its Tailing position on the Blue Jet's rear. Since it rolled one more Speed Arrow than the Blue Jet, the Red Jet may put itself one space closer to the Tailed Jet at the end of Movement, which will allow it a better attack because of the increased number of Red Attack Dice it may use at the shorter range.

The Red Jet player decides to try to finish off the Blue Jet and declares he will make a Missiles attack using all four of the Red Jet's Red Attack Dice and his remaining Purple Bonus Die.

As shown in FIG. 26, Red Jet maintains its Tailing position on Blue Jet, and so is placed anywhere in Blue Jet's Tailing Zone at the same range it was at before Movement. Since it rolled one more Speed Arrow than Blue Jet, Red Jet closes the range by one space, bringing Blue Jet into a range of four spaces, allowing Red Jet to use the maximum number of its Red Attack Dice. Even if the Blue Jet survives, Red Jet will still be Tailing it next Turn.

Figure 29:
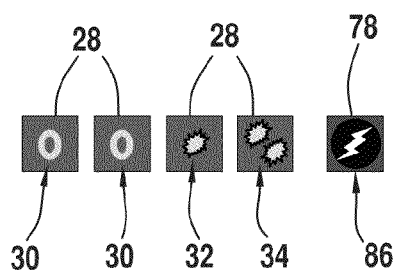

Red Jet's player rolls all four Red Attack Dice (28) along with his remaining Purple Bonus Die (78) and gets the result as shown in FIG. 29.

Figure 30:
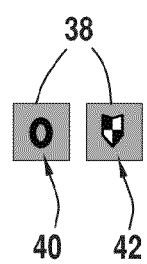

This roll is as bad as Red Jet's first roll was good. Two of the Red Attack Dice are "zeroes". Meaning they miss completely. One is a Single Hit and the other is a Double Hit, but his Purple Bonus Die is a White Lightning Bolt on a Black Field. This is the worst possible roll on a Purple Bonus Die. The Black Field means the die is permanently discarded, just as if it had provided a positive multiplier, but the White Lightning Bolt means the attack it was used for is a critical failure, such as a jammed Gun or, in this case, a "dud" Missile. The effect is that the highest value Red Attack Die result—in this case, the Double Hit—is cancelled. For all his effort, Red Jet's player has managed to inflict only a Single Hit result on the Blue Jet. Blue Jet rolls his Blue Defense Dice (38) and gets a Shield, negating the one hit the Red Jet player achieved (FIG. 30).

The Red Jet is still on the Blue Jet's tail as we go into Turn Three.

Turn Three: Pushing One's Luck

At this point in the game, although the Blue Jet has lost a third of its defensive abilities, thanks to a lucky Repair roll, its Red Attack dice are equal to those of the Red Jet, it still has one Purple Bonus Die, and it retains a slight advantage in speed. In jet fighter combat, speed is often the decisive factor.

Red Jet has a Tailing advantage, thus winning the Initiative automatically, and declares that Blue Jet will move first again this Turn.

Blue Jet's player believes he will not survive another Tailing attack from Red Jet and decides to try something drastic. Before rolling for Movement to attempt to break Red Jet's Tailing advantage, Blue declares he is going to "Push his Luck".

In this game, "Pushing One's Luck" consists of using the Green Fortune Die as a special kind of Bonus die by adding it to any one die roll. NOTE: Whatever the result of "Pushing One's Luck", whether good or bad, the Green Fortune Die of the player who does so is permanently removed from play; it cannot be recovered by Repair Rolls. Once a player has used the Green Fortune Die for this purpose, he has "run out of luck".

The results of "Pushing One's Luck" are resolved according to the symbols rolled on the Green Fortune Die. "Balanced Scales" results have no effect, while "Bad Weather" results force the player to discard the Green Fortune Die, losing it for the remainder of the game, and thus permanently surrendering the Initiative to his opponent with no benefit to show for it.

However, a result of "Good Weather" (Sun with Cloud) allows the player who has "Pushed his Luck" to declare the result of any one die in the pool the Green Fortune Die is rolled with, to be any result the player wishes, and a result of "Excellent Weather" (Sun Only) allows the player who has "Pushed his Luck" to do the same with any two dice in the pool the Green Fortune Die is rolled with. Note that no matter what colors the Dice are, any time dice are rolled together, as is the case with White Speed dice and Black Maneuver dice, all dice rolled together are considered part of a single pool of dice.

Therefore, in this Jet Combat game, even though Speed Dice and Maneuver Dice are different colors, "Pushing One's Luck" allows a successful roll to modify either White Speed Dice or Black Maneuver Dice, or both. This would also be true if a player "Pushed His Luck" by rolling the Green Fortune Die with a Missiles attack using Red Attack Dice and Purple Bonus Dice.

Figure 31:
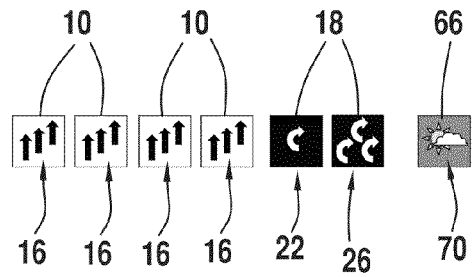

The Blue Jet player declares he will "Push His Luck" during his Movement, allowing him to potentially change the results on his White Speed and/or his Black Maneuver Dice. He rolls his four White Speed Dice (10), two Black Maneuver Dice (18) and his Green Fortune Die (66) all together, with the result as shown in FIG. 31.

This roll is actually too good. Remember that in this Jet Combat game:

Jets must always use at least one White Speed Die;
Jets must use a White Speed Die before they can use a Black Turn Die, and;
If any Die is used, all the symbols rolled on that Die must be used.

Since Blue Jet's player has rolled four Speed Dice all with values of Triple Speed Arrows, using any one of them will carry his Jet off the edge of the map, resulting in a Red Jet victory.

However, because he "Pushed His Luck", the Blue Jet player's Green Fortune Die roll result will save him. He uses the "Good Weather" result to change one of the Triple White Speed Arrows to a Single Speed Arrow.

Now that Blue Jet's Movement and Turn rolls are completed, Red Jet must roll his White Speed Dice and Black Maneuver Dice to maintain his Tailing position. He, too, could elect to "Push His Luck", but seeing Blue Jet's dice rolls, he knows he cannot equal Blue Jet's Speed roll with only three White Speed Dice of his own.

Even if the Red Jet player were able to change all of his White Speed Dice results to Triple Speed Arrow results, Blue Jet would still be faster by one Speed Arrow, meaning that the Blue Jet is assured of breaking Red Jet's Tailing advantage. The Red Jet's player decides to save his Green Fortune Die.

Figure 32:
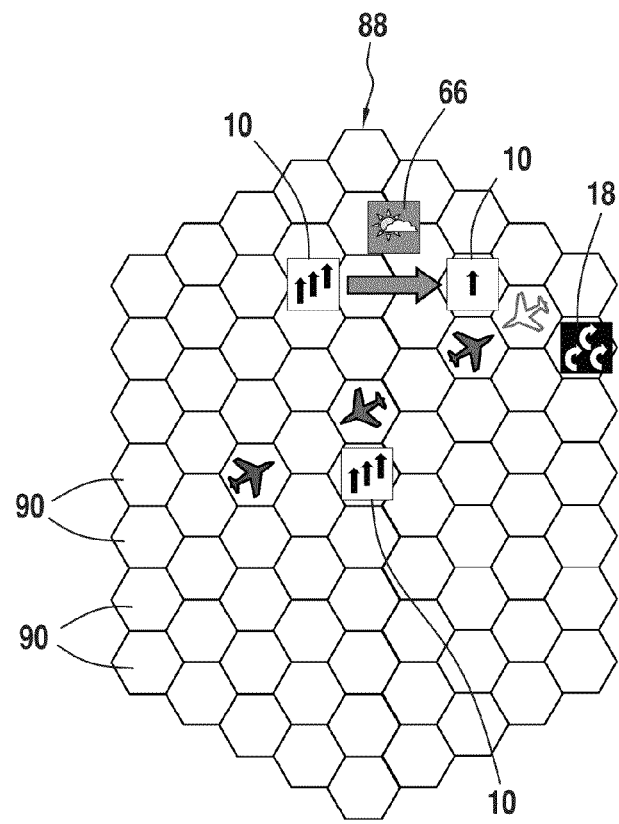
Figures 5, 6, 7, 8:
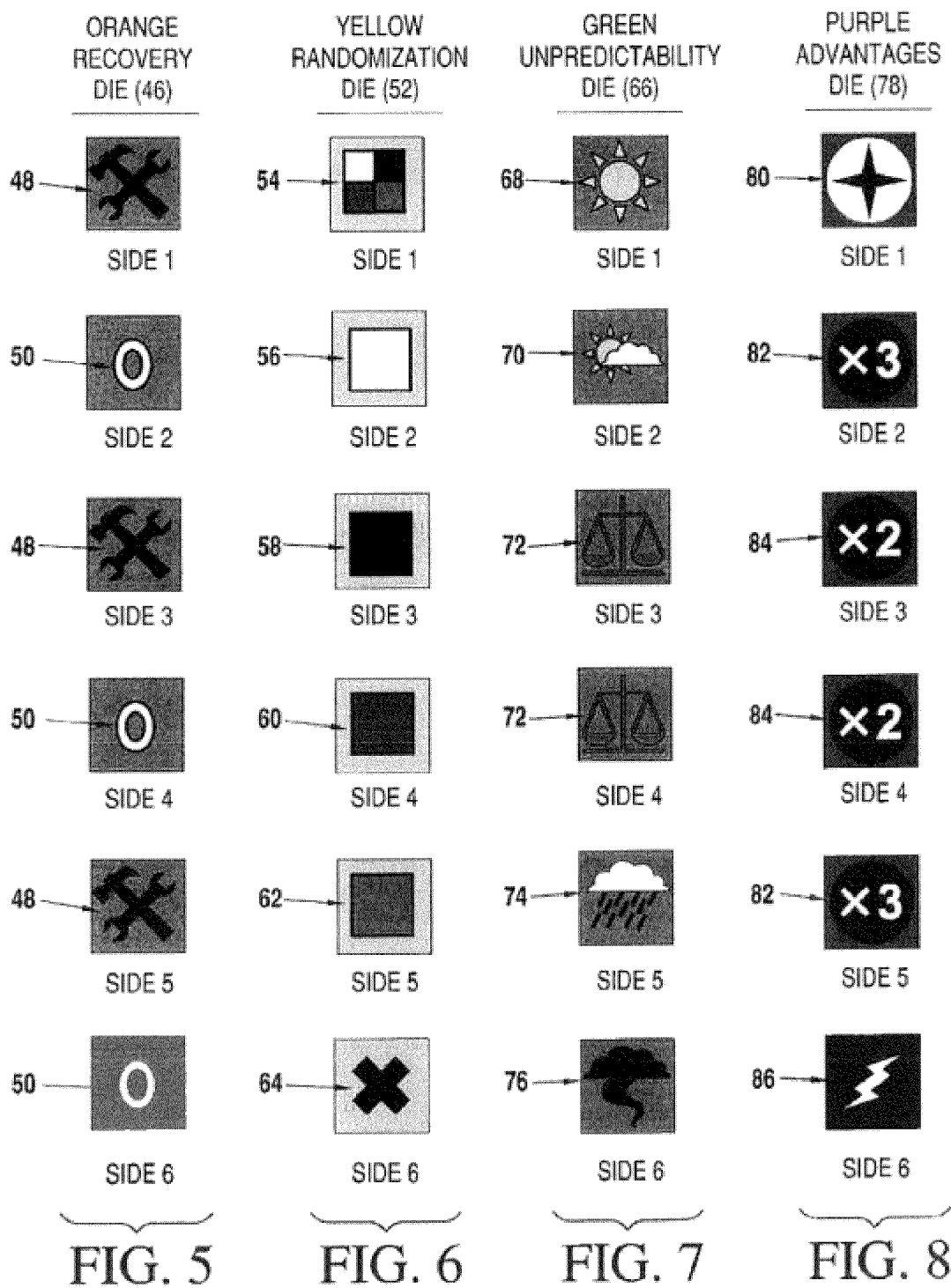
Figure 9:
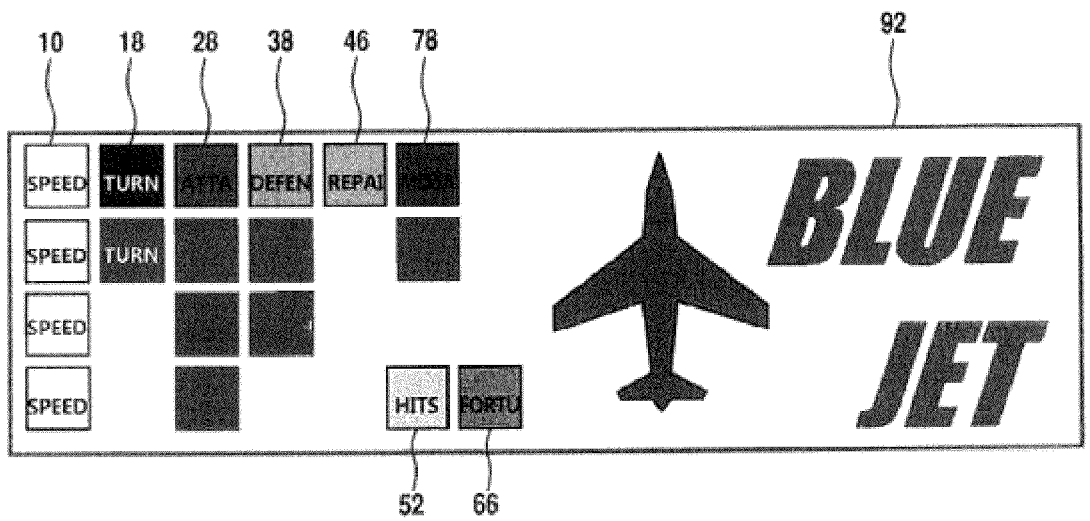
Figure 10:
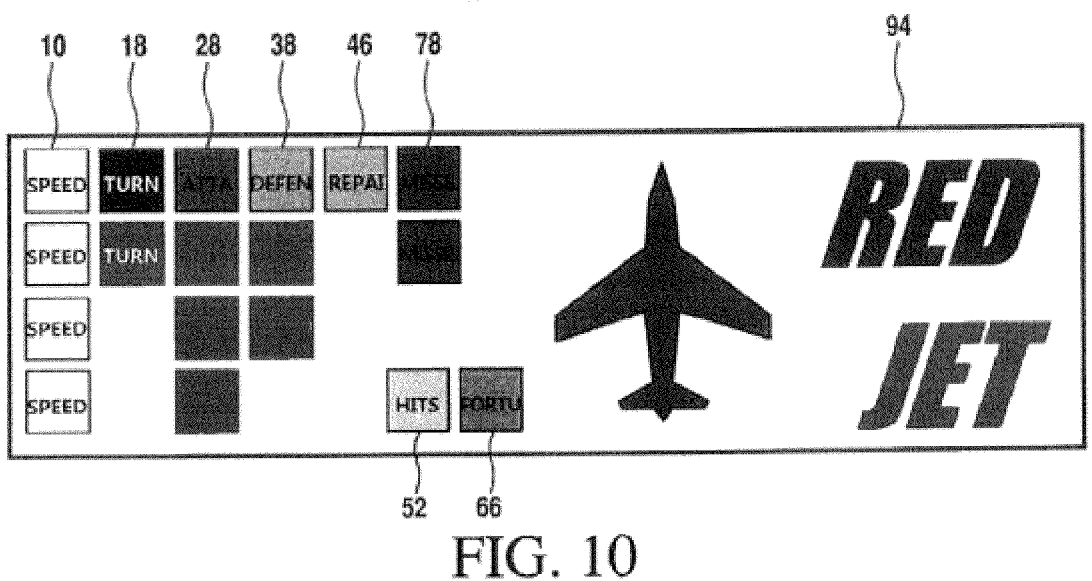
Figure 11:
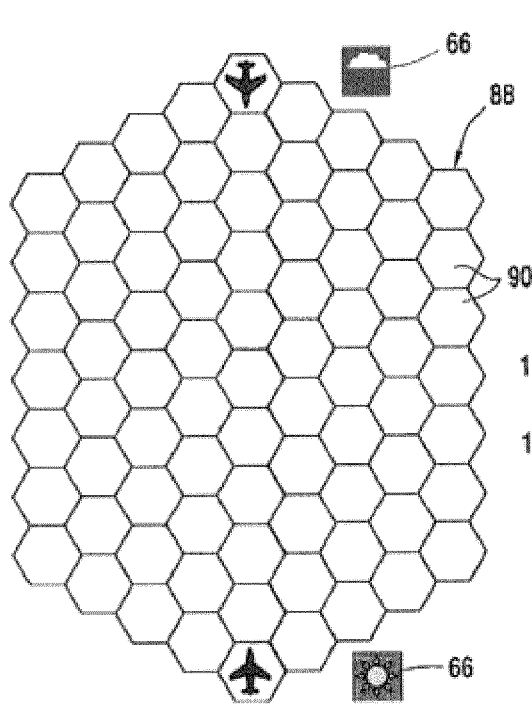
Figure 13:
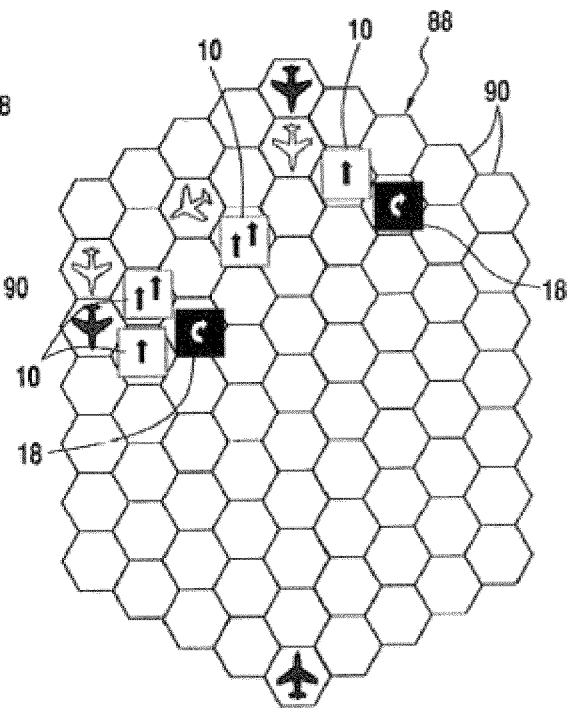
Figure 12:
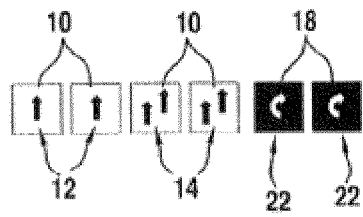
Figure 15:
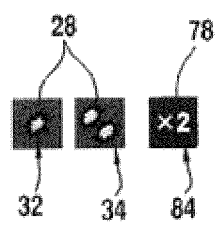
Figure 14:
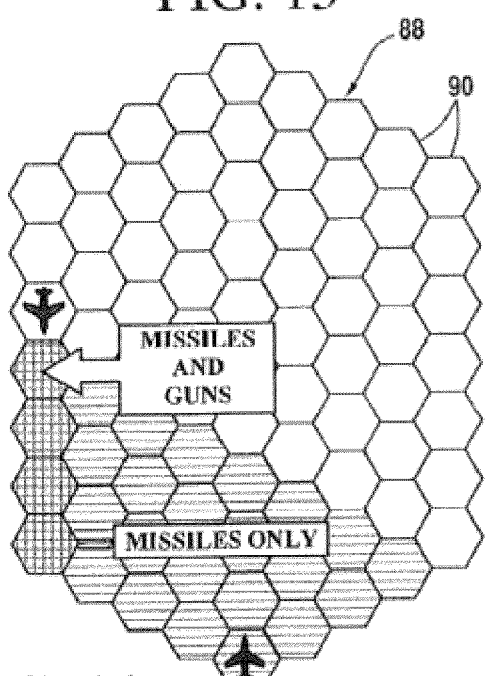
Figure 16:
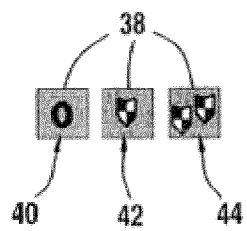
Figure 17:
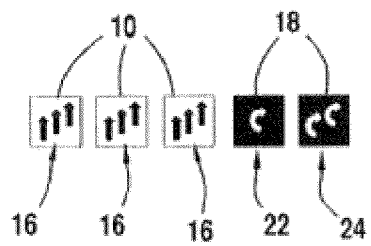
Figure 18:
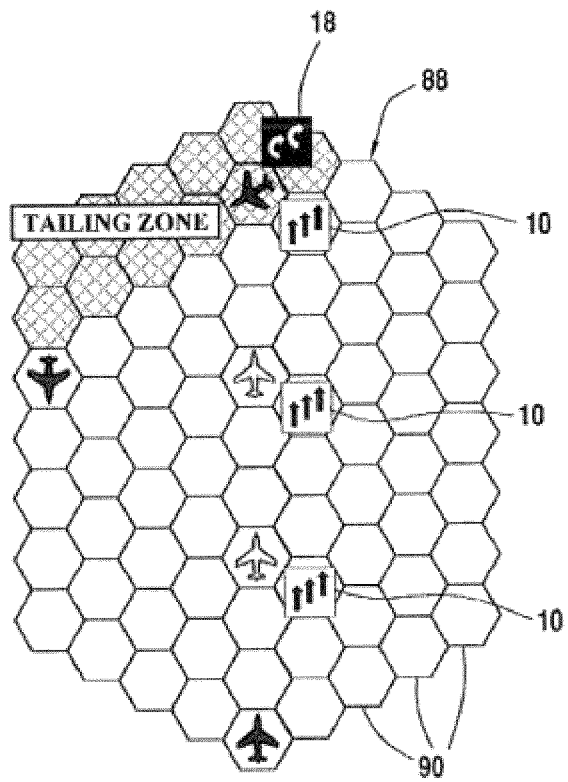
Figure 19:
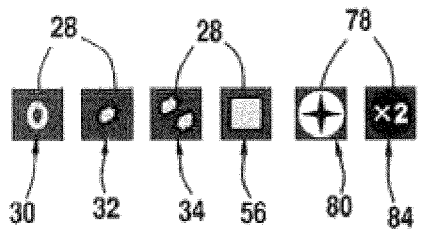
Figure 20:
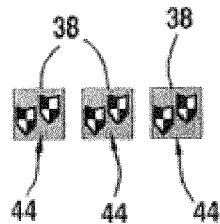
Figure 21:
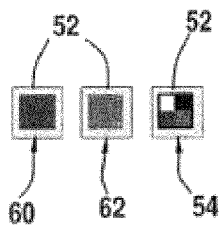
Figure 22:
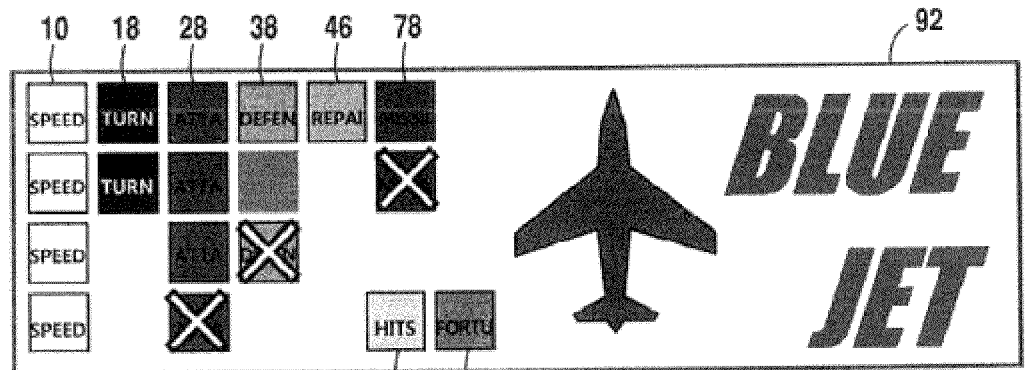
Figure 23:
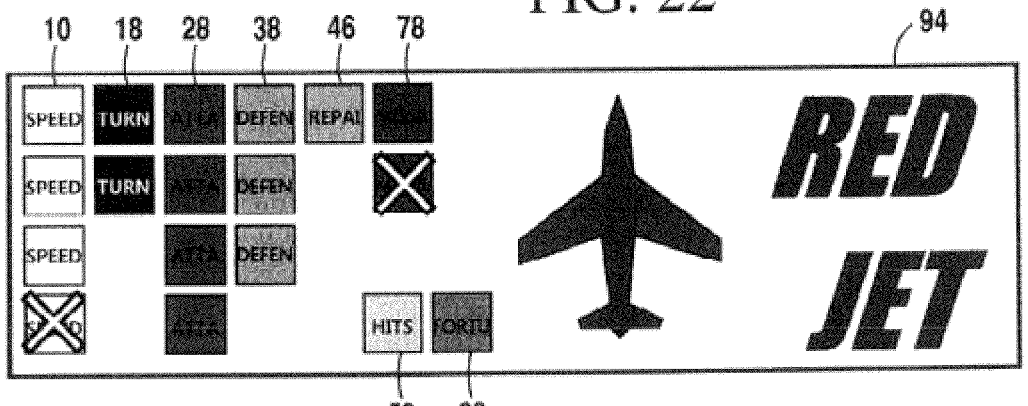
Figure 24:
Figure 25:
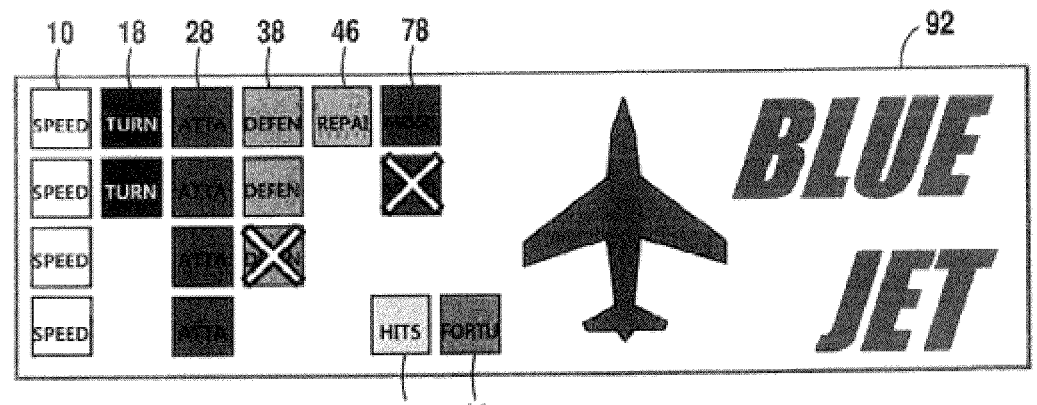
Figure 27:
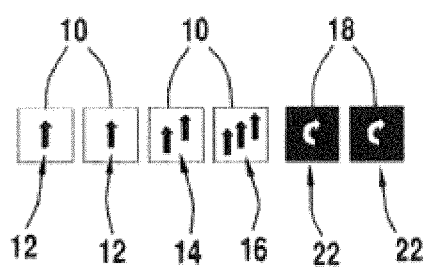
Figure 28:
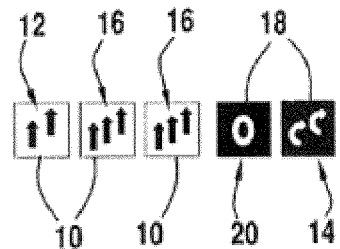
Figure 29:
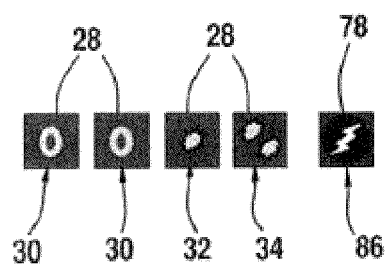
Figure 30:
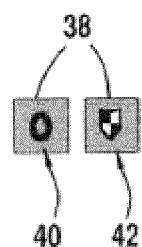
Figure 26:
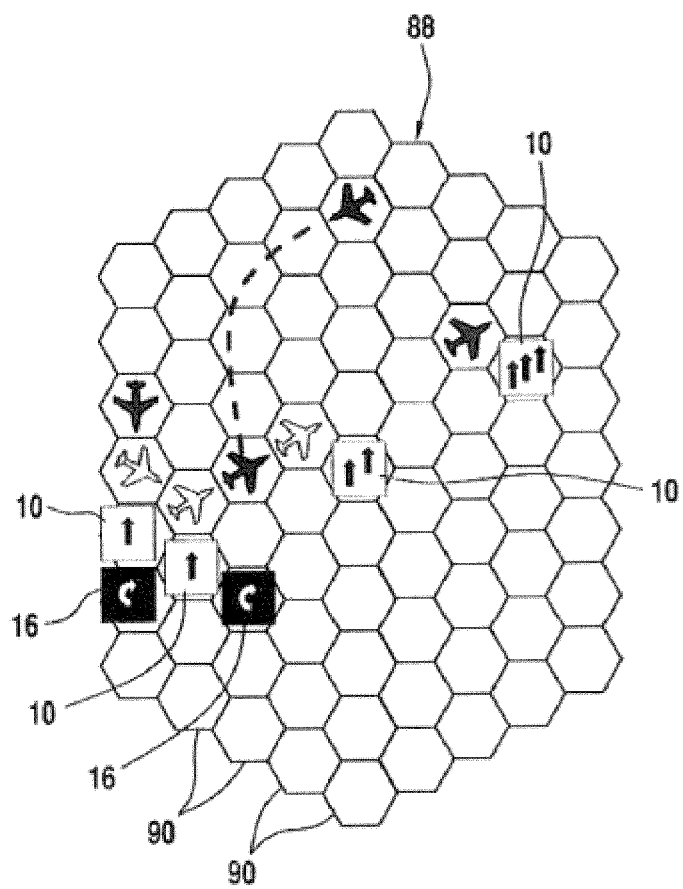
Figure 31:
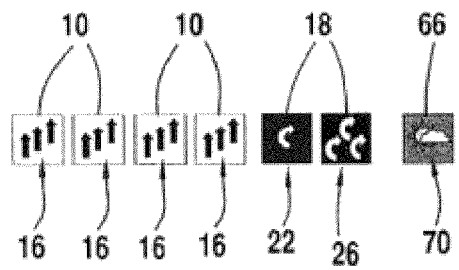
Figure 33:
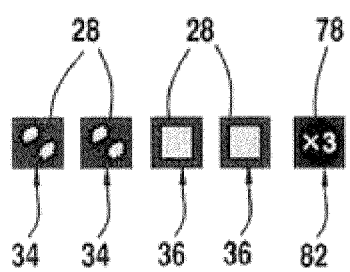
Figure 34:
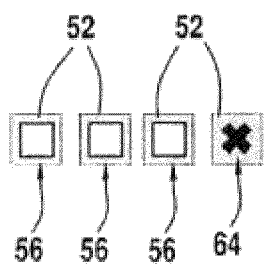
Figure 32:
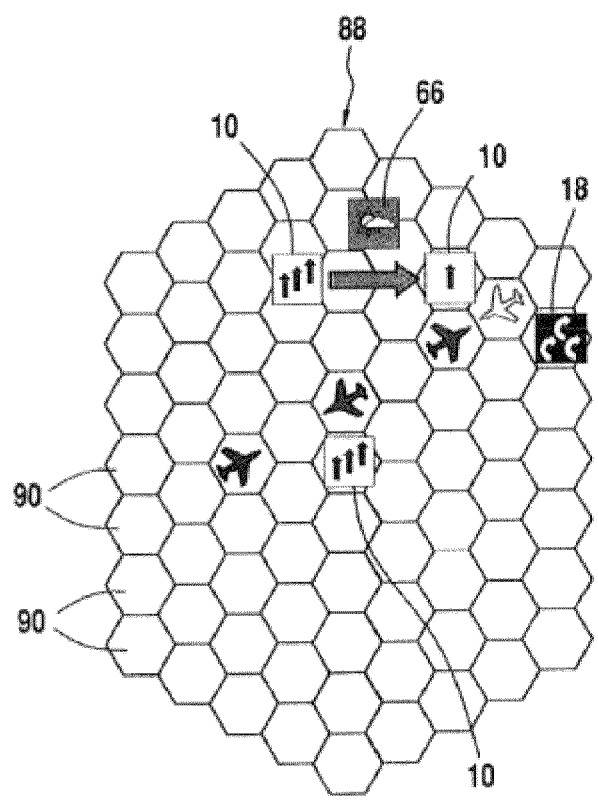

Blue Jet executes his Movement first, as shown in FIG. 32, below.

Specifically, as shown in FIG. 32, Blue Jet uses its Green Fortune Die to change one of its Triple Arrow Speed rolls to a Single Arrow and moves forward one space. It then uses its Triple Turn Maneuver result to turn 180 degrees around, executing a "half-loop" or "Immelmann Turn". Finally, Blue jet uses one of its Triple Arrow Speed rolls to fly straight at the Red Jet to make a head-on pass, guns blazing. Blue Jet's two remaining White Speed Dice and single remaining Black Turn Die are not used.

Turn Three: High Speed Maneuvers

Blue Jet's player now uses the Single Arrow Speed Die created by "Pushing His Luck" to move forward the one space required in this Jet Combat game. He may no play a Black Turn Die, and so uses the Triple Turn Maneuver Die result to make a 180 degree turn in a single space. In aerial combat, this maneuver is sometimes called a "half loop" or an "Immelmann Turn". The Blue Jet player then uses one of his remaining Triple Arrow Speed Die results to close with the Red Jet in a head-on attack.

Figure 33:
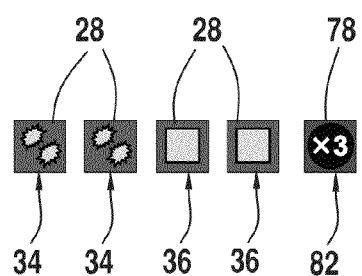

Blue Jet declares that he will fire all his Red Attack Dice (28) and his remaining Missile (78) at the Red Jet and rolls the result as shown in FIG. 33.

This result is as bad as it can get for the Red Jet. Blue Jet's player declares he will apply his "×3" Missile hit to one of the Yellow Square Critical Hit results. This means the Red Jet will suffer four hits which it cannot defend against.

Figure 34:
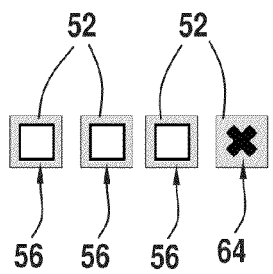

The Red Jet player sets aside the two Double Hit results until he sees if he will even survive the four Critical Hits. The Blue Jet player rolls the Yellow Critical Hit Die (52) four times, with the result as shown in FIG. 34.

This result will destroy the Red Jet in either of two ways.

First, the Black "✘" result represents a catastrophic Critical Hit. It could mean the pilot of the Red Jet is killed outright, or the fuel tanks are hit and explode, or any number of other disasters that completely destroy the aircraft.

In this Jet Combat game, the only way to cancel a Black "✘" Critical Hit result is to sacrifice a Green Fortune Die to negate it. Sacrificing the Green Fortune Die for this purpose has no other effect except to negate one Black "✘" Critical Hit result.

The Red Jet player can certainly do this, but there is no way for him to prevent the loss of his remaining three White Speed Dice. The Red Jet is shot down, and the Blue Jet player wins the battle and the game.

The term "his" or "player" as used herein, includes, but not limited to, all genders, as well as entities, organizations, groups, associations, and the like, whether real, virtual, and/or fictional.

The term "value" as used herein, includes, but not limited to, numerical, (integers, non-integers, etc.), non-numerical, those represented by symbols or other indicia, and combinations thereof, whether used in English or any other language. The symbols or indicia include, but not limited to, mathematical, geometrical, geographical, astronomical, nautical, scientific, non-scientific, historical, religious, non-religious, etc.

It is noted herewith that although the present invention has been described and illustrated using variously colored six-sided dice with various value(s)/symbology(ies) on different sides thereof, it is within the scope of the invention to vary the color scheme, value(s)/symbology(ies), the sequence or order thereof, and the number of each type of dice used, as desired. It is also within the scope of the invention to use dice of varying sides, shapes, configurations, and/or use other types of game pieces. For instance, the dice or game pieces can be of any geometrical shape, such as a polyhedron with two or more sides. Additionally, the dice and other game pieces can be real, virtual, and/or fictional.

It is further within the scope of the invention to simply use black and white dice or game pieces representing the Primary and Secondary Elements, with the appropriate value(s) and/or symbology(ies), as noted herein.

While this invention has been described as having preferred sequences, ranges, steps, order of steps, materials, structures, symbols, indicia, graphics, color scheme(s), shapes, configurations, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the claims appended hereto or presented later. The invention, therefore, is not limited to the preferred embodiment(s) shown/described herein.

What is claimed is:

1. A strategy game, comprising:
a) a first group of primary elements representing movement;
b) a second group of primary elements representing combat or interaction;
c) said first group of primary elements comprising first and second game pieces representing speed and maneuver, respectively, and each game piece having a value;
d) said second group of primary elements comprising third and fourth game pieces representing attack and defense, respectively, and each game piece having a value;
e) said first, second, third, and fourth game pieces comprising real or virtual dice, playing cards, chips, coins, tiles, or chits, or a combination thereof; and
f) wherein one of the speed and maneuver game pieces modifies the value of one of the attack and defense game pieces.

2. The strategy game of claim 1, wherein:
a) at least one of said first, second, third, and fourth game pieces has at least one numerical value.

3. The strategy game of claim 2, wherein:
a) at least two of said first, second, third, and fourth game pieces have numerical values.

4. The strategy game of claim 3, wherein:
a) at least one of said first, second, third, and fourth game pieces has at least one non-numerical value or symbolic value.

5. The strategy game of claim 2, wherein:
a) the numerical value includes zero, or a higher or lower number.

6. The strategy game of claim 1, wherein:
a) at least one of said first, second, third, and fourth game pieces is superior in value to at least another of said first, second, third, and fourth game pieces.

7. The strategy game of claim 1, wherein:
a) one of the speed and maneuver game pieces is superior in value to the other of the speed and maneuver game pieces.

8. The strategy game of claim 1, wherein:
a) one of the attack and defense game pieces is superior in value to other of the attack and defense game pieces.

9. The strategy game of claim 1, wherein:
a) the speed game piece modifies the value of the attack game piece.

10. The strategy game of claim 9, wherein:
a) the maneuver game piece modifies the value of the defense game piece.

11. The strategy game of claim 1, wherein:
a) the value of each of said first, second, third, and fourth game pieces is represented by at least one numerical value, or at least one or more symbols.

12. The strategy game of claim 11, wherein:
a) the numerical value includes zero, or a higher or lower number; and
b) said at least one or more symbols includes one or more similar or dissimilar symbols.

13. The strategy game of claim 1, wherein:
a) said first, second, third, and fourth game pieces are represented in different color.

14. The strategy game of claim 1, wherein:
a) said first group of primary elements comprises a plurality of said first and second game pieces; and
b) said second group of primary elements comprises a plurality of said third and fourth game pieces.

15. The strategy game of claim 1, further comprising:
a) a secondary element game piece representing at least one of recovery, randomization, unpredictability, and advantages.

16. The strategy game of claim 15, wherein:
a) said secondary element game piece modifies the value of one or more of said first, second, third, and fourth game pieces.

17. The strategy game of claim 16, wherein:
a) said secondary element game piece includes at least one numerical, non-numerical, or symbolic value.

18. The strategy game of claim 1, comprising:
a) a plurality of said secondary game pieces representing one or more of recovery, randomization, unpredictability, and advantages.

19. A strategy game, comprising:
a) a first group of primary elements representing movement;
b) a second group of primary elements representing combat or interaction;
c) a third group of secondary elements representing one or more of recovery, randomization, unpredictability, and advantages;
d) said first group of primary elements comprising a speed game piece and a maneuver game piece;
e) said second group of primary elements comprising an attack game piece and a defense game piece; and f) said third group of secondary elements comprising one or more of a recovery game piece, a randomization game piece, an unpredictability game piece, and an advantages game piece;
g) said game pieces comprising real or virtual dice, playing cards, chips, coins, tiles, or chits, or a combination thereof; and
h) wherein one of the speed and maneuver game pieces modifies the value of one of the attack and defense game pieces.

20. The strategy game of claim 19, wherein:
a) a plurality of said game pieces have at least one numerical value, at least one non-numerical value, at least one symbolic value, or a combination thereof.

21. The strategy game of claim 20, wherein:
a) the numerical value includes zero, or a higher or lower number.

22. The strategy game of claim 21, wherein:
a) the symbolic value supersedes the numerical value.

23. The strategy game of claim 22, wherein:
a) the numerical value is variable.

24. The strategy game of claim 20, wherein:
a) one of said third group of secondary elements modifies the value of at least one of said first and second groups of elements.

25. The strategy game of claim 20, wherein:
a) the speed game piece modifies the value of the attack game piece.

26. The strategy game of claim 20, wherein:
a) the maneuver game piece modifies the value of the defense game piece.

27. The strategy game of claim 20, wherein:
a) one of the speed and maneuver game pieces is superior in value to the other of the speed and maneuver game pieces.

28. The strategy game of claim 20, wherein:
a) one of the attack and defense game pieces is superior in value to the other of the attack and defense game pieces.

29. The strategy game of claim 20, wherein:
a) the defense game piece modifies the value of the attack game piece.

30. The strategy game of claim 20, wherein:
a) one of said third group of elements modifies the value of the other of said third group of elements.

31. The strategy game of claim 19, wherein:
a) said game pieces are represented in different color.

32. The strategy game of claim 19, wherein:
a) said first group of primary elements comprises a plurality of each of said game and maneuver game pieces;
b) said second group of primary elements comprises a plurality of each of said attack and defense game pieces; and
c) said third group of secondary elements comprises a plurality of each of said recovery, randomization, unpredictability, and advantages game pieces.

33. The strategy game of claim 20, wherein:
a) at least one of said recovery, randomization, unpredictability, and advantages game pieces has an expendable value.

* * * * *

UNITED STATES PATENT AND TRADEMARK OFFICE
CERTIFICATE OF CORRECTION

PATENT NO. : 9,028,314 B2
APPLICATION NO. : 13/827272
DATED : May 12, 2015
INVENTOR(S) : Hawthorne It is certified that error appears in the above-identified patent and that said Letters Patent is hereby corrected as shown below:

Please delete patent 9028314 in its entirety and insert patent 9028314 in its entirety as shown on the attached pages.

Signed and Sealed this
Twenty-sixth Day of April, 2016

Michelle K. Lee
*Director of the United States Patent and Trademark Office*

(12) United States Patent
Hawthorne

(10) Patent No.: US 9,028,314 B2
(45) Date of Patent: May 12, 2015

(54) STRATEGY GAME, METHOD AND/OR SYSTEM

(71) Applicant: Donald J. Hawthorne, Great Falls, VA (US)

(72) Inventor: Donald J. Hawthorne, Great Falls, VA (US)

(*) Notice: Subject to any disclaimer, the term of this patent is extended or adjusted under 35 U.S.C. 154(b) by 13 days.

(21) Appl. No.: 13/827,272

(22) Filed: Mar. 14, 2013

(65) Prior Publication Data

US 2014/0171167 A1 Jun. 19, 2014

Related U.S. Application Data

(60) Provisional application No. 61/737,528, filed on Dec. 14, 2012.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 3/02 | (2006.01) |
| A63F 3/00 | (2006.01) |

(52) U.S. Cl.
CPC ......... *A63F 3/02* (2013.01); *A63F 2003/00195* (2013.01); *A63F 3/00075* (2013.01)

(58) Field of Classification Search
USPC .............................................. 463/9, 10
See application file for complete search history.

(56) References Cited

U.S. PATENT DOCUMENTS

| | | |
|---|---|---|
| 3,826,498 A | 7/1974 | Monek |
| 3,860,241 A | 1/1975 | Leftin |
| 4,157,184 A | 6/1979 | Recard, Jr. |
| 4,277,065 A | 7/1981 | White |
| 4,759,548 A | 7/1988 | Chaban |
| 4,813,678 A | 3/1989 | Collazo et al. |
| 4,850,597 A | 7/1989 | Milliken |
| 5,004,245 A | 4/1991 | Schumacher et al. |
| 5,135,231 A | 8/1992 | Piper |
| 5,251,905 A | 10/1993 | Bombino |
| 5,570,887 A | 11/1996 | Christie, Jr. |
| 5,649,704 A | 7/1997 | Dobbin |
| 5,879,005 A | 3/1999 | Baca |
| D466,164 S | 11/2002 | Bensimon |
| 6,575,463 B1 | 6/2003 | Wintersteen |
| 6,729,619 B2 | 5/2004 | Yu et al. |
| 6,808,172 B2 | 10/2004 | Bedford et al. |
| 7,296,796 B2 | 11/2007 | Mackenzie |
| 7,334,792 B1 | 2/2008 | Bermann |
| 2003/0062672 A1 | 4/2003 | Sloper |

(Continued)

OTHER PUBLICATIONS

Jose Capablanca, "Chess Fundamentals," 2006, pp. 23-25, http://books.google.com/books?id=rDz8do_EDjkC&dq=isbn:0812936817&source=gbs_navlinks_s.*

(Continued)

*Primary Examiner* — Kevin Y Kim
(74) *Attorney, Agent, or Firm* — Dinesh Agarwal, P.C.

(57) ABSTRACT

A strategy game includes a first group of primary elements representing movement, and a second group of primary elements representing combat or interaction. The first group of primary elements includes first and second game pieces representing speed and maneuver, respectively, and each having a value. The second group of primary elements includes third and fourth game pieces representing attack and defense, respectively, and each having a value. The game pieces include dice represented in different colors.

50 Claims, 8 Drawing Sheets
(8 of 8 Drawing Sheet(s) Filed in Color)

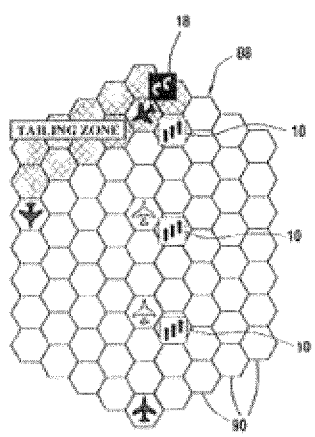

(56) References Cited

U.S. PATENT DOCUMENTS

2010/0072702 A1 3/2010 Fowler
2011/0042891 A1 2/2011 Howard et al.

OTHER PUBLICATIONS

Valve Software, "Team Fortress 2," relevant patches up until Jun. 23, 2011, http://wiki.teamfortress.com/wiki/Main_Page.*
Disciplinary Action, Jun. 25, 2011, https://web.archive.org/web/20110625154413/http://wiki.teamfortress.com/wiki/Disciplinary_Action.*
UberCharge, Jul. 6, 2010, https://web.archive.org/web/20100706010717/http://wiki.teamfortress.com/wiki/%C3%9CberCharge.*
Kritzkrieg, Jul. 4, 2010, https://web.archive.org/web/20100704185759/http://wiki.teamfortress.com/wiki/Kritzkrieg.*
Mad Milk, Oct. 4, 2010, https://web.archive.org/web/20101004002055/http://wiki.teamfortress.com/wiki/Mad_Milk.*
Medic, Jul. 4, 2010, https://web.archive.org/web/20100704141319/http://wiki.teamfortress.com/wiki/Medic.*

* cited by examiner

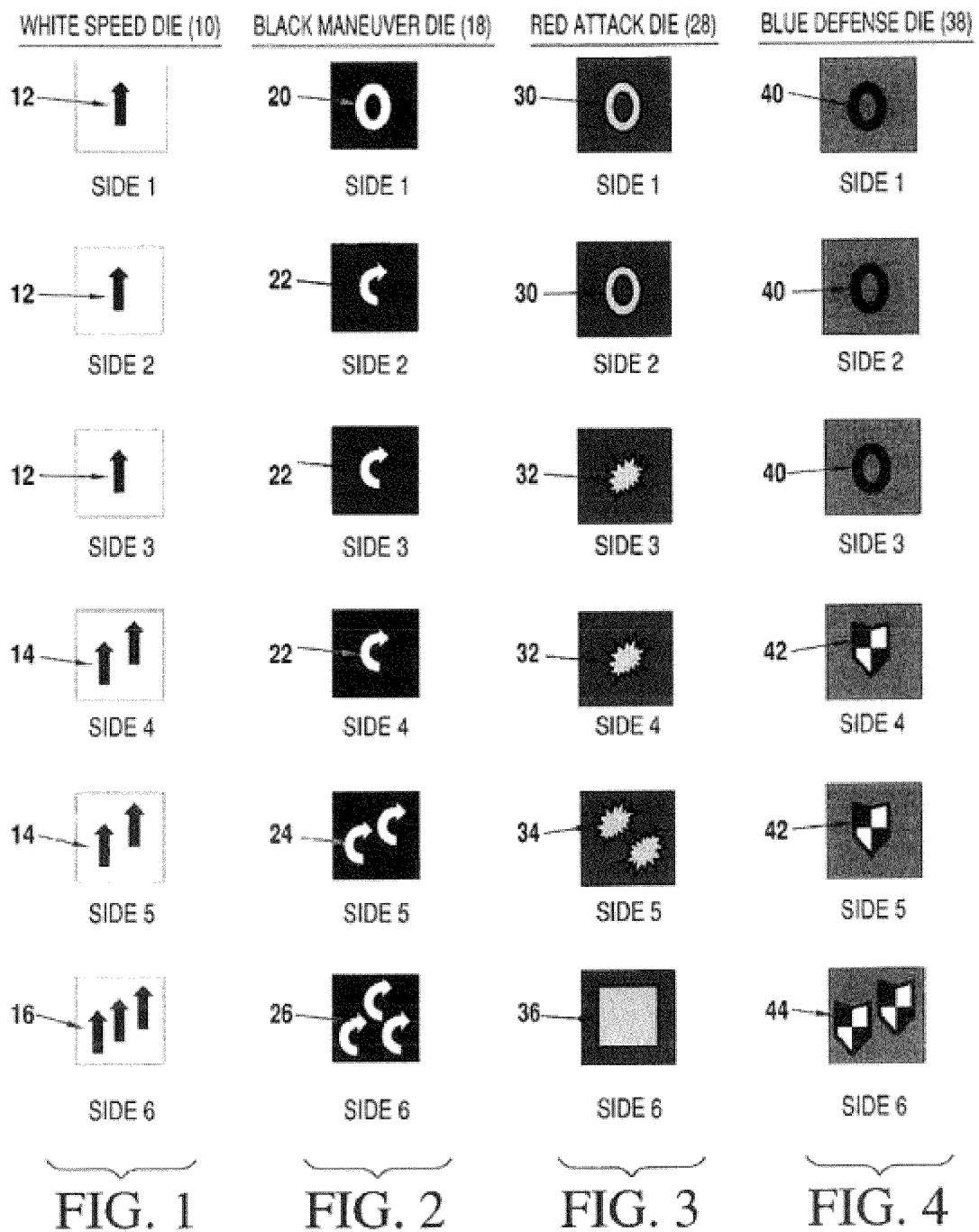

STRATEGY GAME, METHOD AND/OR SYSTEM

CROSS-REFERENCE TO RELATED APPLICATIONS

The present application claims the benefit of prior U.S. Provisional Application Ser. No. 61/737,528, filed Dec. 14, 2012, which is hereby incorporated herein in its entirety by reference.

FIELD AND BACKGROUND OF THE INVENTION

The present invention is generally directed to games and strategy simulations, and more particularly to a strategy game, method and/or system that can be applied to various challenges, competitions, interactions, situations, or other activities.

Playing games or engaging in various challenges and competitions is as old as the civilization. For thousands of years, people have been involved in outdoor games, sporting events, etc., either as spectators or as participants. The Roman Gladiator games, although existed about two-thousand years ago, a Hollywood epic "Gladiator" dramatizing the bloody fights, was released barely a dozen years ago. The ancient Olympic Games, held in Olympia, Greece, from the $8^{th}$ century BC to the $4^{th}$ century AD, are still held today, albeit in somewhat different form and organization.

In this regard, while the thrill of participating in real competitive games, is generally available to only the selected members of the society, playing games that mimic the real games, or other games which allow interactions, challenges, competitions, strategies, etc., between people, is available to all.

Various games and play methods are available in prior art as shown in U.S. Design Pat. No. 466,164; U.S. Pat. Nos. 3,826,498; 3,860,241; 4,157,184; 4,277,065; 4,759,548; 4,813,678; 4,850,597; 5,004,245; 5,135,231; 5,251,905; 5,570,887; 5,649,704; 5,879,005; 6,575,463B1; 6,729,619; 6,808,172; 7,296,796B2; 7,334,792; Publications Nos. 2003/0062672A1; 2010/0072702A1; and 2011/0042891A1.

ASPECTS OF THE INVENTION

The present disclosure is directed to various aspects of the present invention.

One aspect of the present invention is to provide a strategy game, method, and/or system that can simulate any personal, professional, corporate, governmental, or intergovernmental challenge, competition, interaction, or situation, including, but not limited to, social, economic, athletic, military, diplomatic, religious, political, academic, and biological.

Another aspect of the present invention is to provide a strategy game, method, and/or system that can be played by two or more players of a very young age to the elderly.

Another aspect of the present invention is to provide a strategy game, method, and/or system that can be used for leisure or non-leisure activities, or for training activities.

Another aspect of the present invention is to provide a strategy game, method, and/or system that can be used for modeling or devising various competitive activities or challenges in, for example, private, commercial, and/or military applications.

Another aspect of the present invention is to provide a strategy game, method, and/or system that can be used in modeling or devising various competitive activities or challenges relating to outer space and/or oceanic explorations.

Another aspect of the present invention is to provide a strategy game, method, and/or system that is devised around the concept of movement and combat. The movement preferably includes speed and maneuver, and the combat preferably includes attack and defense.

Another aspect of the present invention is to provide a strategy game, method, and/or system that is preferably engaged by using game pieces represented by different colors and each having one or more predetermined values. The values can be numerical, non-numerical, symbolic, and/or represented by other indicia. In an engagement, the color of a game piece determines the timing of its use during the engagement, and the value thereof determines its strength or functionality relative to another game piece of an opponent.

Another aspect of the present invention is to provide a strategy game, method, and/or system that is preferably engaged by using real or virtual game pieces, with or without a game board.

Another aspect of the present invention is to provide a strategy game, including first group of primary elements representing movement, and a second group of primary elements representing combat or interaction. The first group of primary elements includes first and second game pieces representing speed and maneuver, respectively, and each having a value. The second group of primary elements includes third and fourth game pieces representing attack and defense, respectively, and each having a value.

Another aspect of the present invention is to provide a strategy game, including a first group of primary elements representing movement, a second group of primary elements representing combat or interaction, and a third group of secondary elements representing one or more of recovery, randomization, unpredictability, and advantages. The first group of primary elements includes a speed game piece and a maneuver game piece. The second group of primary elements includes an attack game piece and a defense game piece. The third group of secondary elements includes one or more of a recovery game piece, a randomization game piece, an unpredictability game piece, and an advantages game piece.

Another aspect of the present invention is to provide a strategy game play method for two or more players, which includes a) providing for each player a set of at least four game pieces representing speed, maneuver, attack, and defense categories, each game piece including a plurality of preselected values for the corresponding category, b) having each player roll all four game pieces together, c) comparing the results of the speed game piece to determine a winner, d) allowing the winner in step c) to use the rolled value of his attack game piece against one of the other players, e) allowing the opponent in step d) to use the rolled value of his defense game piece, f) comparing the results of steps d) and e) and determining a wounded player, g) having the wounded player remove one of his four game pieces from the game, and h) repeating steps b)-g) and determining the loser of the game who has lost at least two of his speed, maneuver, attack, and defense game pieces.

Another aspect of the present invention is to provide a strategy game play method for two or more players, which includes a) providing for each player a set of at least four game pieces representing primary elements of speed, maneuver, attack, and defense categories, each game piece including a plurality of preselected values for the corresponding category, b) providing for each player one or more of secondary element pieces representing recovery, randomization, unpredictability, and advantages, each game piece including a plurality of preselected values for the corresponding category, c) having each player roll the four primary element game pieces together; d) comparing the results of the speed game piece to determine a winner; e) allowing the winner in step d) to use the value of his attack game piece against one of the other players; f) allowing the opponent in step e) to use the value of his defense game piece; g) comparing the results of steps e) and f) and determining a wounded player; h) having the wounded player remove one of his four primary element game pieces from the game; and i) repeating steps c)-h) and determining the loser of the game who has lost at least two of his speed, maneuver, attack, and defense game pieces.

Another aspect of the present invention is to provide a strategy game play method for two or more players, which includes a) providing for each player a set of at least four game pieces representing speed, maneuver, attack, and defense categories, each game piece including a plurality of preselected values for the corresponding category, b) having each player roll speed and maneuver game pieces together, c) comparing the results of the speed game piece to determine a winner, d) allowing the player with the highest rolled value of his maneuver game piece to roll his attack game piece, e) allowing the winner in step d) to use the rolled value of his attack game piece against one of the other players, f) allowing the opponent in step e) to roll and use the value of his defense game piece, g) comparing the results of steps e) and f) and determining a wounded player, h) having the wounded player remove one of his four game pieces from the game, and i) repeating steps b)-h) and determining the loser of the game who has lost at least two of his speed, maneuver, attack, and defense game pieces.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

One of the above and other aspects, novel features and advantages of the present invention will become apparent from the following detailed description of the non-limiting preferred embodiment(s) of invention, illustrated in the accompanying drawings, wherein:

FIG. 1 illustrates the six-sides of a White Speed die in accordance with a preferred embodiment of the present invention;

FIG. 2 illustrates the six-sides of a Black Maneuver die in accordance with a preferred embodiment of the present invention;

FIG. 3 illustrates the six-sides of a Red Attack die in accordance with a preferred embodiment of the present invention;

FIG. 4 illustrates the six-sides of a Blue Defense die in accordance with a preferred embodiment of the present invention;

FIG. 5 illustrates the six-sides of a Orange Recovery die in accordance with a preferred embodiment of the present invention;

FIG. 6 illustrates the six-sides of a Yellow Randomization die in accordance with a preferred embodiment of the present invention;

FIG. 7 illustrates the six-sides of a Green Unpredictability die in accordance with a preferred embodiment of the present invention;

FIG. 8 illustrates the six-sides of a Purple Advantages die in accordance with a preferred embodiment of the present invention;

FIGS. 9-11 illustrate the starting set-up of an example Jet Fighter combat game between two players; and FIGS. 12-34 illustrate various sequential steps taken by the two players of the Jet Fighter combat game.

DETAILED DESCRIPTION OF THE PREFERRED EMBODIMENT(S) OF THE INVENTION

The present disclosure describes a preferred embodiment (s) of a game, method, and/or system (collectively "System") for using unique graphic tools for modeling the basic elements, which are common to all forms of competition (or game, challenge, interaction, situation, project, etc.) and their interactions with each other in the pursuit of the competition's goal, with variations of the interactions of the system's components being applied so as to allow modeling of any form of competition without changing the essential nature of the system itself, based, at least partly, on the concept that all competition of any form can be described as including four Primary Elements, with four or more Secondary or Qualifying Elements depending on various specifics of the competition, with the four Primary Elements being Speed, Maneuver, Attack and Defense, and the four Secondary or Qualifying Elements, being Recovery, Randomization, Unpredictability and Advantages.

Elements

The system uses distinctive symbols divided preferably into eight or more different colors, with each color set possessing an unique set of pictographs or indicia, and each pictograph or indicia denoting a specific function to determine their interaction with the other symbols, the symbology may then be transferred to dice, tiles, chips, coins, chits, counters, playing cards or other physical media, or it may be randomly generated in an electronic format such as, but not limited to, computer games or PDA "apps"; the flexibility of the method of generating or using the symbology is indicative of the utility of the system, with dice being used to randomize results throughout the modeling activity, or cards or tile draws from a finite pool allowing for a measure of predictability, or electronic random generation allowing for modifying the probability of certain results to occur more often than others, with whatever media the symbology is applied to, allowing for a result which provides the user or users with a set of pictographs or indicia which they may then apply to the competition, game, challenge, interaction, situation, project, etc., being modeled, so that the application by the user or users of the various results and. Where applicable, the interaction of those results, allows any sort of competition to be simulated subject to the context of the competition.

Dice Types

Where dice are used to utilize the System, any such dice used in the System may be of any practical dimensions to allow facilitation of their use in a manner common to any dice game, including but not limited to, ease of perceiving the information presented, whether by use of visual or other depiction, ease of shuffling, ease of stacking, ease of handling, any form of depiction designed or intended to compensate for sensory disabilities on the part of the users, or any other consideration common to the use of dice, and most preferably will be polyhedral dice, having multiple faces or sides as practicable for their use as random result generators, with all Dice Types divided into four or more types differentiated by color (which determines when they are used in the sequence of the competition) and symbology (which determines how their results are applied to the competition) represented by a numerical value, a non-numerical value, a symbol, an indicia, or a combination thereof.

Card Types

Where cards are used to utilize the System, any such cards used in the System may be of any practical dimensions to allow facilitation of their use in a manner common to any card game, including but not limited to, ease of perceiving the information presented, whether by use of visual or other depiction, ease of stacking, ease of shuffling, ease of handling, any form of depiction designed or intended to compensate for sensory disabilities on the part of the users, or any other consideration common to the use of playing cards, with all Cards Types divided into four or more types differentiated by color (which determines when they are used in the sequence of the competition) and symbology (which determines how their results are applied to the competition) represented by a numerical value, a non-numerical value, a symbol, an indicia, or a combination thereof, whether on the obverse (front) or reverse (back) sides of said cards.

Tile and Chit Types

Where "tiles" or "chits" are used to utilize the System, any such tiles or chits used in the System may be of any practical dimensions to allow facilitation of their use in a manner common to any game which utilizes such components, including but not limited to, ease of perceiving the information presented, whether by use of visual or other depiction, ease of stacking, ease of shuffling, ease of handling, case of storage in and/or access to a container of practical size for random draws such as may be used in lotteries or raffle drums or other methods of random distribution, or any other consideration common to the use of such tiles or chits, with all Tile or Chit Types divided into four or more types differentiated by color (which determines when they are used in the sequence of the competition) and symbology (which determines how their results are applied to the competition) represented by a numerical value, a non-numerical value, a symbol, an indicia, or a combination thereof, whether on the obverse (front) or reverse (back) sides of said tiles or chits.

Electronic Media and Computer Generation of the Symbols

Where any form of electronic media is used to utilize the System, any such depictions of the elements of the system may take any form, in that such media may represent the symbols as dice rolls, cards played, tiles or chits drawn, or may represent a depiction of only the symbol itself, irrespective of any animation or other depiction solely of an entertainment or presentational nature, but maintaining the essential form of the symbols in their depiction of their functions, their relative proportions in ratio of appearance or availability for a given competition, and the inherent probability of their appearance or availability to the competitors in the course of the competition, with the fundamental interactive relationship between the various symbols depicted properly and accurately and maintained to preserve the function of the System itself, and such depictions and the means of their generation and presentation may be of any practical dimensions or method to allow facilitation of their use in a manner common to any such game, including but not limited to, ease of perceiving the information presented, whether by use of visual or other depiction, ease of randomization in distribution, ease of practical access, or any other consideration common to the use of the specific type of electronic media in which the System is being reproduced, with the System's fundamental elements divided into four or more types differentiated by color (which determines when they are used in the sequence of the competition) and symbology (which determines how their results are applied to the competition), and in the case of direct simulations of the examples given above of dice, cards, chips, coins, tiles, or chits, maintaining the general descriptions of such media as described above in the reproduction of such elements in the given electronic media used to simulate them. The System can be executed on any type of computer, gaming device, tablet, fablet, phablet, cellular phone, mobile phone, smartphone, personal digital assistant (PDA), etc.

Symbols and Meanings

The System preferably includes various unique graphic symbols, and is designed to accommodate any new symbols which may be necessary for expansions or variations specific to situations being modeled. The core of the System preferably includes eight fundamental Symbol Generators, comprising four Primary Elements and four Secondary Elements, distinguished by unique symbols and further distinguished by, but not necessarily limited to, specific preferable distinctive colors, as described below:

Primary Elements

Speed

In the basic form of the System, Speed may be represented by Black characters on a White field, and may be represented by the depiction of one, two or three or more straight arrows or similar unique symbol or indicia, and when depicted as arrows they may be displayed singly or in parallel and facing in the same direction, typically, but not exclusively, displayed as black characters on a white field, or other images, or similar unique symbol, or any other unique representational symbol, and in whatever form representing "Speed", "Acceleration", "Available Velocity" or general forward motion or any other change in position which promotes physical advancement of the competitor or participant being represented in the model toward the goal or goals of the competition.

Maneuver

In the basic form of the System, Maneuverability may be represented by White characters on a Black field, and may be represented by the depiction of one of the following effects: a "null" effect using one or more of the following: one or more of common notation numerals for "zero" ("0") or similar representational symbol representing a "No Control" or "No Change" or "No Maneuver Effect Achieved"; one, two or three or more curved arrows or similar unique symbol or indicia, and when depicted as arrows they may be displayed singly or in a grouped cluster and facing in the same or alternating directions, typically, but not exclusively, displayed as white characters on a black field, or other images, or similar unique symbol, or any other unique representational symbol, and in whatever form representing "Maneuverability", "Turning Capacity", "Agility" or any other adaptive or positional- or directional-modifying motion, such as actual changes in facing or position or direction of movement or angles of attack or approach.

Attack

In the basic form of the System, Attack may be represented by Yellow characters on a Red field, and may be represented by the depiction of one of the following effects: a "null" effect using one or more of the following: one or more of common notation numerals for "zero" ("0") or similar representational symbol representing a "Missed Shot" or "Failure" or "No Attack Effect Achieved"; a "success" effect using one or more of the following: use of one or more images of the common mathematical notation numerals for "one" ("1"), or the English character for an "asterisk" ("*"), or use of one or more images of the symbol depicting one or more "Burst" images, or similar unique symbol, or any other unique representational symbol, or other images, or similar unique symbol, or any other unique representational symbol, and in whatever form, representing a "Shot On Target" or "Accurate Placement" or "Partially Successful Attack"; a "strong success" effect using one or more of the following: use of two or more images of the of the common mathematical notation numerals for "two" ("2"), or use of two or more images of the character for an "asterisk" ("**"), or use of two or more images of a symbol depicting two "Burst" images, or similar unique symbol, or any other unique representational symbol, or other images, or similar unique symbol, or any other unique representational symbol, and in whatever form, representing a "Focused Shot On Target" or "Very Accurate Placement" or "Fully Successful Attack"; an "extreme success" or "decisive result" effect using one or more of the following: use of one or more images of the common mathematical notation numerals for "infinity" ("∞"), the English character for an "exclamation point" ("!"), or use of one or more yellow squares, or similar unique representational symbol, or other images, or similar unique symbol, or any other unique representational symbol, and in whatever form, all of which indicate a cascade effect requiring the further use of the Yellow Randomization Symbol generation method described below under Secondary Elements, and representing a "Direct Hit" or "Critical Hit" or "Decisively Effective Attack Result".

Defense

In the basic form of the System, defense may be represented by Black and White characters on a blue field, and may be represented by the depiction of one of the following effects: a "null" effect using one or more of the following: one or more of common notation numerals for "zero" ("0") or similar representational symbol representing a "Ineffective Defense" or "Failure" or "No Defensive Effect Achieved"; a "success" effect using one or more of the following: use of one or more images of the common flowchart notation symbol for "Off-chart Connector" ("∆", inverted), or the English character for the letter "D" ("D"), or use of one or more images of any symbol depicting one or more "Shield" images, or similar unique symbol, or any other unique representational symbol, and in whatever form, representing a "Accurate Defense" or "Effective Deflection of Attack" or "Partially Successful Defense"; a "strong success" effect using two or more of the following: use of two or more images of the common flowchart notation symbol for "Off-chart Connector" ("∆ ∆", inverted), or the English characters for an "asterisk" ("**"), or use of one or more images of any symbol depicting one or more "Shield" images or similar unique symbol, or any other unique representational symbol, and in whatever form, representing a "Accurate Defense" or "Highly Effective Deflection of Attack" or "Fully Successful Defense".

Preferred Ratio of Primary Element Symbols

The ratio of the various Primary Element Symbols is an aspect of their use in modeling competitions, and is established to re-create the dynamics inherent in competition in that a static state, or "Defense", is initially vulnerable to the actions of a dynamic state, or "Offense", which initial vulnerability may later be mitigated by Secondary Elements as described later; the ratio of Primary Elements is expressed as the Primary Element, an indicative, though not exclusive, Symbol and the number of such symbols in their minimum quantities:

Speed (White):
1 Straight Arrow×3 (for example)
2 Straight Arrows×2 (for example)
3 Straight Arrows×1 (for example)

Maneuverability (Black):
Zeroes ("0")×1 (for example)
1 Curved Arrow×3 (for example)
2 Curved Arrows×1 (for example)
3 Curved Arrows×1 (for example)

Attack (Red):
Zeroes ("0")×2 (for example)
1 Single "Burst" or "Partially Successful Attack" Symbol×2 (for example)
1 Double "Burst" or "Fully Successful Attack" Symbol×1 (for example)
1 Yellow Square (meaning "Use Randomization Symbols") or "Decisively Successful Attack" Symbol×1 (for example)

Defense (Blue):
Zeroes ("0")×3 (for example)
1 Single "Shield" or "Successful Defense" Symbol×2 (for example)
1 Double "Shield" or "Fully Successful Defense" Symbol×1 (for example)

Illustrative Sample Elements: Dice

The following is a representative sampling of the basic symbols used in the System when it is preferably applied to standard six-sided dice, and is not intended to represent a definitive or limited depiction of the entire System, which can be applied to any form of media including, but not limited to, dice, cards, chips, coins, tiles, chits, electronic, or any other media so long as the fundamental symbols and the relationships to and interaction with one another is maintained. The use of dice in these examples is for illustrative purposes only, and for purposes of these examples will consist of eight different Dice Types as denoted by their color types, with all dice in the representative sample being six-sided hexahedron dice, bearing pictographs or indicia specific to their function as shown below.

Primary Element Utility with a Six-Sided Cubical Dice

White Speed Dice

The White dice element of the System represents Speed or general forward motion or any other change in direction or position which promotes physical advancement toward the goal of the competition and on the example of a six-sided die (or hexahedron) consists of one black straight arrow symbol, or two black straight arrow symbols, or three black straight arrow symbols or other form of indicia, on a white field per side, all facing in the same direction, and occupying specific sides of the hexahedron relative to one another.

As shown in FIG. 1, the White Speed die 10 preferably includes one black straight arrow symbol 12 on its first, second, and third sides, a two black straight arrow symbol 14 on fourth and fifth sides, and a three black straight arrow symbol 16 on the sixth side thereof.

Function of the White Speed Symbols

One or more White Dice are rolled to show how much speed, movement, forward momentum or other type of re-positioning is available to the competitor in a given Phase or Turn or Round, with the number of arrows shown on each die face result constituting the total velocity, or number of moves, or spaces, or other type of re-positioning the competitor has to use in that Phase or Turn or Round.

Black Maneuver Dice

The Black dice element of the system represents Maneuverability or adaptive motion, changes in direction or angles of attack or approach and on the example of a six-sided die (or hexahedron) consists of a white numeral "0" (zero) symbol or one curved white arrow symbol, or two curved white arrow symbols or three or more curved white arrow symbols or other form of indicia, on a black field per side, all facing in the same direction, and occupying specific sides of the hexahedron relative to one another.

As shown in FIG. 2, the Black Maneuver die 18 preferably includes a white zero numeral 20 on its first side, a single curved white symbol 22 on second, third and fourth sides, a two curved white arrow symbol 24 on the fifth side, and a three curved white arrow symbol 26 on the sixth side thereof.

Function of the Black Maneuver Symbols

One or more Black Dice are rolled to show how many adjustments in facing, angle of momentum, actual changes in course or other re-direction of path of travel or approach or angle of attack is or are available to the competitor in a given Phase or Turn or Round, with a result of "0" (zero) usually having no effect and the number of curved arrows shown on each die face result constituting the total number of such modifications to the path of travel or approach or angle of attack, or other type of adjustment to the path of movement or relative position to other competitors or elements in the field of competition which the competitor has to use in that Phase or Turn or Round.

Red Attack Dice

The Red dice element of the system represents Attack or aggressive or offensive activity inherent in any competition which results in the opposing or resisting elements being reduced in their ability to adequately participate in the competition through loss of their own Primary Element abilities and on the example of a six-sided die (or hexahedron) consists of one or more single yellow numeral "0" (zero) symbols, or one yellow "burst" symbol, or two or more yellow "burst" symbols, or other form of indicia, or one yellow square on a red field per side, all oriented identically, and occupying specific sides of the hexahedron relative to one another.

As shown in FIG. 3, the Red Attack die 28 preferably includes a yellow zero numeral 30 on its first and second sides, a single yellow "burst" symbol 32 on the third and fourth sides, a double yellow "burst" symbol 34 on the fifth side, and a yellow square 36 on the sixth side thereof.

Function of the Red Attack Symbols

One or more Red Dice are allotted to each competitor to represent the level of their power or their ability to impact the opponent or opponents in the competition in order to reduce their competitive effectiveness, with more Red Dice representing a stronger ability to impact the opponents or other elements in the field of competition in a given Phase or Turn or Round, with the Red Dice then rolled to show how effective the offensive competitor's attack is against an opponent or other element in the field of competition in a given Phase or Turn or Round, with a result of "0" (zero) usually having no effect and the number of burst symbols shown on each die face constituting the total number of damage effects the opponent or element has received from the attack, while a result of a Yellow Square requires a roll of the Yellow "Randomization" die referred to below and the effects of that die roll usually being applied immediately.

Blue Defense Dice

The Blue dice element of the system represents Defense, or defensive or resistant activity inherent in any competition which allows the defending elements to deflect or negate direct aggressive actions by the opponent in order to preserve the defender's own ability to adequately participate in the competition by preventing loss of their own Primary Element abilities, and on the example of a six-sided die (or hexahedron) consists of one or more single black numeral "0" (zero) symbols, or one "shield" symbol, or two or more "shield" symbols or other form of indicia, on a blue field per side, all oriented identically, and occupying specific sides of the hexahedron relative to one another.

As shown in FIG. 4, the Blue Defense die 38 preferably includes a black zero numeral 40 on its first, second and third sides, a single black "shield" symbol 42 on the fourth and fifth sides, and a double black "shield" symbol 44 on the sixth side thereof.

Function of the Blue Defense Symbols

One or more Blue Dice are allotted to each competitor to represent the level of their resistance to outside effects or their ability to generally resist or deflect outside effects or attacks which would reduce their ability to effectively participate in the competition, with more Blue Dice representing a stronger ability to resist the impact of the attacks of an opponent or other elements in the field of competition in a given Phase or Turn or Round, the Blue Dice generally being rolled after the opponent's Red Dice have been rolled, allowing the defending competitor to apply results of "Shields" against the attacking competitor's results of "Bursts", with "Shields" generally cancelling out "Bursts" at a ratio of one-to-one, in an attempt to reduce of wholly negate the effects of the attacker's Red Die rolls, however an attacker's roll of a Yellow Square usually requires a roll of the Yellow "Randomization" die referred to below which usually bypasses any "Shields" rolled by the defender, as shown in the section on the Yellow "Randomization" Die referred to below and the effects of that die roll usually being applied immediately.

Secondary Element: Dice

Secondary Elements represent factors which impact a competition as adjuncts to the innate capabilities of the competitors, and may represent, but are not necessarily limited to representing, expendable materials or temporary efforts, increased pre-competition preparation, external environmental factors or the vagaries of outside chance; Secondary Elements in the basic system may be generally defined, without specific limitation, in the following four examples:

Recovery

In the basic form of the System, Recovery may be represented by Black or White characters on an Orange field, and may be represented by the depiction of one or more of the following effects: a "null" effect using one or more of the following: one or more of common notation numerals for "zero" ("0") or similar representational symbol representing a "No Recovery" or "Unsuccessful Repair Attempt" or "No Recovery or Repair Effect Achieved"; one or more depictions of tools, such as a hammer and wrench, or similar unique symbol or indicia, typically, but not exclusively, displayed as black characters on an orange field, or other images, or similar unique symbol, or any other unique representational symbol, and in whatever form representing "Damage Repaired", "Capability Restored", "Wounds Healed" or any other recovery of some ability possessed by the competitor at the start of the competition but lost due to outside influence.

Randomization

In the basic form of the System, Randomization may be represented by Black or Full Color characters on a Yellow field, and may be represented by the depiction of one or more of the following effects: a symbol depicting specifically one of the Primary Elements, as well as one or more symbols depicting a non-specific effect which may or may not be applicable to the Primary Elements depending on the nature of the competition being modeled, with the symbols referring to effects on the competitor to which they are applied based on, but not limited to, the loss of Primary Element capabilities determined by the Randomization symbols generated.

Unpredictability

In the basic form of the System, Unpredictability may be represented by White or Black or Full Color characters on a Green field, and may be represented by the depiction of one of the following effects: a "Neutral" effect using one or more of the following: one or more of the common notation numerals for "equal to" ("="), or a graphic symbol depicting balanced weight scales or the common "face" (":l") symbol or similar representational symbol or indicia representing a "Balanced" or "No Advantage" or "No Influential Effect"; a "Very Positive" effect using two or more of the common mathematical notation symbols for "plus" ("++"), or a graphic symbol depicting a shining sun or the common "grinning face" (":D") symbol or similar unique symbol or indicia representing an "Extremely Favorable" or "Great Advantage" or "Extremely Positive Influential Effect"; a "Positive" effect using one of the common mathematical notation symbols for "plus" ("+"), or a graphic symbol depicting a shining sun behind a white cloud or the common "smiley face" (":)") symbol or similar unique symbol or indicia representing a "Favorable" or "Advantage" or "Positive Influential Effect"; a "Negative" effect using one of the common mathematical notation symbols for "minus" ("−"), or a graphic symbol depicting a grey cloud with rain falling from it or the common "frown face" (":(") symbol or similar unique symbol or indicia representing an "Unfavorable" or "Disadvantage" or "Negative Influential Effect"; a "Very Negative" effect using two or more of the common mathematical notation symbols for "minus" ("− −"), or a graphic symbol depicting a black cloud with a tornado or cyclone descending from it or the common "angry face" (">:(") symbol or similar unique symbol or indicia representing an "Extremely Unfavorable" or "Great Disadvantage" or "Extremely Negative Influential Effect"; and, or other images, or similar unique symbol or symbols, or any other unique representational symbol or symbols, and in whatever form representing any influences on the competition which can impact the competition but over which the competitors themselves have no direct control during the course of the competition itself once the competition has begun, and which may include, but are not limited to, weather, positional advantage, various conditions of the competitors during the period of the competition or undefinable or unpredictable variables such as overall morale, good fortune or outside intervention.

Advantages

In the basic form of the System, Advantages are preferably expended once used, as opposed to being retained until lost as is usually the case with Primary Elements, in effect representing extreme or additional efforts or capabilities on the part of the competitor using them, but which use requires substantial expenditure of resources such that the Advantage is generally not available for use again within the course of the competition, and that represent reserves of physical strength or endurance or willpower, expendables such as food or water or cash or ammunition or other supplies or abilities which have an enhancing effect on Primary Elements, and which in the basic form of the System may be represented by White and Black characters in White or Black circles on a Purple field, and may be represented by the depiction of one of the following effects: a "Failure" effect using one or more of the following or similar symbols: one or more of the common notation numerals for "zero" ("0"), or the common International "Strikeout" ("Ø") symbol, or a White lightning bolt in a Black circle or similar representational symbol representing a "Failed Boost" or "Dud" or "Advantage Expended With No Effect Achieved" with such symbols depicted as White characters in a Black circle on a Purple field and representing an Advantage expended with no appreciable effect on the Primary Element to which it is applied and the Advantage generation in that case being lost for the remainder of the competition; a "Doubled Effect" result represented by the mathematical notation "×2" using White characters in a Black circle on a Purple field and representing an Advantage expended with a doubling effect on the Primary Element to which it is applied and the Advantage generation in that case being lost for the remainder of the competition; a "Tripled Effect" result represented by the mathematical notation "×3" using White characters in a Black circle on a Purple field and representing an Advantage expended with a tripling effect on the Primary Element to which it is applied and the Advantage generation in that case being lost for the remainder of the competition; a "Maximum Effect" result using Black characters in a White circle on a Purple field, and represented by the symbol of a concentric circle "●" or a four-pointed star ("✦") or similar unique symbol or indicia, and representing an Advantage expended with a multiplicative effect, generally of at least "×2" but as high as determined for any special rules applicable to the competition being modeled, on the Primary Element to which it is applied, and the Advantage generation in that case being retained and or have some other positive effect depending on the competition being modeled, which effect is usually, but not always, represented by returning the Advantage generating element which may be, but is not limited to, a card, a die, a tile, a chit, the generation capability in an electronic media or any other means utilizing the System, to the competitor's pool for use in a later effort during the competition.

Ratio of Secondary Element Symbols

The ratio of the various Secondary Element Symbols is an aspect of their use in modeling competitions, and is established to re-create the dynamics inherent in competition on a case-by-case basis, with generally one generating element each of the Recovery, Randomization and Unpredictability Secondary Elements, which are usually, but not necessarily, retained by the competitors throughout the duration of the competition, and variable numbers of generating elements of Advantages, which are usually, but not necessarily, expended by the competitors after use during the competition; the ratio of Secondary Elements on a case-by-case basis is expressed as the Secondary Element, an indicative, though not exclusive, Symbol and the number of such symbols in their minimum quantities:

Recovery (Orange):
Zeroes ("0")×3 (for example)
3 Crossed Hammer and Wrench Symbols (for example)
Randomization (Yellow):
1 Square comprised of four smaller squares each of Red, White, Yellow and Blue×1 (for example)
1 White Square×1 (for example)
1 Black Square×1 (for example)
1 Red Square×1 (for example)
1 Blue Square×1 (for example)
1 Black "✱" Symbol×1 (for example)
Unpredictability (Green):
1 Sun Symbol×1 (for example)
1 Sun with Cloud Symbol×1 (for example)
1 Balanced Scales Symbol×2 (for example)
1 Cloud with Rain Symbol×1 (for example)
1 Tornado Symbol×1 (for example)

Advantages/Bonus (Purple):
1 White Lightning Bolt in a Black Circle Symbol×1 (for example)
1 White ×2 in a Black Circle Symbol×2 (for example)
1 White ×3 in a Black Circle Symbol×2 (for example)
1 Black Four-Pointed Star in a White Circle Symbol×1 (for example)

Secondary Element Utility with a Six-Sided Dice

Orange Recovery Die

The Orange dice element of the System represents Recovery, or repair or re-energizing activity inherent in any competition which allows the competing elements to regain or recover expended attributes in to continue competing effectively, and on the example of a six-sided die (or hexahedron) consists of one or more single white numeral "0" (zero) symbols, or one black "Tools" symbol or other form of indicia, on an orange field per side, all oriented identically, and occupying specific sides of the hexahedron relative to one another.

As shown in FIG. 5, the Orange Recovery die 46 preferably includes a black crossed hammer and wrench symbol 48 on its first, second and fifth sides, and a black zero numeral 50 on the second, fourth, and sixth sides thereof.

Function of the Orange Recovery Symbols

One or more Orange Dice can be allotted to each competitor to represent the level of their ability to recover from the results of outside effects or attacks which have reduced their ability to effectively participate in the competition, with more Orange Dice representing a stronger ability to recover from the impact of the attacks of an opponent or other elements in the field of competition in a given Phase or Turn or Round, the Orange Dice generally being rolled at the beginning of a new Turn or Phase or Round or other demarcation, with a roll of "0" (zero) having no effect and a roll showing the "Tools" or other symbol or indicia resulting in the competitor recovering one or more of any previously lost Primary Dice of the competitor's choosing.

Yellow Randomization Die

The Yellow dice element of the System represents Randomization, or chance or dispersal or resolution of applied force in generally acceptable but essentially unpredictable ways, which can occur during any competition and which allows the offensive actions of one competitor to impact the opponent's capabilities in ways beyond the ability of the affected participant to avoid or channel, including offensive actions or attacks which may completely bypass the affected participant's defenses and may or may not have devastating results, and on the example of a six-sided die (or hexahedron) consists of one or more single white square symbols, or one or more single black square symbols, or one or more single red square symbols, or one or more single blue square symbols, or a square comprised of one each of white, black, red and blue symbols, or one or more single black "✖" symbols, wherein squares may or may not be replaced by some other form of indicia, on a yellow field per side, all oriented identically, and occupying specific sides of the hexahedron relative to one another.

As shown in FIG. 6, the Yellow Randomization die 52 preferably includes a multicolor square symbol 54 of white, black, red and blue colors on its first side, and a white square symbol 56, a black square symbol 58, a red square symbol 60, a blue square symbol 62, and a black 'X' symbol 64 on its second, third, fourth, fifth, and sixth sides, respectively.

Function of the Yellow Randomization Symbols

One or more Yellow Randomization Dice are allotted to each competitor for use when they have received one or more yellow square results on the rolls of their Red attack dice, with one Yellow Randomization die rolled separately for each yellow square result on the Red Attack dice, and the result which is then rolled on the Yellow Randomization die being applied immediately to the defending competitor or field element, with the color of the square rolled usually being the loss of a corresponding colored die from the Primary Element dice pool of the affected competitor or field element, or in the case of the four-color square the loss of one or more of the relative Primary Element generators depending on the competition being modeled, while a result of a black "✖" generally results in the immediate and complete elimination of the affected competitor or field element with no possibility of avoidance, subject to variant rules or conditions depending on the sort of competition being modeled, thus using the Yellow Randomization die to represent any particularly effective result which may occur in any competition but which cannot be reasonably planned for or counted on to occur but may nevertheless prove decisive to the outcome.

Green Unpredictability Die

The Green dice element of the system represents Unpredictability, including but not limited to fortune, environmental effects, morale, spirit, quality of forces or their supplies or any variables which can tip the balance against or in favor of a competitor for the entire course of a competition or only in a given Turn, Phase, Round or other period of time with in the competition, and on the example of a six-sided die (or hexahedron) consists of one or more single "Sun" symbols, or one or more "Sun and Cloud" symbols, or one or more "Equal Measuring Scale" symbols, or one or more "Rain Cloud" symbols, or one or more "Storm" symbols, wherein such symbols may or may not be replaced by some other form of indicia, on a green field per side, all oriented identically, and occupying specific sides of the hexahedron relative to one another.

As shown in FIG. 7, the Green Unpredictability die 66 preferably includes a "Sun" symbol 68 on its first side, a "Sun and Cloud" symbol 70 on the second side, an "Equal Measuring Scale" symbol 72 on the third and fourth sides, a "Rain Cloud" symbol 74 on the fifth side, and a "Storm" symbol 76 on the sixth side thereof.

Function of the Green Unpredictability Symbols

One or more Green Unpredictability Dice are allotted to each competitor in special circumstances or are used to establish overall conditions for both sides during the competition, with the Green Unpredictability serving different functions depending on the nature of the competition being modeled, essentially filling the role of a "wild card" to represent favorable, unfavorable or neutral conditions in effect at a specific moment or during the entire course of a competition, with its most common use being to represent the variable effectiveness of an individual element within a competitor's team or side or complement of competitive elements, with the progression from "Sun" to "Sun and Cloud" to Equal Measuring Scales" to "Rain Cloud" to "Storm" representing a shift in the advantage for a particular element based on the nature of that element, the task being modeled, the goal being sought, or any number of variables stipulated by the nature of the competition and the competing elements or field of competition.

Purple Advantages Dice

The Purple dice element of the System represents Advantages, including but not limited to quality of competing elements, expendable elements which boost performance or effectiveness, technological, natural, spiritual or material advantages or any variables which can significantly improve the effectiveness of an action, usually but not limited to, a Primary Element, at the moment of its application, and which may or may not be retainable, and on the example of a six-sided die (or hexahedron) consists of one or more single white "lightning bolt" on a black circle symbols, one or more white "×2" on a black circle symbols, one or more white "×3" on a black circle symbols, or one or more black "Star" on a white circle symbols, wherein such symbols may or may not be replaced by some other form of indicia, on a purple field per side, all oriented identically, and occupying specific sides of the hexahedron relative to one another.

As shown in FIG. 8, the Purple Advantages die 78 preferably includes a black "Star" symbol 80 on a white circle on the first side, a white "×3" (numerical and non-numerical symbol) on a black circle symbol 82 on the second and fifth sides, a white "×2" (numerical and non-numerical symbol) on a black circle symbol 84 on the third and fourth sides, and a white "Lightning Bolt" on a white circle symbol 86 on the sixth side thereof.

Function of the Purple Advantages Symbols

One or more Purple Advantages Dice are allotted to competitors to be used as "Booster" dice, which are normally used once then removed from play and which are usually, but not exclusively, rolled in conjunction with one or more of the Primary Element dice, with the result, if "×2" or "×3", applied as a multiplier to the results, if any, rolled on the respective Primary Element die, so a Red Attack die roll of two "bursts" in conjunction with a Purple Advantages die roll of "×2" would be the equivalent of four "bursts", with the Purple Advantages die then being removed from play as "expended", although a roll of a White Lightning Bolt symbol on a black circle usually, but not exclusively, causes the Purple Advantages die to be expended with no effect, while a roll of a Black Star on a white circle applies an Advantage of "×(variable number value depending on competition being modeled)" and the Purple Advantages die is returned to the competitor to be used again in later dice rolls, which can continue throughout the competition until such time as any roll other than a Black Star on a white circle is rolled.

Basic Game Components

Although a single set of dice may preferably include the following recommended quantities of the Primary and Secondary Element dice, it is not necessary that all dice be used to play a game:

Four (4) White Speed Dice
Four (4) Black Maneuver Dice
Four (4) Red Attack Dice
Four (4) Blue Defense Dice
One (1) Orange Recovery Die
One (1) Yellow Randomization Die
One (1) Green Unpredictability Die
Six (6) Purple Advantages Dice

EXAMPLES OF THE SYSTEM TO MODEL SIMPLE COMPETITIONS

The following Examples use the four Primary Element dice to show how the system represents a conflict as an integration of four dynamics, each affecting the total competitive effort as well as each other.

In its simplest form, the game can be played as a dice rolling game using nothing more than a basic set of Primary Element dice, consisting of one each Speed, Maneuver, Attack and Defense Dice, which will make for a very brief game, but will show the essential elements of dice interaction.

Example I

Fight: A Two-Player Game

Rules
1 Each Player has one each Speed, Maneuver, Attack and Defense die.
2. Each Player rolls all four of their dice simultaneously.
3. The Player who rolled the most Arrows on their Speed Die will apply the result of their Attack die first. If this eliminates the other player, the game is over.
4. If both Players rolled the same value on their Speed die, the results of their Attack dice will be applied simultaneously. This could eliminate both players simultaneously, and result in a draw.
5. The Player who rolled the most Curves on their Maneuver Die will be allowed to re-roll either their Defense Die or their Attack Die, if they wish. They must use the new result.
6. Each "Burst" symbol on a Player's Attack Die indicates a "hit" on his opponent.
7. Each "Shield" symbol on a Player's Defense Die cancels one "hit" which that Player would suffer as a result of his opponent's Attack Die result.
8. A "Yellow Square" result on an Attack Die represents a "Critical Hit" by that Player which cannot be cancelled by a single or double "Shield" result by the other Player.
9. If a Player's Defense Die result shows as many or more "Shield" symbols than their opponent's Attack Die result shows "Burst" symbols, that Player has successfully avoided his opponent's attack, and there is no effect.
10. If a Player's Attack Die result shows more "Burst" symbols than their opponent's Defense Die result shows "Shield" symbols, that Player has "Wounded" his opponent. The opponent must set aside either his Speed Die, or his Maneuver Die or his Defense Die. He will not be able to use them for the rest of the fight.
11. The Player who forces his opponent to lose all three of his Speed, Maneuver and Defense dice wins. Note that it is possible for both Players to achieve this result on the same Turn, resulting in a draw.

For a longer game, each Player is given twenty tokens—coins or beads—representing "Hit Points", or keep track of each Player's "Hit Points" on a piece of scratch paper. Instead of losing a Die to successful Attacks, Players lose a number of "Hit Points" equal to each "Burst" result that is not cancelled by a "Shield". When a Player loses their last "Hit Point", they are defeated.

Example II

For the sake of this Example, and as an aid to visualization of the competition being modeled, we will call this competition a game of "Tag".

Tag: A Two-Player Game

Rules
1. Both players roll a White Speed Die.
The goal is to eliminate at least two (or all) of the opponent's Primary Element Dice before the opponent does the same to you, or eliminate any two of the opponent's Primary Element Dice and escape. For this competition, Maneuver Dice "trump" Speed Dice, so that a roll of two White Curved Arrows is superior to a roll of two Black Straight Arrows, when those two types of dice are rolled against each other during the Movement Phase.

Turn One

1. Player 1 rolls one White Speed Die, with a result of three (3) Black Straight Arrows. Player 2 rolls one Speed Die, with results of two Black Straight Arrows. Player 1 has more Speed (3>2) and "catches" Player 2. If Player 1 wins or ties the "Maneuver" rolls, he will have "gained the initiative".

2. Player 1 now rolls 1 Black Maneuver Die, with a result of one (1) White Curved Arrow. Player 2 rolls one Black Maneuver Die, with a result of two (2) White Curved Arrows. In our game of "tag", Maneuver is considered to be superior to Speed, so even though Player 1 was "faster", Player 2 "outmaneuvered" him (2>1), and Player 2 has "gained the initiative", which means he will get to "attack" ("tag") Player 1 first, and apply the results, before Player 1 can respond.

3. Because he has "gained the initiative", Player 2 may conduct his "attacks" first, and rolls his Red Attack die against Player 1; he rolls two "Bursts". Player 1 rolls his Blue Defense die and rolls one "Shield", allowing him to cancel out one of Player 2's "bursts"; the other takes effect and Player 1 must lose one of his Dice. He chooses to lose his White Speed die. This means he cannot now "escape" from Player 2, but he could still "outmaneuver" him.

4. Now it is Player 1's turn to attack, and he rolls his Red Attack die and gets a Yellow Square. Normally, this would entitle him to roll the Yellow Randomization die and Player 2 would not be allowed to roll any Blue Defense dice in response, but for this simple learning exercise, the Yellow Square result will force Player 2 to lose a die of Player 1's choosing. Player 1 takes Player 2's Black Maneuver die.

5. With a round of Movement and Combat completed, this concludes the first Turn.

Turn Two

6. At the start of the second Turn, Player 1 rolls his Black Maneuver Die (he no longer has a White Speed die) and Player 2 rolls his White Speed Die (he no longer has a Black maneuver Die). Player 1 rolls White Curved Arrows and Player 2 rolls two Black Straight Arrows. Since Player 2's Speed Die exceeded Player 1's Maneuver Die, Player 2 may opt to "escape", but since he has only eliminated one of Player 1's Dice, this would result in a draw. He considers that if he does not declare he will "escape", Player 1's Maneuver Die roll of two White Curved Arrows "trumps" Player 2's Speed roll of two Black Straight Arrows, meaning Player 1 will get to try to "tag" (attack) him first, but he decides to tough it out and stays for another round.

Example III

Jet Fighter Combat Game

The following is an application of the System to play a game depicting an engagement between two jet aircrafts (FIGS. 9-34).

The engagement will preferably be played out on a board 88 divided into hexagons 90, between two fictional modern jet aircraft, each equipped with gun and missiles. One jet will be Red, the other Blue. Each jet will preferably have the following capabilities:

Four White Speed Dice (10)
Two Black Maneuver Dice (18)
Four Red Attack Dice (28)
Three Blue Defense Dice (38)
One Orange Repair Die (46)
Two Purple Bonus Dice (78)
One Yellow Critical Hit Die (52)
One Green Fortune Die (66)

A display card (92, 94) for each jet will be used to keep track of damage and expended dice, as shown in FIGS. 9-10.

Rules

1. The game is played on the board preferably divided into hexagons called spaces. Jets must always be positioned to face one side of the space they occupy; if such facing is unclear at the start of the opposing player's portion of the Game Turn, the opposing player will correct the facing.

2. Each player controls one Jet, either the Red Jet or the Blue Jet.

3. Jets must roll at least one White Speed Die every Game Turn. Each Jet must use the full value of at least one Speed Die result each Game Turn.

4. Jets are armed with guns and missiles. Both weapons preferably have a maximum range of eight spaces. (This range is variable.) A Jet which is in position to attack a single target with both guns and missiles may declare its attack to be either or both, but must expend at least one Purple Bonus Die to represent its missile attack. Red Attack Dice which are modified by Purple Bonus Dice are always considered to be Missile attacks.

5. Guns fire in a straight line directly in front of the Jet. Missiles fire into any space in a 60 degree "cone" spreading out from the front of the Jet.

6. The Green Fortune Die will be rolled each Turn to determine which jet moves first that Turn. In this game, "Bad Weather" is inferior to "Good Weather" when comparing die roll results, for example a result of "Clouds with Rain" is superior to a result of "Storm", while "Balanced Scales" are superior to both "Bad Weather" results and inferior to both "Good Weather" results. In this game, any tied Green Fortune Die rolls are automatically won by the Blue Jet player.

6a. In this game, the Green Fortune Die represents each Jet Pilot's "Luck". Once per game, a player can declare his Pilot will "Push His Luck" by committing his Green Fortune Die to certain tasks. Whatever the outcome, the Green Fortune Die is permanently removed from play. The first Pilot to "Push His Luck" will automatically lose the Initiative for any remaining Turns, that is, his opponent will decide which of the players moves first. This will hold true even if the second player later "Pushes His Luck" and also loses his Green Fortune Die.

7. A Jet which loses all of its White Speed Dice is considered destroyed. A Jet which loses all of its Red Attack Dice, Blue Defense Dice and Black Turn Dice, or which leaves the map at any time, will be considered to have lost the game.

Victory Conditions

Destroy or drive off the enemy Jet.

Game Map and Starting Positions

As noted above, the bard 88 used for this game will be divided into hexagons 90 to regulate movement, facing and arcs of fire. Blue Jet and Red Jet start at opposite ends of the board (FIG. 11).

Turn One

The Green Fortune Die will be used to determine Initiative, or which player moves first, at the start of each Turn. To reflect a technological advantage, tied results will be considered to be won by the Blue Jet player.

Each player rolls their Green Fortune Die; the Red Jet player rolls Sun; the Blue Jet player rolls Rain, so the Red Jet player has won and holds the initiative. He may move first or require the Blue Jet player to commit himself first to his movement.

No missiles may be fired on the first Turn, so Red Jet decides to make the Blue Jet player move first.

Blue Jet decides to use all of his Speed Dice and both of his Maneuver Dice; he must roll all of both types of Dice at once. He rolls four White Speed Dice and two Black Maneuver Dice and gets the result as shown in FIG. 12.

Not all Dice must be used, but if any Die result is used, then the full value of that result must be used. If the Blue Jet player wishes to move only two spaces, he may discard all but one of the double arrow dice, but if he uses both double arrow dice, he must move four spaces. For Jet Combat, a Player may not use any Black Maneuver Die unless he has used at least one White Movement Die first. The Blue Jet player wants to get around behind the Red Jet, so he uses his dice result as shown in FIG. 13.

Specifically, as shown in FIG. 13, Blue Jet uses one Speed arrow to move forward one space, uses one Turn to change facing by one side of the hexagon to the right, uses two Speed double arrows to move four spaces, uses last Turn to change facing by one side of the hexagon to the left, uses last Speed arrow to move forward one space.)

In this jet Combat game, fighters may attack each other if their target is:

1. Within eight hexagons, or spaces, including the space of the target jet, but not the space of the attacking jet, and directly in front of the attacking Jet;

2. If attacking with Missiles, the target must be within eight hexagons, or spaces, including the space of the target jet, but not the space of the attacking jet, and within a 60 degree arc in front of the attacking jet.

Fighters attack with all their Red Attack Dice if the range to their target is four spaces or less, or half their Red Attack Dice if the range is five to eight (spaces). They may not attack a target that is more than eight spaces away.

As shown in FIG. 14, Blue Jet is not lined up to use his Guns against Red Jet. However, Red Jet is in the arc of fire for Blue Jet's Missiles. Counting the spaces from Blue Jet to Red Jet, the range is eight spaces, just within range for Blue Jet to attack. Since it is more than four spaces, Blue jet may only use half his Attack Dice, or two Red Attack Dice.

Missiles are expended when fired, but can be very powerful; this is depicted in the Jet Combat Game by using Bonus Dice to represent Missiles. If the Blue Jet player wishes to attack the Red Jet, he can only do so with Missiles because of Red Jet being out of the line of fire of his guns, meaning Blue Jet will have to expend one or both of his Bonus Dice to make the attack. The Blue Jet player decides to fire one Missile. This means he will roll two, or half, of his Red Attack Dice, and one of his Purple Bonus Dice, representing the missile being fired.

Blue Jet Rolls two Red Attack Dice (28) and one Purple Bonus Die (78), with the result shown in FIG. 15.

Since this is a Missile Attack, only Attack Dice that are modified by Bonus dice are counted. The Blue Jet player discards the single hit attack die result and applies the Bonus Die multiplier to the double-hit attack die; the Blue Jet's Missile Attack has therefore achieved a result of four possible hits—a double hit Attack multiplied by two—on the Red Jet.

The Blue Jet player retrieves his Red Attack Dice, but the Purple Bonus Die is permanently removed from play.

As shown in FIG. 14, Blue Jet is not lined up for a Guns attack on Red Jet, but Red Jet is in the extreme range—eight spaces—of Blue Jet's Missile Attack are of fire. Blue Jet's player declares a Missile Attack on Red Jet, using half his Red Attack Dice because of the range, and expending one Purple Bonus Die, representing a Missile Attack.

Red Jet's player now has a chance to avoid the damage from Blue Jet player's Missile Attack. He rolls all three of his Blue Defense Dice. In a Jet Combat game, these could be taken to represent evasive maneuvers, electronic countermeasures, a heavily-armored fuselage or any number of variables. Red Jet rolls his Blue Defense Dice (38) and gets the result as shown in FIG. 16.

Red Jet rolls three Shield. Each Shield negates one Hit. Since Blue Jet's Missile Attack achieved four Hits, Red Jet's Defense Dice roll has cancelled all but one. The Red Jet player manages to avoid most, but not all, of the damage from Blue Jet's Missile Attack.

To represent the damage his jet has suffered, the Red Jet player must choose one of his Primary Element Dice to discard. He decides to give up one of his White Speed Dice, and sets it aside. It will not be used for the rest of the game unless he can restore it with a Repair Die Roll at the beginning of a future Turn.

Blue Jet has completed all his Movement and Attacks; it is now Red Jet's move.

Like Blue Jet, Red Jet decides to use all of his Speed and Maneuver Dice. His Speed Dice pool has been reduced from four dice to three dice due to damage from Blue Jet's Missile Attack, so Red Jet rolls three White Speed Dice (10) and two Black Maneuver Dice (18), with the result as shown in FIG. 17.

This is an optimal result for Red Jet, as can be seen by its move as shown in FIG. 18.

Red Jet uses all of its Speed Dice to get in behind Blue Jet, thus achieving a "Tailing" position for the next Turn. Red Jet is able to reach this position by playing all of its Speed Dice to move forward a total of nine (9) spaces before using its Double Turn to make a tight turn to the left. It discards its single Turn without using it.

It is now Red Jet's turn to Attack. In this game jets can attack with either Guns or Missiles, but not both in the same turn. The Red Jet player decides to fire both of his Missiles in hopes of destroying Blue Jet outright. Since he is within four spaces of his target, he rolls all four of his Red Attack Dice (28), and since he is firing all of his missiles, he rolls both of his Purple Bonus Dice (78), as well, with the result as shown in FIG. 19.

This is a potentially devastating attack, as Red Jet player has rolled two very potent "special effects".

As shown in FIG. 18, Red Jet uses its high Speed and a tight Turn roll to line up a straight shot for Guns. Note that it uses its two White Turn arrows to bring it around two space sides in one space; it could not have made this turn with the single White Turn die roll, so it does not use it, and it could not have used only one of the White Turns arrows; if any symbols on a die face are used, all must be used.

Red Jet's Attack Dice roll has achieved one Miss, one Single Hit, one Double Hit, and one "Critical Hit", represented by the large Yellow Square. In addition, Red Jet's Missile attack has scored one "×2" Bonus Die result and one "Black Star" Bonus Die result. In this game, the "Black Star" result is equal to a "×3" result, but since it is a "Black Star", instead of being discarded, this Bonus Die is returned to the Red Jet player's pool. He can use this Bonus Die again for another Missile Attack on a subsequent Turn, and if he rolls another "Black Star", he will retain it then, too. In fact, he may continue to retain and re-use it for as long as he continues to roll a "Black Star" result.

Since a Bonus Die may only be applied to one Red Attack Die, the Red Jet player applies the "×2" Bonus Die to the Red Double Hit result, which, combined with the Single Hit Red Attack Die result, makes a total of five hits on the Blue Jet. The Red Jet player applies the "Black Star/×3" result to the Yellow Square Critical Hit Die result, which means the Blue Jet will take three Critical Hit results which will be rolled for by the Red Jet player. This is especially dangerous for the Blue Jet, since Defensive Dice results cannot be used to negate Critical Hits.

The Blue Jet player rolls his Blue Defense Dice (38) and gets an excellent result; three Double Shields, which negates up to six of Red Jet's Red Attack Dice hits (FIG. 20).

Even with the "×2" Bonus Die raising Red Jet's total hits to five (5), Blue Jet's Defensive Dice result has negated every normal hit result achieved by Red Jet. However, as stated above, Defensive Dice have no effect on Yellow Square "Critical Hit" results, and Red Jet's "Black Star/×3" result has inflicted three such hits on Blue Jet.

To determine the nature of the three Critical Hits which Red Jet inflicted on Blue Jet, Red Jet's player rolls his Yellow Randomization Die (52) once for each of the three Critical Hits he has inflicted on Blue Jet. The result, in order, is shown in FIG. 21.

The Red Square indicates that Blue Jet loses one of its Red Attack Dice; the Blue Square indicates that Blue Jet loses one of its Blue Defense Dice; the four-color square indicates that the Blue Jet must lose a White Speed Die, a Black Turn Die, a Red Attack Die or a Blue Defense Die, as determined by the Red Jet player.

Note that, unlike a normal Red Attack Die hit result, the Blue Jet player cannot choose which of his Primary Element Dice he loses to an attack; the Yellow Randomization Die used in Critical Hit resolution determines which Primary Element Die he loses for each Critical Hit suffered. In this case, after seeing that the Critical Hits he has rolled on Blue Jet have caused it to lose one Red Attack Die and one Blue Defense Die, the Red Jet player decides to use the four-color roll to force the Blue Jet player to lose an additional Blue Defense Die. This will leave Blue Jet extremely vulnerable to Red Jet's next attack.

As the last action in the Turn, both players each declare a damaged system and simultaneously roll their Orange Recovery Die. A roll of "0" is "No Effect", while a roll showing the "Tools" symbol indicates they have Repaired (or "Recovered") the destroyed system, and may return the declared Die to their Dice Pool.

Red Jet has only lost one White Speed Die; its player rolls and gets a "0", so this damage remains. Blue Jet has lost one Red Attack Die and two Blue Defense Dice; its player declares he will try to recover some of his defensive capability. He rolls a "Tools" symbol and returns one of his lost Blue Defense Dice to his Dice Pool.

At the end of Turn One, the status sheets for the two jets look like as shown in FIGS. 22-23.

Turn Two

At the beginning of each Turn after the first, each player may try to Repair damage to his aircraft using the Orange Repair Die. Therefore, the Blue Jet player's first action this Turn is to use his Orange Repair die to try to recover one of his lost systems. He must declare which system he is trying to recover before he rolls. He cannot recover his expended Missile, as these are represented by Purple Bonus dice which, once used, are permanently expended.

Blue Jet's player declares he will try to recover one of his lost Red Attack Dice and rolls as shown in FIG. 24. The Tools Symbol indicates Blue Jet has recovered the system rolled for, and Blue Jet gets back his lost Red Attack Die to use on this and future Turns (unless and until it is lost again and he fails to Repair it). Blue Jet's status sheet now looks like as shown in FIG. 25.

Turn Two: Initiative, Movement and Tailing

On Turn One, the Green Fortune Die was rolled to determine Initiative, or which player moves first, at the start of the Turn. However, Turn Two begins with Red Jet in a Tailing Position on Blue Jet. This means that Red Jet is behind Blue Jet and can see his maneuvers as he makes them, making it easy to stay behind Blue Jet.

This is the most powerful tactical position in aerial combat, and to reflect the advantage it gives, the following rules are in effect:

The Tailing Jet (in this case, the Red Jet) automatically wins Initiative for any Turn in which it is Tailing its opponent, and will usually force the Tailed Jet to move First.

After a Tailed jet has rolled all of its Speed and Maneuver Dice, the Tailing Jet rolls its own Speed and Maneuver Dice. If the Tailing Jet rolls More Speed Arrows or Turn Arrows on all of its dice combined as the Tailed Jet, the Tailed Jet is moved first, then the Tailing Jet is placed behind the Tailed Jet, anywhere within the Tailing Zone, at the same range as before the move. This constitutes the Tailing Jet's movement and Maneuver for the Turn.

If the Tailing Jet rolled more Speed Arrows than the tailed Jet, the Tailing Jet may "close the range" to the Tailed Jet by ending its Tailing Move as many spaces closer to the Tailed Jet as it wishes, as shown in FIG. 26.

The Blue Tailed Jet rolls its Speed (10) and Maneuver Dice (18) and gets the result as shown in FIG. 27.

The Red Tailing Jet rolls its Speed (10) and Maneuver Dice (18) and gets the result as shown in FIG. 28.

The Blue (Tailed) Jet Rolled a total of seven Speed Arrows and two Turn Arrows, while the Red (Tailing) Jet rolled a total of eight Speed Arrows and two Turn Arrows.

The Red Jet failed to exceed the Blue Jet's TURNS, and almost lost the tailing position, but the Blue Jet was slightly slower than the Red Jet, so the Red Jet maintains its Tailing position on the Blue Jet's rear. Since it rolled one more Speed Arrow than the Blue Jet, the Red Jet may put itself one space closer to the Tailed Jet at the end of Movement, which will allow it a better attack because of the increased number of Red Attack Dice it may use at the shorter range.

The Red Jet player decides to try to finish off the Blue Jet and declares he will make a Missiles attack using all four of the Red Jet's Red Attack Dice and his remaining Purple Bonus Die.

As shown in FIG. 26, Red Jet maintains its Tailing position on Blue Jet, and so is placed anywhere in Blue Jet's Tailing Zone at the same range it was at before Movement. Since it rolled one more Speed Arrow than Blue Jet, Red Jet closes the range by one space, bringing Blue Jet into a range of four spaces, allowing Red Jet to use the maximum number of its Red Attack Dice. Even if the Blue Jet survives, Red Jet will still be Tailing it next Turn.

Red Jet's player rolls all four Red Attack Dice (28) along with his remaining Purple Bonus Die (78) and gets the result as shown in FIG. 29.

This roll is as bad as Red Jet's first roll was good. Two of the Red Attack Dice are "zeroes". Meaning they miss completely. One is a Single Hit and the other is a Double Hit, but his Purple Bonus Die is a White Lightning Bolt on a Black Field. This is the worst possible roll on a Purple Bonus Die. The Black Field means the die is permanently discarded, just as if it had provided a positive multiplier, but the White Lightning Bolt means the attack it was used for is a critical failure, such as a jammed Gun or, in this case, a "dud" Missile. The effect is that the highest value Red Attack Die result—in this case, the Double Hit—is cancelled. For all his effort, Red Jet's player has managed to inflict only a Single Hit result on the Blue Jet. Blue Jet rolls his Blue Defense Dice (38) and gets a Shield, negating the one hit the Red Jet player achieved (FIG. 30).

The Red Jet is still on the Blue Jet's tail as we go into Turn Three.

Turn Three: Pushing One's Luck

At this point in the game, although the Blue Jet has lost a third of its defensive abilities, thanks to a lucky Repair roll, its Red Attack dice are equal to those of the Red Jet, it still has one Purple Bonus Die, and it retains a slight advantage in speed. In jet fighter combat, speed is often the decisive factor.

Red Jet has a Tailing advantage, thus winning the Initiative automatically, and declares that Blue Jet will move first again this Turn.

Blue Jet's player believes he will not survive another Tailing attack from Red Jet and decides to try something drastic. Before rolling for Movement to attempt to break Red Jet's Tailing advantage, Blue declares he is going to "Push his Luck".

In this game, "Pushing One's Luck" consists of using the Green Fortune Die as a special kind of Bonus die by adding it to any one die roll. NOTE: Whatever the result of "Pushing One's Luck", whether good or bad, the Green Fortune Die of the player who does so is permanently removed from play; it cannot be recovered by Repair Rolls. Once a player has used the Green Fortune Die for this purpose, he has "run out of luck".

The results of "Pushing One's Luck" are resolved according to the symbols rolled on the Green Fortune Die. "Balanced Scales" results have no effect, while "Bad Weather" results force the player to discard the Green Fortune Die, losing it for the remainder of the game, and thus permanently surrendering the Initiative to his opponent with no benefit to show for it.

However, a result of "Good Weather" (Sun with Cloud) allows the player who has "Pushed his Luck" to declare the result of any one die in the pool the Green Fortune Die is rolled with, to be any result the player wishes, and a result of "Excellent Weather" (Sun Only) allows the player who has "Pushed his Luck" to do the same with any two dice in the pool the Green Fortune Die is rolled with. Note that no matter what colors the Dice are, any time dice are rolled together, as is the case with White Speed dice and Black Maneuver dice, all dice rolled together are considered part of a single pool of dice.

Therefore, in this Jet Combat game, even though Speed Dice and Maneuver Dice are different colors, "Pushing One's Luck" allows a successful roll to modify either White Speed Dice or Black Maneuver Dice, or both. This would also be true if a player "Pushed His Luck" by rolling the Green Fortune Die with a Missiles attack using Red Attack Dice and Purple Bonus Dice.

The Blue Jet player declares he will "Push His Luck" during his Movement, allowing him to potentially change the results on his White Speed and/or his Black Maneuver Dice. He rolls his four White Speed Dice (10), two Black Maneuver Dice (18) and his Green Fortune Die (66) all together, with the result as shown in FIG. 31.

This roll is actually too good. Remember that in this Jet Combat game:

Jets must always use at least one White Speed Die;

Jets must use a White Speed Die before they can use a Black Turn Die, and;

If any Die is used, all the symbols rolled on that Die must be used.

Since Blue Jet's player has rolled four Speed Dice all with values of Triple Speed Arrows, using any one of them will carry his Jet off the edge of the map, resulting in a Red Jet victory.

However, because he "Pushed His Luck", the Blue Jet player's Green Fortune Die roll result will save him. He uses the "Good Weather" result to change one of the Triple White Speed Arrows to a Single Speed Arrow.

Now that Blue Jet's Movement and Turn rolls are completed, Red Jet must roll his White Speed Dice and Black Maneuver Dice to maintain his Tailing position. He, too, could elect to "Push His Luck", but seeing Blue Jet's dice rolls, he knows he cannot equal Blue Jet's Speed roll with only three White Speed Dice of his own.

Even if the Red Jet player were able to change all of his White Speed Dice results to Triple Speed Arrow results, Blue Jet would still be faster by one Speed Arrow, meaning that the Blue Jet is assured of breaking Red Jet's Tailing advantage. The Red Jet's player decides to save his Green Fortune Die.

Blue Jet executes his Movement first, as shown in FIG. 32, below.

Specifically, as shown in FIG. 32, Blue Jet uses its Green Fortune Die to change one of its Triple Arrow Speed rolls to a Single Arrow and moves forward one space. It then uses its Triple Turn Maneuver result to turn 180 degrees around, executing a "half-loop" or "Immelmann Turn". Finally, Blue jet uses one of its Triple Arrow Speed rolls to fly straight at the Red Jet to make a head-on pass, guns blazing. Blue Jet's two remaining White Speed Dice and single remaining Black Turn Die are not used.

Turn Three: High Speed Maneuvers

Blue Jet's player now uses the Single Arrow Speed Die created by "Pushing His Luck" to move forward the one space required in this Jet Combat game. He may no play a Black Turn Die, and so uses the Triple Turn Maneuver Die result to make a 180 degree turn in a single space. In aerial combat, this maneuver is sometimes called a "half loop" or an "Immelmann Turn". The Blue Jet player then uses one of his remaining Triple Arrow Speed Die results to close with the Red Jet in a head-on attack.

Blue Jet declares that he will fire all his Red Attack Dice (28) and his remaining Missile (78) at the Red Jet and rolls the result as shown in FIG. 33.

This result is as bad as it can get for the Red Jet. Blue Jet's player declares he will apply his "×3" Missile hit to one of the Yellow Square Critical Hit results. This means the Red Jet will suffer four hits which it cannot defend against.

The Red Jet player sets aside the two Double Hit results until he sees if he will even survive the four Critical Hits. The Blue Jet player rolls the Yellow Critical Hit Die (52) four times, with the result as shown in FIG. 34.

This result will destroy the Red Jet in either of two ways. First, the Black "✹" result represents a catastrophic Critical Hit. It could mean the pilot of the Red Jet is killed outright, or the fuel tanks are hit and explode, or any number of other disasters that completely destroy the aircraft.

In this Jet Combat game, the only way to cancel a Black "✹" Critical Hit result is to sacrifice a Green Fortune Die to negate it. Sacrificing the Green Fortune Die for this purpose has no other effect except to negate one Black "✹" Critical Hit result.

The Red Jet player can certainly do this, but there is no way for him to prevent the loss of his remaining three White Speed Dice. The Red Jet is shot down, and the Blue Jet player wins the battle and the game.

The term "his" or "player" as used herein, includes, but not limited to, all genders, as well as entities, organizations, groups, associations, and the like, whether real, virtual, and/or fictional.

The term "value" as used herein, includes, but not limited to, numerical, (integers, non-integers, etc.), non-numerical, those represented by symbols or other indicia, and combinations thereof, whether used in English or any other language. The symbols or indicia include, but not limited to, mathematical, geometrical, geographical, astronomical, nautical, scientific, non-scientific, historical, religious, non-religious, etc.

It is noted herewith that although the present invention has been described and illustrated using variously colored six-sided dice with various value(s)/symbology(ies) on different sides thereof, it is within the scope of the invention to vary the color scheme, value(s)/symbology(ies), the sequence or order thereof, and the number of each type of dice used, as desired. It is also within the scope of the invention to use dice of varying sides, shapes, configurations, and/or use other types of game pieces. For instance, the dice or game pieces can be of any geometrical shape, such as a polyhedron with two or more sides. Additionally, the dice and other game pieces can be real, virtual, and/or fictional.

It is further within the scope of the invention to simply use black and white dice or game pieces representing the Primary and Secondary Elements, with the appropriate value(s) and/or symbology(ies), as noted herein.

While this invention has been described as having preferred sequences, ranges, steps, order of steps, materials, structures, symbols, indicia, graphics, color scheme(s), shapes, configurations, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the claims appended hereto or presented later. The invention, therefore, is not limited to the preferred embodiment(s) shown/described herein.

What is claimed is:

1. A strategy game, comprising:
   a) a first group of primary elements representing movement;
   b) a second group of primary elements representing combat or interaction;
   c) said first group of primary elements comprising first and second game pieces representing speed and maneuver, respectively, and each game piece having a value;
   d) said second group of primary elements comprising third and fourth game pieces representing attack and defense, respectively, and each game piece having a value;
   e) said first, second, third, and fourth game pieces comprising real or virtual dice, playing cards, chips, coins, tiles, or chits, or a combination thereof; and
   f) wherein one of the speed and maneuver game pieces modifies the value of one of the attack and defense game pieces.

2. The strategy game of claim 1, wherein:
   a) at least one of said first, second, third, and fourth game pieces has at least one numerical value.

3. The strategy game of claim 2, wherein:
   a) at least two of said first, second, third, and fourth game pieces have numerical values.

4. The strategy game of claim 3, wherein:
   a) at least one of said first, second, third, and fourth game pieces has at least one non-numerical value or symbolic value.

5. The strategy game of claim 2, wherein:
   a) the numerical value includes zero, or a higher or lower number.

6. The strategy game of claim 1, wherein:
   a) at least one of said first, second, third, and fourth game pieces is superior in value to at least another of said first, second, third, and fourth game pieces.

7. The strategy game of claim 1, wherein:
   a) one of the speed and maneuver game pieces is superior in value to the other of the speed and maneuver game pieces.

8. The strategy game of claim 1, wherein:
   a) one of the attack and defense game pieces is superior in value to other of the attack and defense game pieces.

9. The strategy game of claim 1, wherein:
   a) the speed game piece modifies the value of the attack game piece.

10. The strategy game of claim 9, wherein:
    a) the maneuver game piece modifies the value of the defense game piece.

11. The strategy game of claim 1, wherein:
    a) the value of each of said first, second, third, and fourth game pieces is represented by at least one numerical value, or at least one or more symbols.

12. The strategy game of claim 11, wherein:
    a) the numerical value includes zero, or a higher or lower number; and
    b) said at least one or more symbols includes one or more similar or dissimilar symbols.

13. The strategy game of claim 1, wherein:
    a) said first, second, third, and fourth game pieces are represented in different color.

14. The strategy game of claim 1, wherein:
    a) said first group of primary elements comprises a plurality of said first and second game pieces; and
    b) said second group of primary elements comprises a plurality of said third and fourth game pieces.

15. The strategy game of claim 1, further comprising:
    a) a secondary element game piece representing at least one of recovery, randomization, unpredictability, and advantages.

16. The strategy game of claim 15, wherein:
    a) said secondary element game piece modifies the value of one or more of said first, second, third, and fourth game pieces.

17. The strategy game of claim 16, wherein:
    a) said secondary element game piece includes at least one numerical, non-numerical, or symbolic value.

18. The strategy game of claim 1, comprising:
    a) a plurality of said secondary game pieces representing one or more of recovery, randomization, unpredictability, and advantages.

19. A strategy game, comprising:
    a) a first group of primary elements representing movement;
    b) a second group of primary elements representing combat or interaction;
    c) a third group of secondary elements representing one or more of recovery, randomization, unpredictability, and advantages;
    d) said first group of primary elements comprising a speed game piece and a maneuver game piece;
    e) said second group of primary elements comprising an attack game piece and a defense game piece; and
    f) said third group of secondary elements comprising one or more of a recovery game piece, a randomization game piece, an unpredictability game piece, and an advantages game piece;

g) said game pieces comprising real or virtual dice, playing cards, chips, coins, tiles, or chits, or a combination thereof; and
h) wherein one of the speed and maneuver game pieces modifies the value of one of the attack and defense game pieces.

20. The strategy game of claim 19, wherein:
a) a plurality of said game pieces have at least one numerical value, at least one non-numerical value, at least one symbolic value, or a combination thereof.

21. The strategy game of claim 20, wherein:
a) the numerical value includes zero, or a higher or lower number.

22. The strategy game of claim 21, wherein:
a) the symbolic value supersedes the numerical value.

23. The strategy game of claim 22, wherein:
a) the numerical value is variable.

24. The strategy game of claim 20, wherein:
a) one of said third group of secondary elements modifies the value of at least one of said first and second groups of elements.

25. The strategy game of claim 20, wherein:
a) the speed game piece modifies the value of the attack game piece.

26. The strategy game of claim 20, wherein:
a) the maneuver game piece modifies the value of the defense game piece.

27. The strategy game of claim 20, wherein:
a) one of the speed and maneuver game pieces is superior in value to the other of the speed and maneuver game pieces.

28. The strategy game of claim 20, wherein:
a) one of the attack and defense game pieces is superior in value to the other of the attack and defense game pieces.

29. The strategy game of claim 20, wherein:
a) the defense game piece modifies the value of the attack game piece.

30. The strategy game of claim 20, wherein:
a) one of said third group of elements modifies the value of the other of said third group of elements.

31. The strategy game of claim 19, wherein:
a) said game pieces are represented in different color.

32. The strategy game of claim 19, wherein:
a) said first group of primary elements comprises a plurality of each of said game and maneuver game pieces;
b) said second group of primary elements comprises a plurality of each of said attack and defense game pieces; and
c) said third group of secondary elements comprises a plurality of each of said recovery, randomization, unpredictability, and advantages game pieces.

33. The strategy game of claim 20, wherein:
a) at least one of said recovery, randomization, unpredictability, and advantages game pieces has an expendable value.

34. A strategy game play method for two or more players, comprising the steps of:
a) providing for each player a set of at least four game pieces representing speed, maneuver, attack, and defense categories, each game piece including a plurality of preselected values for the corresponding category, the game pieces comprising real or virtual dice, playing cards, chips, coins, tiles, tokens, or chits, or a combination thereof, wherein one of the speed and maneuver game pieces modifies the value of one of the attack and defense game pieces;
b) having each player roll all four game pieces together;
c) comparing the results of the speed game piece to determine a winner;
d) allowing the winner in step c) to use the rolled value of his attack game piece against one of the other players;
e) allowing the opponent in step d) to use the rolled value of his defense game piece;
f) comparing the results of steps d) and e) and determining a wounded player;
g) having the wounded player remove one of his four game pieces from the game; and
h) repeating steps b)-g) and determining the loser of the game who has lost at least two of his speed, maneuver, attack, and defense game pieces.

35. The strategy game play method of Claim 34, further comprising the step of:
a) allowing the player with the highest rolled value of his maneuver game piece to re-roll his attack or defense game piece, prior to step d).

36. The strategy game play method of claim 35, wherein:
the game pieces comprise real or virtual dice with a plurality of sides each with at least one numerical value, one non-numerical value, or one symbolic value, or a combination thereof.

37. The strategy game play method of claim 36, wherein:
the numerical value includes zero, or a higher or lower number.

38. The strategy game play method of claim 36, wherein:
the non-numerical value includes at least one symbol.

39. The strategy game play method of claim 34, wherein:
one of the players is a casino or gambling house employee, agent or representative, an entity, a non-human, a computing device, a gaming device, personal digital assistant (PDA), a tablet computer, a laptop computer, a desktop computer, a cellular phone, a smartphone, a fablet, a phablet, or a combination thereof.

40. A strategy game play method for two or more players, comprising the steps of:
a) providing for each player a set of at least four game pieces representing primary elements of speed, maneuver, attack, and defense categories, each game piece including a plurality of preselected values for the corresponding category, the game pieces comprising real or virtual dice, playing cards, chips, coins, tiles, tokens, or chits, or a combination thereof, wherein one of the speed and maneuver game pieces modifies the value of one of the attack and defense game pieces;
b) providing for each player one or more of secondary element pieces representing recovery, randomization, unpredictability, and advantages, each game piece including a plurality of preselected values for the corresponding category;
c) having each player roll the four primary element game pieces together;
d) comparing the results of the speed game piece to determine a winner;
e) allowing the winner in step d) to use the value of his attack game piece against one of the other players;
f) allowing the opponent in step e) to use the value of his defense game piece;
g) comparing the results of steps e) and f) and determining a wounded player;
h) having the wounded player remove one of his four primary element game pieces from the game; and
i) repeating steps c)-h) and determining the loser of the game who has lost at least two his speed, maneuver, attack, and defense game pieces.

41. The strategy game play method of claim 40, further comprising the step of:
  j) allowing the player with the highest rolled value of his maneuver game piece to re-roll his attack or defense game piece, prior to step e).

42. The strategy game play method of claim 40, further comprising the step of:
  j) allowing the wounded player in step g) to roll and use the value of one of his secondary element game pieces.

43. The strategy game play method of claim 40, further comprising the step of:
  j) allowing the losing player in step i) to roll and use the value of one of his secondary element game pieces.

44. The strategy game play method of claim 42, further comprising the step of:
  k) allowing the step d) winner to roll and use the value of one of his secondary element game pieces after step j).

45. The strategy game play method of claim 43, further comprising the step of:
  k) allowing the step d) winner to roll and use the value of one of his secondary element game pieces after step j).

46. The strategy game play method of claim 40, wherein: the step b) comprises providing for each player at least four secondary element game pieces representing recovery, randomization, unpredictability, and advantages.

47. The strategy game play method of claim 40, wherein: the step a) comprises providing for each player a plurality of each of the speed, maneuver, attack, and defense game pieces.

48. The strategy game play method of claim 47, wherein: the step b) comprises providing for each player a plurality of each of the recovery, randomization, unpredictability, and advantages game pieces.

49. The strategy game play method of claim 40, wherein: the game pieces comprise real or virtual dice with a plurality of sides each with at least one numerical value, one non-numerical value, or one symbolic value, or a combination thereof.

50. A strategy game play method for two or more players, comprising the steps of:
  a) providing for each player a set of at least four game pieces representing speed, maneuver, attack, and defense categories, each game piece including a plurality of preselected values for the corresponding category, the game pieces comprising real or virtual dice, playing cards, chips, coins, tiles, tokens, or chits, or a combination thereof, wherein one of the speed and maneuver game pieces modifies the value of one of the attack and defense game pieces;
  b) having each player roll speed and maneuver game pieces together;
  c) comparing the results of the speed game piece to determine a winner;
  d) allowing the player with the highest rolled value of his maneuver game piece to roll his attack game piece;
  e) allowing the winner in step d) to use the rolled value of his attack game piece against one of the other players;
  f) allowing the opponent in step e) to roll and use the value of his defense game piece;
  g) comparing the results of steps e) and f) and determining a wounded player;
  h) having the wounded player remove one of his four game pieces from the game; and
  i) repeating steps b)-h) and determining the loser of the game who has lost at least two of his speed, maneuver, attack, and defense game pieces.

* * * * *